US012609350B2

(12) United States Patent
Isojima et al.

(10) Patent No.: US 12,609,350 B2
(45) Date of Patent: Apr. 21, 2026

(54) INORGANIC SOLID ELECTROLYTE-CONTAINING COMPOSITION, SHEET FOR ALL-SOLID STATE SECONDARY BATTERY, AND ALL-SOLID STATE SECONDARY BATTERY, AND MANUFACTURING METHODS FOR SHEET FOR ALL-SOLID STATE SECONDARY BATTERY AND ALL-SOLID STATE SECONDARY BATTERY

(71) Applicant: FUJIFILM Corporation, Tokyo (JP)

(72) Inventors: Hiroshi Isojima, Kanagawa (JP); Hideyuki Suzuki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 538 days.

(21) Appl. No.: 18/180,851

(22) Filed: Mar. 9, 2023

(65) Prior Publication Data

US 2023/0223592 A1 Jul. 13, 2023

Related U.S. Application Data

(63) Continuation of application No. PCT/JP2021/035855, filed on Sep. 29, 2021.

(30) Foreign Application Priority Data

Sep. 30, 2020 (JP) ................................. 2020-166555

(51) Int. Cl.
*H01M 10/0562* (2010.01)

(52) U.S. Cl.
CPC .................. *H01M 10/0562* (2013.01); *H01M 2300/0068* (2013.01)

(58) Field of Classification Search
None
See application file for complete search history.

(56) References Cited

U.S. PATENT DOCUMENTS

2018/0277892 A1 9/2018 Mimura et al.
2019/0081353 A1 3/2019 Iwata et al.
(Continued)

FOREIGN PATENT DOCUMENTS

JP 2006302617 11/2006
JP 2011070908 4/2011
(Continued)

OTHER PUBLICATIONS

"Office Action of China Counterpart Application", issued on Apr. 16, 2025, with English translation thereof, pp. 1-14.
(Continued)

*Primary Examiner* — Colin W. Slifka
(74) *Attorney, Agent, or Firm* — JCIPRNET

(57) ABSTRACT

There is provided an inorganic solid electrolyte-containing composition for an all-solid state secondary battery, containing an inorganic solid electrolyte, a dispersing agent, and a dispersion medium, in which the dispersing agent satisfies the following definitions of (1) to (3), and the dispersion medium includes a dispersion medium having a boiling point of 120° C. or higher. There are also provided an inorganic solid electrolyte-containing composition, a sheet for an all-solid state secondary battery and an all-solid state secondary battery, in which this inorganic solid electrolyte-containing composition is used, as well as manufacturing methods for a sheet for an all-solid state secondary battery, and an all-solid state secondary battery.

(1) An SP value is 17.0 to 22.0 $MPa^{1/2}$.

(2) A molecular weight is 10,000 or less.

(3) An adsorption rate with respect to the inorganic solid electrolyte in the dispersion medium is 2% or more.

12 Claims, 1 Drawing Sheet

(56) References Cited

U.S. PATENT DOCUMENTS

| | | | |
|---|---|---|---|
| 2020/0212480 | A1 | 7/2020 | Mimura et al. |
| 2020/0235425 | A1 | 7/2020 | Mochizuki et al. |

FOREIGN PATENT DOCUMENTS

| | | |
|---|---|---|
| JP | 2016031868 | 3/2016 |
| JP | 2016212990 | 12/2016 |
| WO | 2019054455 | 3/2019 |
| WO | 2019203333 | 10/2019 |
| WO | 2020196041 | 10/2020 |

OTHER PUBLICATIONS

"International Search Report (Form PCT/ISA/210) of PCT/JP2021/035855," mailed on Nov. 22, 2021, with English translation thereof, pp. 1-5.

"Written Opinion of the International Searching Authority (Form PCT/ISA/237) of PCT/JP2021/035855," mailed on Nov. 22, 2021, with English translation thereof, pp. 1-8.

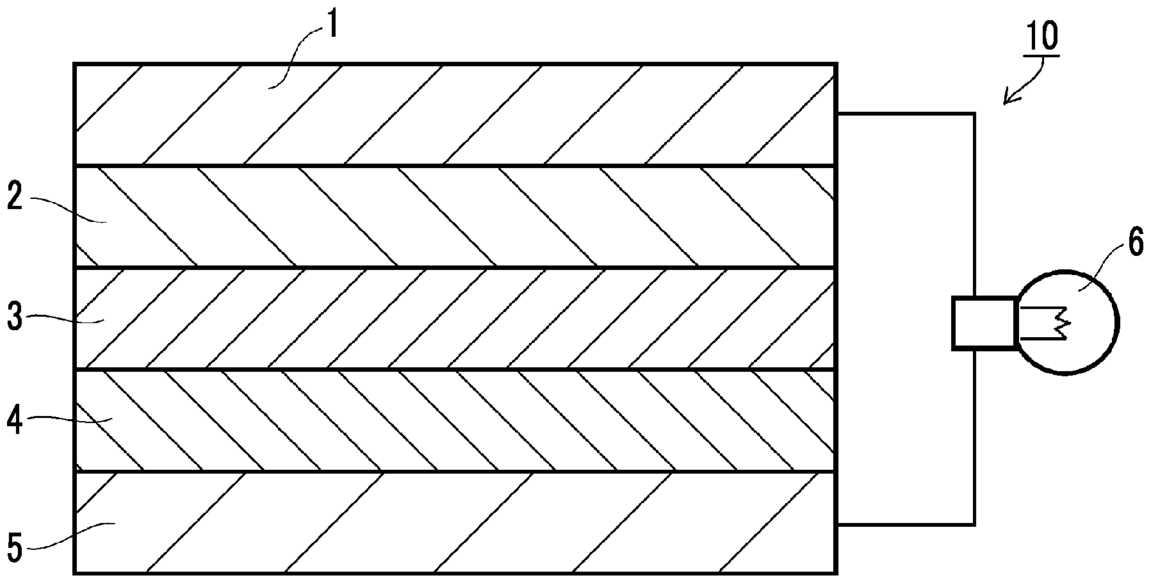
1
10
2
6
3
4
5

INORGANIC SOLID ELECTROLYTE-CONTAINING COMPOSITION, SHEET FOR ALL-SOLID STATE SECONDARY BATTERY, AND ALL-SOLID STATE SECONDARY BATTERY, AND MANUFACTURING METHODS FOR SHEET FOR ALL-SOLID STATE SECONDARY BATTERY AND ALL-SOLID STATE SECONDARY BATTERY

CROSS-REFERENCE TO RELATED APPLICATIONS

This application is a Continuation of PCT International Application No. PCT/JP2021/035855 filed on Sep. 29, 2021, which claims priority under 35 U.S.C. § 119 (a) to Japanese Patent Application No. 2020-166555 filed in Japan on Sep. 30, 2020. Each of the above applications is hereby expressly incorporated by reference, in its entirety, into the present application.

BACKGROUND OF THE INVENTION

1. Field of the Invention

The present invention relates to an inorganic solid electrolyte-containing composition, a sheet for an all-solid state secondary battery, and an all-solid state secondary battery, and manufacturing methods for a sheet for an all-solid state secondary battery and an all-solid state secondary battery.

2. Description of the Related Art

In an all-solid state secondary battery, all of a negative electrode, an electrolyte, and a positive electrode consist of solid, and the all-solid state secondary battery can greatly improve safety and reliability, which are said to be problems to be solved in a battery in which an organic electrolytic solution is used. It is also said to be capable of extending the battery life. Furthermore, all-solid state secondary batteries can be provided with a structure in which the electrodes and the electrolyte are directly disposed in series. As a result, it becomes possible to increase the energy density to be high as compared with a secondary battery in which an organic electrolytic solution is used, and thus the application to electric vehicles, large-sized storage batteries, and the like is anticipated.

In such an all-solid state secondary battery, examples of substances that form constitutional layers (a solid electrolyte layer, a negative electrode active material layer, a positive electrode active material layer, and the like) include an inorganic solid electrolyte and an active material. In recent years, this inorganic solid electrolyte, particularly an oxide-based inorganic solid electrolyte or a sulfide-based inorganic solid electrolyte has attracted attention as an electrolyte material having a high ion conductivity comparable to that of the organic electrolytic solution.

As s substance that forms a constitutional layer of an all-solid state secondary battery, those contained in the above-described all-solid state secondary battery containing an inorganic solid electrolyte and the like has been proposed. For example, JP2016-212990A discloses an all-solid state secondary battery in which at least one layer of a positive electrode active material layer, a solid electrolyte layer, or a negative electrode active material layer, as a constitutional layer of an all-solid state secondary battery, contains an inorganic solid electrolyte and contains, as a dispersing agent, a compound having a molecular weight of 180 or more and less than 3,000 and having at least one functional group selected from a group (I) of functional group (I): an acidic group, a group having a basic nitrogen atom, a thiol group, a hydroxy group, and the like, and an alkyl group having 8 or more carbon atoms or an aryl group having 10 or more carbon atoms. It is described that the dispersing agent described in JP2016-212990A makes it possible to suppress the aggregation of any one of the electrode active material or the inorganic solid electrolyte even in a case where the concentration thereof is high and to form a uniform electrode layer and a uniform solid electrolyte layer.

In addition, a slurry (a composition) containing an electrode active material, a conductive material (a conductive auxiliary agent), and a dispersing agent consisting of an ionic surfactant is disclosed as a material for manufacturing an electrode for a secondary battery to be used in a secondary battery having a positive electrode, a negative electrode, a separator, and an electrolyte, where the secondary battery is not an all-solid state secondary battery. It is described that this slurry described in JP2006-302617A can enhance the dispersibility of the conductive material.

SUMMARY OF THE INVENTION

In a case of forming a constitutional layer with solid particle materials (an inorganic solid electrolyte, an active material, conductive auxiliary agent, and the like), it is desirable that the constitutional layer forming material is excellent in characteristics such as dispersibility and application suitability from the viewpoint of improving the battery performance (for example, cycle characteristics) of an all-solid state secondary battery.

From the viewpoints of reducing the burden on the environment in recent years and reducing the manufacturing cost, the use of a high-concentration composition (a concentrated slurry) having an increased solid content concentration, for example, up to 50% by mass or more, has been studied as a constitutional layer forming material. However, in a case where the solid content concentration of the composition is increased, the characteristics of the composition generally deteriorate significantly. As a result, even with a high-concentration composition, it has not been easy to realize a constitutional layer forming material that is excellent in dispersion characteristics of suppressing the aggregation and the like of a solid particle material (also referred to as solid particles) and also excellent in application suitability such as characteristics (surface properties) of easily forming a coating film having a flat surface or characteristics (adhesiveness) of causing solid particles to adhere to each other or causing solid particles to bind to a base material. Even in a case of using the dispersing agent described in JP2016-212990A or JP2006-302617A, it has not been easy to sufficiently realize a composition having both dispersibility and application suitability, and thus further studies have been required.

Further, research and development for improving the performance and the practical application of electric vehicles have progressed rapidly, and the demand for battery performance required for an all-solid state secondary battery has become higher. In order to respond to such demands, it is important to form a constitutional layer by allowing higher characteristics to be exhibited with a component or composition of a constitutional layer forming material.

An object of the present invention is to provide an inorganic solid electrolyte-containing composition excellent in dispersion characteristics and application suitability, where the inorganic solid electrolyte-containing composition is capable of realizing the excellent cycle characteristics in a case of being used as a constitutional layer forming material of an all-solid state secondary battery. In addition, another object of the present invention is to provide a sheet for an all-solid state secondary battery and an all-solid state secondary battery, and manufacturing methods for a sheet for an all-solid state secondary battery and an all-solid state secondary battery, in which the above inorganic solid electrolyte-containing composition is used.

As a result of diligent studies focusing on a dispersion medium and a dispersing agent, which would be used in a composition containing solid particles such as an inorganic solid electrolyte, the inventors of the present invention found that in a case of combining an inorganic solid electrolyte, a dispersing agent in which the SP value, the molecular weight, and the adsorption rate with respect to the inorganic solid electrolyte are controlled in a specific range, and a dispersion medium in which the boiling point is controlled in a specific range, the aggregation, the sedimentation, or the like of the inorganic solid electrolyte can be suppressed. Accordingly, it has been found that in a case where this inorganic solid electrolyte-containing composition is used as a constitutional layer forming material, it is possible to realize a sheet for an all-solid state secondary battery, having a constitutional layer, the coated surface of which is flat and thus the surface property is good and in which excellent adhesiveness is provided, and furthermore, to realize an all-solid state secondary battery which is excellent cycle characteristics. The present invention has been completed through further studies based on these findings.

That is, the above problems have been solved by the following means.

<1> An inorganic solid electrolyte-containing composition for an all-solid state secondary battery, the inorganic solid electrolyte-containing composition comprising:

an inorganic solid electrolyte having an ion conductivity of a metal belonging to Group 1 or Group 2 in the periodic table;

a dispersing agent; and a dispersion medium, wherein this dispersing agent satisfies the following definitions of (1) to (3), and the dispersion medium includes a dispersion medium having a boiling point of 120° C. or higher, (1) an SP value is 17.0 to 22.0 $MPa^{1/2}$, (2) a molecular weight is 10,000 or less, and (3) an adsorption rate with respect to the inorganic solid electrolyte in the dispersion medium is 2% or more.

<2> The inorganic solid electrolyte-containing composition according to <1>, wherein the adsorption rate according to the definition of (3) is 40% or more.

<3> The inorganic solid electrolyte-containing composition according to <1> or <2>, wherein a difference between an SP value of the dispersion medium and an SP value of the dispersing agent is 3.0 $MPa^{1/2}$ or less.

<4> The inorganic solid electrolyte-containing composition according to any one of <1> to <3>, wherein the dispersing agent contains a functional group selected from the following group (a) of functional groups, <Group (a) of Functional Groups> a hydroxy group, an amino group, a carboxy group, a sulfo group, a phosphate group, a phosphonate group, a sulfanyl group, a heterocyclic group, an amide group, and an aryl group.

<5> The inorganic solid electrolyte-containing composition according to any one of <1> to <4>, further comprising a polymer binder.

<6> The inorganic solid electrolyte-containing composition according to any one of <1> to <5>, further comprising an active material.

<7> The inorganic solid electrolyte-containing composition according to any one of <1> to <6>, further comprising a conductive auxiliary agent.

<8> The inorganic solid electrolyte-containing composition according to any one of <1> to <7>, in which the inorganic solid electrolyte is a sulfide-based inorganic solid electrolyte.

<9> A sheet for an all-solid state secondary battery, comprising a layer formed of the inorganic solid electrolyte-containing composition according to any one of <1> to <8>.

<10> An all-solid state secondary battery comprising, in the following order:

a positive electrode active material layer;

a solid electrolyte layer; and a negative electrode active material layer, in which at least one of the positive electrode active material layer, the negative electrode active material layer, or the solid electrolyte layer has a layer formed of the inorganic solid electrolyte-containing composition according to any one of <1> to <8>.

<11> A manufacturing method for a sheet for an all-solid state secondary battery, the manufacturing method comprising forming a film of the inorganic solid electrolyte-containing composition according to any one of <1> to <8>.

<12> A manufacturing method for an all-solid state secondary battery, the manufacturing method comprising incorporating a sheet for an all-solid state secondary battery obtained by the manufacturing method according to <11> into an all-solid state secondary battery.

According to the present invention, it is possible to provide an inorganic solid electrolyte-containing composition in which both dispersion characteristics (dispersibility and stability) and application suitability (surface properties and adhesiveness) are excellent, where the inorganic solid electrolyte-containing composition is capable of realizing the excellent cycle characteristics in a case of being used as a constitutional layer forming material of an all-solid state secondary battery. In addition, according to the present invention, it is possible to provide a sheet for an all-solid state secondary battery and an all-solid state secondary battery, which have a layer formed of the above inorganic solid electrolyte-containing composition. Further, according to the present invention, it is possible to provide manufacturing methods for a sheet for an all-solid state secondary battery and an all-solid state secondary battery, in which the above inorganic solid electrolyte-containing composition is used.

The above-described and other characteristics and advantages of the present invention will be further clarified by the following description with appropriate reference to the accompanying drawing.

BRIEF DESCRIPTION OF THE DRAWINGS

FIG. 1 is a vertical cross-sectional view schematically illustrating an all-solid state secondary battery according to a preferred embodiment of the present invention.

DESCRIPTION OF THE PREFERRED EMBODIMENTS

In the present invention, a numerical range indicated using "to" means a range including numerical values before and after the "to" as the lower limit value and the upper limit value.

In the present invention, the expression of a compound (for example, in a case where a compound is represented by an expression in which "compound" is attached to the end) refers to not only the compound itself but also a salt or an ion thereof unless otherwise specified. In addition, this expression also refers to a derivative obtained by modifying a part of the compound, for example, by introducing a substituent into the compound within a range where the effect of the present invention is not impaired.

In the present invention, (meth)acryl means one of or both of acryl and methacryl. The same applies to (meth)acrylate.

In the present invention, a substituent, a linking group, or the like (hereinafter, referred to as a substituent or the like), which is not specified regarding whether to be substituted or unsubstituted, may have an appropriate substituent. Accordingly, even in a case where a YYY group is simply described in the present invention, this YYY group includes not only an aspect having a substituent but also an aspect not having a substituent. For example, the term "alkyl group" is meant to include both an unsubstituted alkyl group and a substituted alkyl group. The same shall be applied to a compound that is not specified in the present specification regarding whether to be substituted or unsubstituted. Examples of the preferred examples of the substituent include a substituent Z described later.

In the present invention, in a case where the number of carbon atoms of a certain group is specified, this number of carbon atoms means the number of carbon atoms of the entire group thereof unless otherwise specified in the present invention or the present specification. That is, in a case where this group is in a form of further having a substituent, the number of carbon atoms means the number of carbon atoms of the entire group including this substituent.

In the present invention, in a case where a plurality of substituents or the like represented by a specific reference numeral are present or a plurality of sub stituents or the like are simultaneously or alternatively defined, the respective substituents or the like may be the same or different from each other. In addition, unless specified otherwise, in a case where a plurality of substituents or the like are adjacent to each other, the substituents may be linked or fused to each other to form a ring.

In the present invention, the polymer means a polymer and has the same meaning as a so-called polymeric compound unless otherwise specified. Further, a polymer binder means a binder constituted of a polymer and includes a polymer itself and a binder formed by containing a polymer. However, in the present invention, the mass average molecular weight of the polymer that constitutes a polymer binder is more than 10,000.

[Inorganic Solid Electrolyte-Containing Composition]

The inorganic solid electrolyte-containing composition according to the embodiment of the present invention is an inorganic solid electrolyte-containing composition for an all-solid state secondary battery, containing an inorganic solid electrolyte having an ion conductivity of a metal belonging to Group 1 or Group 2 in the periodic table, a dispersing agent, and a dispersion medium. In the dispersing agent contained in this inorganic solid electrolyte-containing composition, the SP value, the molecular weight, and the adsorption rate with respect to the inorganic solid electrolyte satisfy the definitions of (1) to (3) described later, and the dispersion medium includes a dispersion medium having a boiling point of 120° C. or higher.

That is, it suffices that the inorganic solid electrolyte-containing composition according to the embodiment of the present invention contains the inorganic solid electrolyte, the dispersing agent, and the dispersion medium, and the content state thereof and the like are not particularly limited. However, in the inorganic solid electrolyte-containing composition, it is preferable that the dispersing agent is adsorbed to the inorganic solid electrolyte within the range of the adsorption rate defined in (3) described above.

It is preferable that the dispersing agent functions, in a layer formed of at least an inorganic solid electrolyte-containing composition, as a binder that causes solid particles such as an inorganic solid electrolyte (as well as a co-existable active material, conductive auxiliary agent, and the like) to bind to each other (for example, between inorganic solid electrolytes, between an inorganic solid electrolyte and an active material, or between active materials). Further, it is also preferable to function as a binder that binds a collector to solid particles. In the inorganic solid electrolyte-containing composition, the dispersing agent may have or may not have a function of causing solid particles to bind to each other.

The dispersing agent has a function of dispersing solid particles in a dispersion medium by being adsorbed to solid particles such as an inorganic solid electrolyte or being interposed therebetween. As a result, the inorganic solid electrolyte-containing composition according to the embodiment of the present invention is a slurry in which the inorganic solid electrolyte is dispersed in a dispersion medium. This makes it possible to enhance the dispersion characteristics and the application suitability of the inorganic solid electrolyte-containing composition. Here, the adsorption of the dispersing agent to the solid particles includes not only physical adsorption but also chemical adsorption (adsorption by chemical bond formation, adsorption by transfer of electrons, or the like). In addition, in a case where the dispersing agent is dispersed in the dispersion medium (in the solid state), a part thereof may be dissolved in the dispersion medium within a range where the effect of the present invention is not impaired.

The inorganic solid electrolyte-containing composition according to the embodiment of the present invention is excellent in dispersion characteristics (dispersibility and dispersion stability) and application suitability (surface properties and adhesiveness). In a case where this inorganic solid electrolyte-containing composition is used as a constitutional layer forming material, it is possible to realize a sheet for an all-solid state secondary battery, which has a constitutional layer having a flat surface and excellent surface properties and excellent in adhesiveness between solid particles, and furthermore, to realize an all-solid state secondary battery which is excellent cycle characteristics.

In the aspect in which the active material layer formed on the collector is formed of the inorganic solid electrolyte-containing composition according to the embodiment of the present invention, it is also possible to realize strong adhesiveness between the collector and the active material layer and thus it is possible to achieve a further improvement of the cycle characteristics.

Although the details of the reason for the above are not yet clear, it is conceived to be as follows.

That is, in an inorganic solid electrolyte-containing composition containing a dispersion medium having a boiling point of 120° C. or higher, a dispersing agent in which (1) the SP value is 17.0 to 22.0 $MPa^{1/2}$, (2) the molecular weight is 10,000 or less, and (3) the adsorption rate with respect to the inorganic solid electrolyte is 2% or more can be evenly present in a state where one end of the dispersing agent is adsorbed around the inorganic solid electrolyte and the molecular chain extending to the other end thereof is spread around the inorganic solid electrolyte, whereby dispersibility can be increased. Furthermore, it is conceived to be possible to suppress the reaggregation, sedimentation, or the like of the inorganic solid electrolyte not only immediately after the preparation of the inorganic solid electrolyte-containing composition but also even after a lapse of time, and it is possible to stably maintain a higher dispersion state.

In a case where a constitutional layer is formed using the inorganic solid electrolyte-containing composition according to the embodiment of the present invention, which exhibits such excellent dispersion characteristics, it is possible to suppress the generation of reaggregates, sediments, or the like of the inorganic solid electrolyte, even at the formation a film of a constitutional layer (for example, during the application and as well as during drying of the inorganic solid electrolyte-containing composition). This makes it possible to suppress variations in the contact state between inorganic solid electrolytes in the constitutional layer. In particular, in a case where the inorganic solid electrolyte-containing composition contains an active material or the like, it is conceived that specific particles of the active material or the like are less likely to be unevenly distributed in the constitutional layer. As a result, it is possible to suppress the generation or expansion of voids due to charging and discharging, which contributes to the improvement of cycle characteristics of an all-solid state secondary battery.

In addition to this, it is conceived that the inorganic solid electrolyte-containing composition according to the embodiment of the present invention can effectively exhibit the interaction between the particles of the inorganic solid electrolyte and at the time of the formation of a film of the inorganic solid electrolyte-containing composition, and can act on the improvement of the dispersion characteristics, thereby exhibiting a viscosity (fluidity) suitable for film formation. As a result, the applied inorganic solid electrolyte-containing composition properly flows (becomes leveled), and the generation of protrusions and recesses having severe undulations due to insufficient flow or excessive flow can be suppressed (the surface properties of the coated surface are excellent). Furthermore, the interfacial contact state of the solid particles is improved (the adhesiveness is increased), and thus the solid particles firmly adhere to each other. Therefore, in the present invention, the solid content concentration of the inorganic solid electrolyte-containing composition can be set to be high as compared with a case in the related art, and thus the above-described excellent dispersion characteristics and excellent application suitability can be realized.

In a case where a constitutional layer is formed by using such an inorganic solid electrolyte-containing composition, the adhesiveness between solid particles as well as the adhesiveness between solid particles and a base material (a collector) is reinforced while suppressing the generation of voids, and furthermore, the concentration of current (the deterioration of solid particles) on steep protruding parts on the surface of the constitutional layer can be suppressed. For this reason, it is conceived to be possible to realize an all-solid state secondary battery that has excellent cycle characteristics without significantly deteriorating battery characteristics even after repeated charging and discharging.

On the other hand, in a case where the inorganic solid electrolyte-containing composition does not contain a dispersion medium having a boiling point of 120° C. or higher, a dispersion chain of a compound constituting a dispersing agent cannot be sufficiently spread in the dispersion medium even in a case where a dispersing agent satisfying the definitions of (1) to (3) described above is used, and thus the dispersion function deteriorates. For this reason, the mutual aggregation of the inorganic solid electrolytes cannot be suppressed, and thus sufficient dispersion characteristics cannot be obtained. In particular, in a high-concentration composition in which the solid content concentration is increased to, for example, 50% by mass or more, the dispersion function significantly deteriorates. In addition, in a case where a dispersion medium having a boiling point of 120° C. or higher is not contained, the aggregation of the inorganic solid electrolyte is accelerated due to rapid drying after coating occurs, which is also unsatisfactory in terms of surface properties and adhesiveness (application suitability).

The solid content concentration of the inorganic solid electrolyte-containing composition is not particularly limited and can be appropriately set to, for example, 20% to 80% by mass. The solid content concentration is preferably 30% to 70% by mass and more preferably 40 to 60% by mass.

In the present invention, since dispersion characteristics and application suitability can be effectively improved by adopting a composition containing a dispersing agent that satisfies the definitions of (1) to (3) described later, a dispersion medium including a dispersion medium having a boiling point of 120° C. or higher, and an inorganic solid electrolyte, it is possible to prepare a high-concentration composition in which the solid content concentration is set to be higher than that in the related art, as the inorganic solid electrolyte-containing composition. For example, the lower limit value of the solid content concentration of the high-concentration composition can be set to 50% by mass or more. The upper limit value thereof is less than 100% by mass and can be set to, for example, 90% by mass or less. It is preferably 85% by mass or less and more preferably 80% by mass or less.

In the present invention, the solid content (solid component) refers to a component other than the dispersion medium described later.

In a case where an active material layer is formed of the inorganic solid electrolyte-containing composition according to the embodiment of the present invention, a constitutional layer is formed while a highly (homogeneously) dispersion state immediately after preparation is maintained as described above. For this reason, it is conceived that the contact (adhesion) of the dispersing agent to the surface of the collector is not inhibited by the solid particles that have been preferentially sedimented, and the dispersing agent can come into contact with (adhesion to) the surface of the collector in a state of being dispersed together with solid particles. As a result, in the electrode sheet for an all-solid state secondary battery in which an active material layer is formed of the inorganic solid electrolyte-containing composition according to the embodiment of the present invention on a collector, it is possible to realize strong adhesiveness between the collector and the active material. Further, the all-solid state secondary battery in which the active material layer is formed on the collector with the inorganic solid electrolyte-containing composition according to the embodiment of the present invention exhibits strong adhesiveness between the collector and the active material, and it is possible to realize the further improvement of the cycle characteristics and the conductivity.

The inorganic solid electrolyte-containing composition according to the embodiment of the present invention is preferably used as a material (a constitutional layer forming material) for forming a solid electrolyte layer or an active material layer, where the material is for a sheet for an all-solid state secondary battery (including an electrode sheet for an all-solid state secondary battery) or an all-solid state secondary battery. In particular, it can be preferably used as a material for forming a solid electrolyte sheet for an all-solid state secondary battery or a solid electrolyte layer, in which the content of the inorganic solid electrolyte in the solid content is increased, and high cycle characteristics can be achieved in this aspect as well.

The viscosity of the inorganic solid electrolyte-containing composition according to the embodiment of the present invention at 25° C. (room temperature) is not particularly limited. The viscosity at 25° C. is preferably 200 to 15,000 cP, more preferably 200 to 8,000 cP, and still more preferably 400 to 6,000 cP, in terms of improving the dispersion characteristics and application suitability.

The viscosity of the inorganic solid electrolyte-containing composition can be appropriately set, for example, by changing or adjusting the solid content concentration of the inorganic solid electrolyte-containing composition, the kind or content of the solid particle or the dispersing agent, the kind of the dispersion medium, and the like, and moreover, the dispersion conditions.

(Measuring Method for Slurry Viscosity)

A value measured according to the following method is employed as the viscosity of the inorganic solid electrolyte-containing composition.

Specifically, using an E-type viscometer (TV-35, manufactured by TOKI SANGYO Co., Ltd.) and a standard cone rotor (1"34'×R24), 1.1 mL of a sample (an inorganic solid electrolyte-containing composition) is applied to a sample cup adjusted to a 25° C., set the sample cup in the main body, and maintained for 5 minutes until the temperature becomes constant. Then, the measurement range is set to "U", and a value obtained by measuring at a shear rate of 10/s (rotation speed: 2.5 rpm) one minute after the start of rotation is defined as the viscosity.

The inorganic solid electrolyte-containing composition according to the embodiment of the present invention is preferably a non-aqueous composition. In the present invention, the non-aqueous composition includes not only an aspect including no watery moisture but also an aspect where the moisture content (also referred to as the "watery moisture content") is preferably 500 ppm or less. In the non-aqueous composition, the moisture content is more preferably 200 ppm or less, still more preferably 100 ppm or less, and particularly preferably 50 ppm or less. In a case where the inorganic solid electrolyte-containing composition is a non-aqueous composition, it is possible to suppress the deterioration of the inorganic solid electrolyte. The water content refers to the water amount (the mass proportion to the inorganic solid electrolyte-containing composition) in the inorganic solid electrolyte-containing composition, and specifically, it is a value measured by carrying out filtration through a 0.02 μm membrane filter and then Karl Fischer titration.

The inorganic solid electrolyte-containing composition according to the aspect of the present invention includes an aspect containing not only an inorganic solid electrolyte, a dispersing agent, and a dispersion medium but also an active material, as well as a conductive auxiliary agent or the like (the composition in this aspect may be referred to as the "electrode composition").

Hereinafter, components that are contained and components that can be contained in the inorganic solid electrolyte-containing composition according to the embodiment of the present invention will be described.

<Inorganic Solid Electrolyte>

The inorganic solid electrolyte-containing composition according to the embodiment of the present invention contains an inorganic solid electrolyte (it is also referred to as inorganic solid electrolyte particles in a case of having a particle shape).

In the present invention, the inorganic solid electrolyte is an inorganic solid electrolyte, where the solid electrolyte refers to a solid-form electrolyte capable of migrating ions therein. The inorganic solid electrolyte is clearly distinguished from the organic solid electrolyte (the polymeric electrolyte such as polyethylene oxide (PEO) or the organic electrolyte salt such as lithium bis(trifluoromethanesulfonyl) imide (LiTFSI)) since it does not include any organic substance as a principal ion-conductive material. In addition, the inorganic solid electrolyte is solid in a steady state and thus, typically, is not dissociated or liberated into cations and anions. Due to this fact, the inorganic solid electrolyte is also clearly distinguished from inorganic electrolyte salts of which cations and anions are dissociated or liberated in electrolytic solutions or polymers ($LiPF_6$, $LiBF_4$, lithium bis(fluorosulfonyl)imide (LiFSI), LiCl, and the like). The inorganic solid electrolyte is not particularly limited as long as it has an ion conductivity of a metal belonging to Group 1 or Group 2 in the periodic table and generally does not have electron conductivity. In a case where the all-solid state secondary battery according to the embodiment of the present invention is a lithium ion battery, the inorganic solid electrolyte preferably has a lithium ion conductivity.

As the inorganic solid electrolyte, a solid electrolyte material that is typically used for an all-solid state secondary battery can be appropriately selected and used. Examples of the inorganic solid electrolyte include (i) a sulfide-based inorganic solid electrolyte, (ii) an oxide-based inorganic solid electrolyte, (iii) a halide-based inorganic solid electrolyte, and (iv) a hydride-based inorganic solid electrolyte. The sulfide-based inorganic solid electrolytes are preferably used from the viewpoint that it is possible to form a more favorable interface between the active material and the inorganic solid electrolyte.

(i) Sulfide-Based Inorganic Solid Electrolyte

The sulfide-based inorganic solid electrolyte is preferably an electrolyte that contains a sulfur atom, has an ion conductivity of a metal belonging to Group 1 or Group 2 in the periodic table, and has electron-insulating properties. The sulfide-based inorganic solid electrolytes are preferably inorganic solid electrolytes which, as elements, contain at least Li, S, and P and have a lithium ion conductivity, but the sulfide-based inorganic solid electrolytes may also include elements other than Li, S, and P depending on the purposes or cases.

Examples of the sulfide-based inorganic solid electrolyte include a lithium ion-conductive inorganic solid electrolyte satisfying the composition represented by Formula (51).

$$L_{a1}M_{b1}P_{c1}S_{d1}A_{e1} \quad (S1)$$

In the formula, L represents an element selected from Li, Na, or K and is preferably Li. M represents an element selected from B, Zn, Sn, Si, Cu, Ga, Sb, Al, or Ge. A represents an element selected from I, Br, Cl, or F. a1 to e1 represent the compositional ratios between the respective elements, and a1:b1:c1:d1:e1 satisfies 1 to 12:0 to 5:1:2 to 12:0 to 10. a1 is preferably 1 to 9 and more preferably 1.5 to 7.5. b1 is preferably 0 to 3 and more preferably 0 to 1. d1 is preferably 2.5 to 10 and more preferably 3.0 to 8.5. e1 is preferably 0 to 5 and more preferably 0 to 3.

The compositional ratios between the respective elements can be controlled by adjusting the amounts of raw material compounds blended to manufacture the sulfide-based inorganic solid electrolyte as described below.

The sulfide-based inorganic solid electrolytes may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolytes can be manufactured by a reaction of at least two or more raw materials of, for example, lithium sulfide ($Li_2S$), phosphorus sulfide (for example, diphosphorus pentasulfide ($P_2S_5$)), a phosphorus single body, a sulfur single body, sodium sulfide, hydrogen sulfide, lithium halides (for example, LiI, LiBr, and LiCl), or sulfides of an element represented by M (for example, $SiS_2$, SnS, and $GeS_2$).

The ratio of $Li_2S$ to $P_2S_5$ in Li—P—S-based glass and Li—P—S-based glass ceramic is preferably 60:40 to 90:10 and more preferably 68:32 to 78:22 in terms of the molar ratio, $Li_2S$:$P_2S_5$. In a case where the ratio between $Li_2S$ and $P_2S_5$ is set in the above-described range, it is possible to increase a lithium ion conductivity. Specifically, the lithium ion conductivity can be preferably set to $1\times10^{-4}$ S/cm or more and more preferably set to $1\times10^{-3}$ S/cm or more. The upper limit is not particularly limited but realistically $1\times10^{-1}$ S/cm or less.

As specific examples of the sulfide-based inorganic solid electrolytes, combination examples of raw materials will be described below. Examples thereof include $Li_2S$—$P_2S_5$, $Li_2S$—$P_2S_5$—LiCl, $Li_2S$—$P_2S_5$—$H_2S$, $Li_2S$—$P_2S_5$—$H_2S$—LiCl, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SiS_2$—LiCl, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$-$Ges_2$-$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$Li_4SiO_4$, $Li_2S$—$SiS_2$—$Li_3PO_4$, and $Li_{10}GeP_2S_{12}$. The mixing ratio between the individual raw materials does not matter. Examples of the method of synthesizing a sulfide-based inorganic solid electrolyte material using the above-described raw material compositions include an amorphization method. Examples of the amorphization method include a mechanical milling method, a solution method, and a melting quenching method. This because treatments at a normal temperature become possible, and it is possible to simplify manufacturing processes.

(ii) Oxide-Based Inorganic Solid Electrolyte

The oxide-based inorganic solid electrolyte is preferably an electrolyte that contains an oxygen atom, has an ion conductivity of a metal belonging to Group 1 or Group 2 in the periodic table, and has electron-insulating properties.

The ion conductivity of the oxide-based inorganic solid electrolyte is preferably $1\times10^{-6}$ S/cm or more, more preferably $5\times10^{-6}$ S/cm or more, and particularly preferably $1\times10^{-5}$ S/cm or more. The upper limit is not particularly limited; however, it is practically $1\times10^{-1}$ S/cm or less.

Specific examples of the compound include $Li_{xa}La_{ya}TiO_3$ (LLT) [xa satisfies $0.3\leq xa\leq0.7$, and ya satisfies $0.3\leq ya\leq0.7$]; $Li_{xb}La_{yb}Zr_{zb}M^{bb}_{mb}O_{nb}$ ($M^{bb}$ is one or more elements selected from Al, Mg, Ca, Sr, V, Nb, Ta, Ti, Ge, In, and Snxb satisfies $5\leq xb\leq10$, yb satisfies $1\leq yb\leq4$, zb satisfies $1\leq zb\leq4$, mb satisfies $0\leq mb\leq2$, and nb satisfies $5\leq nb\leq20$); $Li_{xc}B_{yc}M^{cc}_{zc}O_{nc}$ ($M^{cc}$ is one or more elements selected from C, S, Al, Si, Ga, Ge, In, and Sn, xc satisfies $0\leq xc\leq5$, yc satisfies $0\leq yc\leq1$, zc satisfies $0\leq zc\leq1$, and nc satisfies $0\leq nc\leq6$); $Li_{xd}(Al, Ga)_{yd}(Ti, Ge)_{zd}Si_{ad}P_{md}O_{nd}$ (xd satisfies $1\leq xd\leq3$, yd satisfies $0\leq yd\leq1$, zd satisfies $0\leq zd\leq2$, ad satisfies $0\leq ad\leq1$, md satisfies $1\leq md\leq7$, and nd satisfies $3\leq nd\leq13$); $Li_{(3-2xe)}M^{ee}_{xe}D^{ee}O$ (xe represents a number between 0 and 0.1, and $M^{ee}$ represents a divalent metal atom, $D^{ee}$ represents a halogen atom or a combination of two or more halogen atoms); $Li_{xf}Si_{yf}O_{zf}$ (xf satisfies $1\leq xf\leq5$, yf satisfies $0\leq yf\leq3$, zf satisfies $1\leq zf\leq10$); $Li_{xg}S_{yg}O_{zg}$ (xg satisfies $1\leq xg\leq3$, yg satisfies $0\leq yg\leq2$, zg satisfies $1\leq zg\leq10$); $Li_3BO_3$; $Li_3BO_3$—$Li_2SO_4$; $Li_2O$—$B_2O_3$—$P_2O_5$; $Li_2O$—$SiO_2$; $Li_6BaLa_2Ta_2O_{12}$; $Li_3PO_{(4-3/2w)}N_w$ (w satisfies w<1); $Li_{35}Zn_{0.25}GeO_4$ having a lithium super ionic conductor (LISICON)-type crystal structure; $La_{0.55}Li_{0.35}TiO_3$ having a perovskite-type crystal structure; $LiTi_2P_3O_{12}$ having a natrium super ionic conductor (NASICON)-type crystal structure; $Li_{1+xh+yh}(Al, Ga)_{xh}(Ti, Ge)_{2-xh}Si_{yh}P_{3-yh}O_{12}$ (xh satisfies $0\leq xh\leq1$, and yh satisfies $0\leq yh\leq1$); and $Li_7La_3Zr_2O_2$ (LLZ) having a garnet-type crystal structure.

In addition, a phosphorus compound containing Li, P, or O is also desirable. Examples thereof include lithium phosphate ($Li_3PO_4$); LiPON in which a part of oxygen atoms in lithium phosphate are substituted with a nitrogen atom; and $LiPOD^1$ ($D^1$ is preferably one or more elements selected from Ti, V, Cr, Mn, Fe, Co, Ni, Cu, Zr, Nb, Mo, Ru, Ag, Ta, W, Pt, and Au).

Further, it is also possible to preferably use $LiA^1ON$ ($A^1$ is one or more elements selected from Si, B, Ge, Al, C, and Ga).

(iii) Halide-Based Inorganic Solid Electrolyte

The halide-based inorganic solid electrolyte is preferably a compound that contains a halogen atom, has an ion conductivity of a metal belonging to Group 1 or Group 2 in the periodic table, and has electron-insulating properties.

The halide-based inorganic solid electrolyte is not particularly limited; however, examples thereof include LiCl, LiBr, LiI, and compounds such as $Li_3YBr_6$ or $Li_3YCl_6$ described in ADVANCED MATERIALS, 2018, 30, 1803075. In particular, $Li_3YBr_6$ or $Li_3YCl_6$ is preferable.

(iv) Hydride-Based Inorganic Solid Electrolyte

The hydride-based inorganic solid electrolyte is preferably a compound that contains a hydrogen atom, has an ion conductivity of a metal belonging to Group 1 or Group 2 in the periodic table, and has electron-insulating properties.

The hydride-based inorganic solid electrolyte is not particularly limited; however, examples thereof include $LiBH_4$, $Li_4(BH_4)_3I$, and $3LiBH_4$—LiCl.

The inorganic solid electrolyte is preferably particulate. In this case, the particle diameter (the volume average particle diameter) of the inorganic solid electrolyte is not particularly limited; however, it is preferably 0.01 μm or more and more preferably 0.1 μm or more. The upper limit is preferably 100 μm or less and more preferably 50 μm or less.

The particle diameter of the inorganic solid electrolyte is measured according to the following procedure. Using water (heptane in a case where the inorganic solid electrolyte is unstable in water), the inorganic solid electrolyte particles are diluted in a 20 mL sample bottle to prepare 1% by mass of a dispersion liquid. The diluted dispersion liquid sample is irradiated with 1 kHz ultrasonic waves for 10 minutes and is then immediately used for testing. Data collection is carried out 50 times using this dispersion liquid sample, a laser diffraction/scattering-type particle size distribution analyzer LA-920 (product name, manufactured by Horiba Ltd.), and a quartz cell for measurement at a temperature of 25° C. to obtain the volume average particle diameter. Other detailed conditions and the like can be found in Japanese Industrial Standards (JIS) Z8828: 2013 "particle diameter Analysis-Dynamic Light Scattering" as necessary. Five samples per level are produced and measured, and the average values thereof are employed.

The inorganic solid electrolyte-containing composition may contain one kind or two or more kinds of inorganic solid electrolytes.

In a case of forming a solid electrolyte layer, the mass (mg) (mass per unit area) of the inorganic solid electrolyte per unit area ($cm^2$) of the solid electrolyte layer is not particularly limited. It can be appropriately determined according to the designed battery capacity and can be set to, for example, 1 to 100 $mg/cm^2$.

However, in a case where the inorganic solid electrolyte-containing composition contains an active material described later, the mass per unit area of the inorganic solid electrolyte is preferably such that the total amount of the active material and the inorganic solid electrolyte is in the above range.

The content of the inorganic solid electrolyte in the inorganic solid electrolyte-containing composition is not particularly limited. However, from the viewpoints of the reduction of dispersion characteristics and the application suitability, it is preferably 50% by mass or more, more preferably 70% by mass or more, and still more preferably 90% by mass or more, with respect to 100% by mass of the solid content. From the same viewpoint, the upper limit thereof is preferably 99.9% by mass or less, more preferably 99.5% by mass or less, and particularly preferably 99% by mass or less.

However, in a case where the inorganic solid electrolyte-containing composition contains an active material described later, regarding the content of the inorganic solid electrolyte in the inorganic solid electrolyte-containing composition described above, the total content of the active material and the inorganic solid electrolyte is preferably in the above-described range.

<Dispersing Agent>

The inorganic solid electrolyte-containing composition according to the embodiment of the present invention contains a dispersing agent that satisfies all of the definitions of (1) to (3) below.

The above-described dispersing agent may be any chemical substance (a chemical substance exhibiting a dispersing action) that can disperse solid form particles (dispersoids) such as an inorganic solid electrolyte, an active material, and a conductive auxiliary agent in a dispersion medium described later and stabilize a dispersion state. In the inorganic solid electrolyte-containing composition according to the embodiment of the present invention, in a case where the dispersing agent is used in combination with solid particles of the inorganic solid electrolyte or the like, it is possible to improve the dispersion characteristics and the application suitability of the inorganic solid electrolyte-containing composition (the slurry).

It is noted that the dispersing agent may be a polymer (which may be any polymer and includes an oligomer) or may be a compound (which is not a polymer, and hereinafter, also referred to as a low-molecular-weight compound) which is not a polymer as long as the dispersing agent satisfies all the definitions of (1) to (3) below. In the present invention, the dispersing agent is preferably a low-molecular-weight compound from the viewpoint that it can be uniformly adsorbed to the inorganic solid electrolyte and can more effectively suppresses the mutual aggregation of the inorganic solid electrolytes to further increase the dispersion characteristics and the application suitability of the inorganic solid electrolyte-containing composition.

Definition (1): SP Value

In the present invention, the SP value of the dispersing agent (a chemical substance exhibiting a dispersing action) is 17.0 to 22.0 $MPa^{1/2}$. This causes the molecular chain to spread around solid particles such as the inorganic solid electrolyte and makes it possible to disperse the solid particles in a state where the dispersing agent is present, whereby the dispersion characteristics and the application suitability of the inorganic solid electrolyte-containing composition can be improved. From the viewpoint of causing the molecular chain to further spread around solid particles, causing the solid particles to be dispersed in a state where the dispersing agent is present, and further improving dispersion characteristics and application suitability, the SP value of the dispersing agent is preferably 17.0 to 21.0 $MPa^{1/2}$ and more preferably 18.0 to 20.0 $MPa^{1/2}$. The difference (in terms of absolute value) in SP value between the dispersing agent and the dispersion medium will be described later.

In the case where the dispersing agent is a polymer, the SP value shall be a value according to the calculation methods of (1) and (2) below, and in a case where the dispersing agent is a low-molecular-weight compound, the SP value shall be a value calculated according to the following Hoy method, the unit of which is converted to $MPa^{1/2}$.

(1) The SP Value of the Constitutional Unit is Calculated.

First, in the polymer, a constitutional unit of which the SP value is specified is determined.

That is, in the present invention, in a case where the SP value of the polymer is calculated, a constitutional unit that is the same as that of the constitutional component derived from the raw material compound is adopted in a case where the polymer (the segment) is adopted a chain polymerization polymer. However, in a case where the polymer is a sequential polymerization (polycondensation, polyaddition, or addition condensation) polymer such as polyurethane, polyurea, polyamide, polyimide, or polyester, a unit different from the constitutional component derived from the raw material compound is adopted. For example, in a case where polyurethane is exemplified as a sequential polymerization polymer, a constitutional unit of which the SP value is defined as follows. As a constitutional unit derived from a polyisocyanate compound, a unit (a unit having one urethane bond) obtained by bonding an —O— group in the constitutional component derived from the polyisocyanate compound, to one —NH—CO— group and removing therefrom the remaining —NH—CO— group is adopted. On the other hand, as a constitutional unit derived from a polyol compound, a unit (a unit having one urethane bond) obtained by bonding an —CO—NH— group in the constitutional component derived from the polyol compound, to one —O— group and removing therefrom the remaining —O— group is adopted. It is noted that in a case of other sequential polymerization polymers as well, the constitutional unit is determined in the same manner as in the case of polyurethane.

Next, the SP value for each constitutional unit is determined according to the Hoy method unless otherwise specified (see the following expressions, also shown in Table 5, Table 6, and the following formula in Table 6 in H. L. Hoy JOURNAL OF PAINT TECHNOLOGY, Vol. 42, No. 541, 1970, 76-118, and POLYMER HANDBOOK 4th, Chapter 59, VII, page 686).

$$\delta_t = \frac{F_t + \frac{B}{\bar{n}}}{V}; B = 277$$

In the expression, $\delta_t$ indicates an SP value. $F_t$ is a molar attraction function $(J\times cm^3)^{1/2}/mol$ and represented by the following expression. V is a molar volume ($cm^3/mol$) and represented by the following expression. $\bar{n}$ is represented by the following expression.

$$F_t = \sum n_i F_{t,i} \quad V = \sum n_i V_i$$

$$\bar{n} = \frac{0.5}{\Delta_T^{(P)}} \quad \Delta_T^{(P)} = \sum n_i \Delta_{T,i}^{(P)}$$

In the above formula, $F_{t,i}$ indicates a molar attraction function of each constitutional unit, $V_i$ indicates a molar volume of each constitutional unit. $\Delta^{(P)}{}_{T,i}$ indicates a correction value of each constitutional unit, and $n_i$ indicates the number of each constitutional unit.

(2) SP Value of Polymer

It is calculated from the following expression using the constitutional unit determined as described above and the determined SP value. It is noted that the SP value of the constitutional unit obtained according to the above document is converted into an SP value ($MPa^{1/2}$) (for example, 1 $cal^{1/2}$ $cm^{-3/2}\approx 2.05$ $J^{1/2}cm^{-3/2}\approx 2.05$ $MPa^{1/2}$) and used.

$$SP_p^2=(SP_1^2\times W_1)+(SP_2^2\times W_2)+ \ldots$$

In the expression, $SP_1$, $SP_2$ indicates the SP values of the constitutional units, and $W_1$, $W_2$ . . . indicates the mass fractions of the constitutional units.

In the present invention, the mass fraction of a constitutional unit shall be a mass fraction of a constitutional component (a raw material compound from which this constitutional component is derived) in the polymer, corresponding to the constitutional unit.

The SP value of the polymer can be adjusted depending on the kind or the composition (the kind and the content of the constitutional component) of the polymer.

In the present invention, the SP value of the polymer is calculated according to the above-described expression for all constitutional units. In a case where the polymer contains a constitutional component derived from a macromonomer, an SP value (excluding a macromonomer (MM)) calculated according to the above-described expression can be adopted, where a constitutional unit corresponding to the constitutional component derived from the macromonomer (MM) is excluded for this SP value. According to the SP value (excluding MM) calculated in this way, the dispersion characteristics can be further improved. The SP value (excluding MM) can be set in the same range as the SP value described above; however, it is preferably 13.0 to 22.5 $MPa^{1/2}$, more preferably 16.0 to 21.0 $MPa^{1/2}$, and still more preferably 17.5 to 20.5 $MPa^{1/2}$.

Definition (2): Molecular Weight

In the present invention, the molecular weight of the dispersing agent is 10,000 or less. This allows solid particles to be dispersed in a dispersion medium in a state where a dispersing agent is evenly present around solid particles such as the inorganic solid electrolyte, whereby the dispersion characteristics and the application suitability of the inorganic solid electrolyte-containing composition can be improved. In addition, from the viewpoint of causing a dispersing agent to function as a binder that binds solid particles such as the inorganic solid electrolyte in a layer formed of the inorganic solid electrolyte-containing composition according to the embodiment of the present invention, the molecular weight of the dispersing agent is preferably 150 or more.

In a case where the dispersing agent is a polymer, the molecular weight of the dispersing agent means a mass average molecular weight of the polymer, which is measured according to the following method.

From the viewpoint of dispersing solid particles in a dispersion medium to further improve dispersion characteristics and application suitability in a state where a dispersing agent is more evenly present around the solid particles, the molecular weight of the dispersing agent is preferably 150 to 8,000, more preferably 180 to 6,000, still more preferably 200 to 5,000, and particularly preferably 230 to 4,000. The upper limit value of the molecular weight of the dispersing agent is preferably 2,000 or less, more preferably 1,000 or less, and still more preferably 500 or less.

Measurement of Molecular Weight

In the present invention, unless specified otherwise, molecular weights of a polymer chain and a macromonomer refer to a mass average molecular weight in terms of standard polystyrene conversion, which is determined according to gel permeation chromatography (GPC). The measurement method thereof includes, basically, a method in which conditions are set to Conditions 1 or Conditions 2 (preferential) described below. However, depending on the kind of polymer or macromonomer, an appropriate eluent may be suitably selected and used.

(Condition 1)

Column: Connect two TOSOH TSKgel Super AWM-H (product name, manufactured by Tosoh Corporation)
Carrier: 10 mM LiBr/N-methylpyrrolidone
Measurement temperature: 40° C.
Carrier flow rate: 1.0 ml/min
Sample concentration: 0.1% by mass
Detector: refractive indicator (RI) detector (Condition 2)

Column: A column obtained by connecting TOSOH TSKgel Super HZM-H, TOSOH TSKgel Super HZ4000, and TOSOH TSKgel Super HZ2000 (all of which are product names, manufactured by Tosoh Corporation)
Carrier: tetrahydrofuran
Measurement temperature: 40° C.
Carrier flow rate: 1.0 ml/min
Sample concentration: 0.1% by mass
Detector: refractive indicator (RI) detector Definition (3): Adsorption Rate In the present invention, the adsorption rate (%) of a dispersing agent is a value measured by using an inorganic solid electrolyte and a specific dispersion medium contained in the inorganic solid electrolyte-containing composition, and it is an indicator that indicates the degree of adsorption of a dispersing agent to an inorganic solid electrolyte in this dispersion medium. Here, the adsorption of the dispersing agent with respect to the inorganic solid electrolyte includes not only physical adsorption but also chemical adsorption (adsorption by chemical bond formation, adsorption by transfer of electrons, or the like).

In a case where the inorganic solid electrolyte-containing composition contains a plurality of kinds of inorganic solid electrolytes, the adsorption rate is defined as an adsorption rate with respect to the inorganic solid electrolyte having the same composition (kind and content) as the composition of the inorganic solid electrolyte in the inorganic solid electrolyte-containing composition. Similarly, in a case where the inorganic solid electrolyte-containing composition contains a plurality of kinds of specific dispersion media, the adsorption rate is measured by using a dispersion medium having the same composition (the kind and the content) as the specific dispersion media in the inorganic solid electrolyte-containing composition. In addition, also in a case where a plurality of kinds of dispersing agents are used, the adsorption rate is an adsorption rate in the case where the plurality of kinds of dispersing agents are used.

In the present invention, the adsorption rate of the dispersing agent is a value calculated according to the method described in Examples.

The adsorption rate of the dispersing agent is 2% or more. In a case where the dispersing agent exhibits the above-described adsorption rate, solid particles such as the inorganic solid electrolyte can be dispersed in a dispersion medium in a state where a dispersing agent is adsorbed to the solid particles, whereby the dispersion characteristics and the application suitability of the inorganic solid electrolyte-containing composition can be improved. The adsorption rate is preferably 20% or more, more preferably 40% or more, still more preferably 60% or more, and particularly preferably 70% or more, in that both dispersion characteristics and application suitability can be achieved at a higher level. On the other hand, the upper limit of the adsorption rate is not particularly limited; however, it is practically 90% or less. From the viewpoint of suppressing excessive adsorption to solid particles, the upper limit of the adsorption rate is preferably 95% or less, more preferably 90% or less, and still more preferably 85% or less.

In the present invention, the adsorption rate with respect to the inorganic solid electrolyte is appropriately set depending on the characteristics (for example, the mass average molecular weight) of the dispersing agent, the kind or content of the functional group contained in the dispersing agent, the form (the amount dissolved in the dispersion medium) of the dispersing agent.

In a case where the inorganic solid electrolyte-containing composition according to the embodiment of the present invention contains an active material described later (in a case where an active material layer is formed of the inorganic solid electrolyte-containing composition), the adsorption rate of the dispersing agent to the active material is not particularly limited; however, it is preferably 90% or less, more preferably 0.1% to 60%, and still more preferably 1% to 30% in terms of the dispersion characteristics and the application suitability of the inorganic solid electrolyte-containing composition and the reinforcement of the binding property of solid particles. In the present invention, the adsorption rate of a dispersing agent with respect to an active material is a value measured by using an active material and a dispersion medium, which are contained in the inorganic solid electrolyte-containing composition, and it is an indicator that indicates the degree of adsorption of a dispersing agent to an active material in this dispersion medium. Here, the adsorption of the dispersing agent to the active material includes not only physical adsorption but also chemical adsorption (adsorption by chemical bond formation, adsorption by transfer of electrons, or the like).

As a result, in a case where the inorganic solid electrolyte-containing composition contains a plurality of kinds of active materials, in a case where it contains a plurality of kinds of specific dispersion media, as well as in a case where a plurality of kinds of dispersing agents are used, the adsorption rate is the same as that of the dispersing agent with respect to the inorganic solid electrolyte, described above. In the present invention, the adsorption rate of the dispersing agent with respect to the active material shall be a value calculated in the same manner as the method in [Measurement of adsorption rate of dispersing agent with respect to inorganic solid electrolyte] described in Example, except that an active material is used instead of the inorganic solid electrolyte. In the present invention, the adsorption rate with respect to the active material can be appropriately set in the same manner as the adsorption rate with respect to the inorganic solid electrolyte.

The dispersing agent preferably contains a functional group selected from the following group (a) of functional groups. In a case where the dispersing agent contains a functional group selected from the following group (a) of functional groups, this functional group functions as an adsorbing group, and the adsorption rate with respect to the inorganic solid electrolyte can be improved.

In a case where two or more kinds of dispersing agents are contained, it is preferable that at least one kind of dispersing agent contains this functional group, where one of the preferred aspects thereof is also an aspect in which all the dispersing agents contain this functional group.

In a case where the dispersing agent is a polymer, it is preferable that a constitutional component of the polymer contains a functional group selected from the following group (a) of functional groups. The constitutional component having a functional group has a function of improving the adsorption rate of the dispersing agent with respect to the inorganic solid electrolyte and may be any constitutional component that forms the polymer. The functional group may be incorporated into the main chain or the side chain of the polymer. In the case of being incorporated into the side chain, the functional group may be directly bonded to the main chain or may be bonded through a linking group. The linking group is not particularly limited, and examples thereof include the linking group described in the group (b) of functional groups described later. The functional group contained in one constitutional component may be one kind or two or more kinds, and in a case where two or more kinds are contained, they may be or may not be bonded to each other.

<Group (a) of Functional Groups>

A hydroxy group, an amino group ($—N(R^A)_2$), a carboxy group, a sulfo group, a phosphate group, a phosphonate group, a sulfanyl group, an amide group (—CO—NR—), a heterocyclic group, and an aryl group Each of the amino group, the sulfo group ($—SO_2(OH)$), the phosphate group ($—OPO(OH)_2$), the heterocyclic group, and the aryl group, which are included in the group (a) of functional groups, is not particularly limited; however, it has the same meaning as the corresponding group of the substituent Z described later. However, $R^A$ in the amino group represents a hydrogen atom or an alkyl group, and the number of carbon atoms in the alkyl group in $R^A$ is more preferably 1 to 12, still more preferably 1 to 6, and particularly preferably 1 or 2. The phosphonate group ($—PO(OR)_2$) is not particularly limited; however, examples thereof include a phosphonate group having 0 to 20 carbon atoms.

In a case where an amino group or the like is included in a ring structure, it is classified as a heterocyclic ring. The number of carbon atoms in the aryl group is preferably 6 to 13 and more preferably 6 to 10. R in the amide group and the phosphonate group represents a hydrogen atom or an alkyl group, and the number of carbon atoms in the alkyl group as R is preferably 1 to 20, more preferably 1 to 12, and still more preferably 1 to 6.

However, the hydroxy group, the amino group, the carboxy group, the sulfo group, the phosphate group, the phosphonate group, and the sulfanyl group do not form a salt.

The functional group contained in the dispersing agent is preferably a hydroxy group, an amino group, a carboxy group, a sulfo group, a phosphate group, a phosphonate group, an amide group, or an aryl group, and it is more preferably a hydroxy group, an amino group, a carboxy group, an amide group, or an aryl group.

In a case where the dispersing agent is a polymer, preferred examples of the polymer constitutional component having the above-described functional group include a constitutional component having at least one of a carboxy group or an aryl group, and more preferred examples thereof include a constitutional component derived from styrene and an anhydrous carboxylic acid. More preferable examples thereof include a constitutional component obtained by subjecting a cyclic acid anhydride structure in a constitutional component derived from carboxylic acid anhydride (preferably maleic acid anhydride), to ring opening with an alcohol such as methanol or ethanol.

In a case where the dispersing agent is a polymer, examples of other constitutional components which may be contained in addition to the polymer constitutional component having the above-described functional group include constitutional components derived from compounds having a carbon-carbon double bond, and preferred examples thereof include a constitutional component derived from any one of a hydrocarbon-based compound such as (meth)acrylonitrile, a (meth)acrylic acid ester compound, ethylene, propylene, isoprene, or butadiene.

The number of functional groups in the dispersing agent is not particularly limited as long as the effect of the present invention is exhibited.

In a case where the dispersing agent is a low-molecular-weight compound, the number of low-molecular-weight compounds is preferably one or more and more preferably one. It is noted that in a case where a hydroxy group, an amino group, a carboxy group, a sulfo group, a phosphate group, a phosphonate group, a sulfanyl group, or an amide group as the group (a) of functional groups is directly contained as a substituent on a heterocyclic group or an aryl group, the number of functional groups shall be calculated as one. For example, in an exemplary compound C-7 described later, the compound has a hydroxy group directly on the phenyl group, and thus the number of the functional groups is one.

In a case where the dispersing agent is a polymer, the content of the constitutional component having the functional group in the polymer is not particularly limited as long as the adsorption rate of the dispersing agent with respect to the inorganic solid electrolyte can be set to 2% or more.

The content of the constitutional component having the functional group in the polymer is preferably 0.01% to 80% by mole, more preferably 0.01% to 70% by mole, still more preferably 0.1% to 50% by mole, and particularly preferably 0.3% to 50% by mole, in terms of the binding property of solid particles. The lower limit value of the content can be set to 5% by mole or more or 20% by mole or more.

In a case where two or more kinds of dispersing agents are contained, it is preferable that all the dispersing agents each satisfy the above-described number of functional groups in the molecule or the content of the polymer constitutional component having a functional group.

In a case where the dispersing agent is a low-molecular-weight compound, the dispersing agent is preferably a compound represented by any one of (1) $R^X$-$A^1$, (2) $R^Y$-$A^2$, or (3) H-$A^3$, more preferably a compound represented by any one of (1) $R^X$-$A^1$ or (2) $R^Y$-$A^2$, and still more preferably a compound represented by (1) $R^X$-$A^1$.

In (1) to (3) described above, $R^X$ represents an alkyl group, $R^Y$ represents an unsubstituted aryl group, and $A^1$ to $A^3$ represent the above-described functional group selected from the group (a) of functional groups.

(Compound of (1) Described Above)

The alkyl group as $R^X$ may be unsubstituted or may have a substituent. Examples of the substituent which may be contained in the alkyl group as $R^X$ include an alkenyl group and a halogen atom (preferably a fluorine atom). The number of carbon atoms (the total number of carbon atoms including the substituent which may be contained) of the alkyl group as $R^X$ is preferably 1 to 20, more preferably 1 to 16, still more preferably 3 to 16, and particularly preferably 8 to 16.

The above-described functional group selected from the group (a) of functional groups, as $A^1$, is preferably an amino group (—N($R^A$)$_2$), a carboxy group, a sulfo group, a phosphate group, a phosphonate group, or an amide group (—CO—NR—), or an aryl group, and it is more preferably an amino group, a carboxy group, an amide group, or an aryl group. $R^A$ in the amino group and R in the amide group respectively have the same meanings as $R^A$ and R in the group (a) of functional groups described above, and among the above, an alkyl group is preferable, and an alkyl group having 1 to 12 carbon atoms is more preferable.

In addition, in a case where $A^1$ is an aryl group, this aryl group may be unsubstituted or may have a substituent, and it is preferably an unsubstituted or substituted phenyl group. The substituent which may be contained in the aryl group as $A^1$ is preferably the above-described functional group selected from the group (a) of functional groups, more preferably a hydroxy group, an amino group, a carboxy group, a sulfo group, a phosphate group, a phosphonate group, or a sulfanyl group, and still more preferably a hydroxy group, an amino group, a carboxy group, or a sulfanyl group.

From the viewpoint of further improving dispersion characteristics and application suitability, $A^1$ is preferably an aryl group and more preferably an aryl group having the above-described functional group selected from the group (a) of functional groups, as a substituent.

(The Compound of (2) Described Above)

The unsubstituted aryl group as $R^Y$ is preferably a phenyl group.

$A^2$ is the above-described functional group selected from the group (a) of functional groups, and the description related to $A^2$ described above can be applied thereto.

(The Compound of (3) Described Above)

The above-described functional group selected from the group (a) of functional groups, as $A^3$, is preferably a carboxy group.

Specific examples of the dispersing agent include compounds or polymers shown below; however, the present invention is not limited thereto. In the specific example of the polymer, the number attached at the bottom right of the constitutional component indicates the content in the polymer, where the unit thereof is % by mole.

C-2
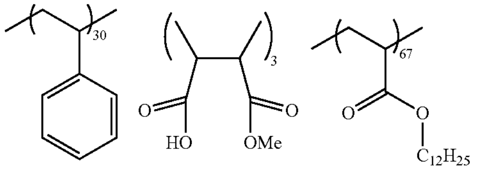
C-5
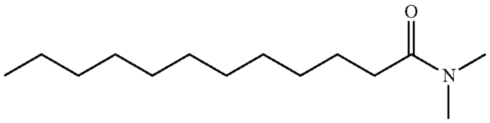
C-6
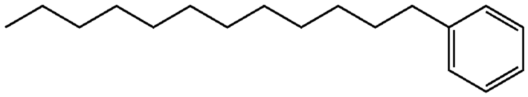
C-7
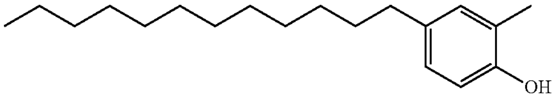
C-8
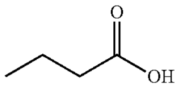
C-11
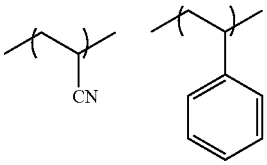
C-12
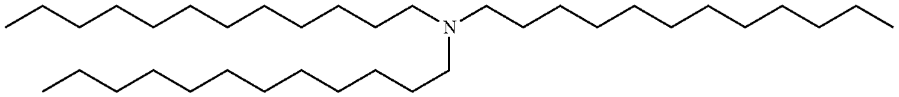
C-13
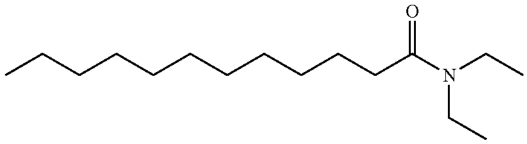
C-14
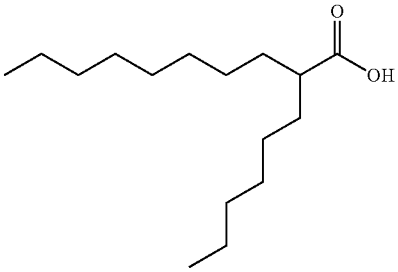
C-15
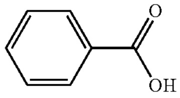
C-16
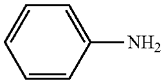
C-17
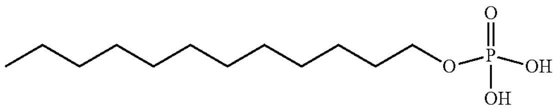
C-18
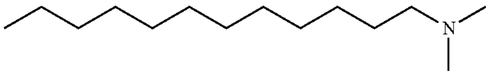
C-19
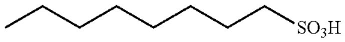
C-20
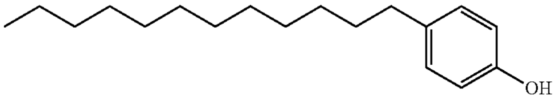
C-21
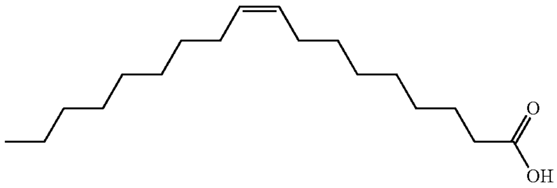
C-22
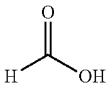
C-23
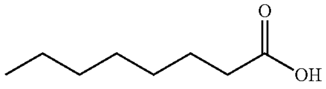
C-24
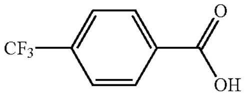

-continued

C-25

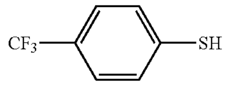

The inorganic solid electrolyte-containing composition according to the embodiment of the present invention may contain one kind of dispersing agent or may contain a plurality of kinds of dispersing agents.

The dispersing agent may be soluble or insoluble in the dispersion medium contained in the inorganic solid electrolyte-containing composition; however, it is preferably dissolved in the dispersion medium. In a case where two or more kinds of dispersing agents are contained, it is preferable that at least one kind of dispersing agent is soluble, and it is also preferable that all the dispersing agents are soluble.

In the present invention, the description that a dispersing agent is dissolved in a dispersion medium means that a dispersing agent is dissolved in a dispersion medium of the inorganic solid electrolyte-containing composition, and for example, it means that the solubility is 10% by mass or more in the solubility measurement. The measuring method for solubility is as follows.

That is, a specified amount of a dispersing agent as a measurement target is weighed in a glass bottle, 100 g of a dispersion medium that is the same kind as the dispersion medium contained in the inorganic solid electrolyte-containing composition is added thereto, and stirring is carried out at a temperature of 25° C. on a mix rotor at a rotation speed of 80 rpm for 24 hours. After stirring for 24 hours, the obtained mixed solution is subjected to the transmittance measurement under the following conditions. This test (the transmittance measurement) is carried out by changing the amount of the dispersing agent dissolved (the above-described specified amount), and the upper limit concentration X (% by mass) at which the transmittance is 99.8% is defined as the solubility of the dispersing agent in the above dispersion medium.

<Transmittance Measurement Conditions>

Dynamic Light Scattering (DLS) Measurement

Device: DLS measuring device DLS-8000 manufactured by Otsuka Electronics Co., Ltd.

Laser wavelength, output: 488 nm/100 mW

Sample cell: NMR tube

The (total) content of the dispersing agent in the inorganic solid electrolyte-containing composition is not particularly limited. However, it is preferably 0.1% to 10.0% by mass, more preferably 0.2% to 5.0% by mass, and still more preferably 0.3% to 4.0% by mass, in that the dispersion characteristics and the application suitability are improved and furthermore, a firm binding property is exhibited. For the same reason, the (total) content of the dispersing agent in the inorganic solid electrolyte-containing composition (that is, the content of the dispersing agent in the inorganic solid electrolyte-containing composition) is preferably 0.1% to 10.0% by mass, more preferably 0.3% to 8.0% by mass, and still more preferably 0.5% to 7.0% by mass in 100% by mass of the solid content.

In a case where two or more kinds of dispersing agents are contained, the content of each dispersing agent is appropriately set within a range that satisfies the above (total) content.

It is noted that in a case where the dispersing agent is a polymer, the polymer has the following physical properties, characteristics, or the like.

The watery moisture concentration of the polymer is preferably 100 ppm (in terms of mass) or lower. Further, as this polymer, a polymer may be crystallized and dried, or a polymer solution may be used as it is.

The polymer is preferably amorphous. In the present invention, the description that a polymer is "amorphous" typically refers to that no endothermic peak due to crystal melting is observed when the measurement is carried out at the glass transition temperature.

<Polymer Binder>

It is preferable that the inorganic solid electrolyte-containing composition according to the embodiment of the present invention contains a polymer binder in addition to the dispersing agent from the viewpoint of further improving dispersion characteristics and application suitability. In a case where the dispersing agent and the polymer binder are used in combination, it is conceived that a synergistic effect between the effect of improving the dispersion characteristics and the application suitability due to the dispersing agent and the effect of improving the application suitability (adhesiveness) due to the polymer binder can be realized.

In a case where the inorganic solid electrolyte-containing composition according to the embodiment of the present invention contains a polymer binder, it is conceived that the dispersing agent having a molecular weight (mass average molecular weight) of 10,000 or less in the inorganic solid electrolyte-containing composition can be preferentially present around the inorganic solid electrolyte or the active material as compared with a polymer binder having a mass average molecular weight of more than 10,000 and can be adsorbed thereto. That is, even in a case where the dispersing agent and the polymer binder are present together in the composition, it is conceived that as described above, the dispersing agent satisfying (1) to (3) described above contributes to the improvement of the dispersion characteristics and the application suitability. On the other hand, it is conceived that the polymer binder further improves dispersion characteristics and application suitability of the dispersing agent that has been preferentially present around the inorganic solid electrolyte or the active material and has been adsorbed thereto, by further being present around the inorganic solid electrolyte or the active material and increasing dispersibility.

The polymer binder is not particularly limited as long as the effect of the present invention is exhibited; however, preferred examples thereof include a polymer binder consisting of a fluorine-based copolymer or an acrylonitrile polymer, which will be described later.

In this polymer binder (simply also referred to as a binder), the adsorption rate with respect to the inorganic solid electrolyte is preferably less than 60% in a dispersion medium described later, which is contained in the composition.

In the present invention, the adsorption rate of a binder is a value measured by using an inorganic solid electrolyte and a dispersion medium contained in the inorganic solid electrolyte-containing composition, and it is an indicator that indicates the degree of adsorption of a binder to an inorganic solid electrolyte in the dispersion medium. Here, the adsorption of the binder to the inorganic solid electrolyte includes not only physical adsorption but also chemical adsorption (adsorption by chemical bond formation, adsorption by transfer of electrons, or the like).

In a case where the inorganic solid electrolyte-containing composition contains a plurality of kinds of inorganic solid electrolytes, the adsorption rate is defined as an adsorption rate with respect to the inorganic solid electrolyte having the same composition (kind and content) as the composition of the inorganic solid electrolyte in the inorganic solid electrolyte-containing composition. Similarly, in a case where the inorganic solid electrolyte-containing composition contains a plurality of kinds of dispersion media, the adsorption rate is measured by using a dispersion medium having the same composition (the kind and the content) as the dispersion media in the inorganic solid electrolyte-containing composition. In addition, also in a case where a plurality of kinds of binders are used, the adsorption rate is an adsorption rate in the case where the plurality of kinds of binders are used.

In the present invention, the adsorption rate of the binder shall be a value calculated in the same manner as the method in [Measurement of adsorption rate of dispersing agent with respect to inorganic solid electrolyte] described in Example, except that a binder is used instead of the dispersing agent.

In a case where the adsorption rate of the polymer binder is less than 60%, it is possible to suppress the excessive adsorption to the inorganic solid electrolyte and improve the dispersion characteristics and the application suitability of the inorganic solid electrolyte-containing composition. The adsorption rate is preferably 50% or less, more preferably 40% or less, still more preferably 30% or less, and particularly preferably 20% or less, in that both dispersion characteristics and application suitability can be achieved at a higher level. In addition, it is also preferably set to 10% or less and more preferably less than 5%. On the other hand, the lower limit of the adsorption rate is not particularly limited and may be 0%. The lower limit of the adsorption rate is preferably small from the viewpoint of dispersion characteristics and application suitability; however, on the other hand, it is preferably more than 0%, more preferably 0.1% or more, and still more preferably 0.5% or more, from the viewpoint of improving the binding property of the inorganic solid electrolyte.

In the present invention, the adsorption rate with respect to the inorganic solid electrolyte is appropriately set depending on the characteristics (for example, the content of the constitutional component and the mass average molecular weight) of the polymer that forms the binder, the kind or content of the functional group contained in the polymer, the form of the binder (the amount dissolved in the dispersion medium).

The polymer binder may be soluble (a soluble type binder) or insoluble in the dispersion medium contained in the inorganic solid electrolyte-containing composition; however, it is preferably a soluble type binder dissolved in the dispersion medium. In the present invention, the description that the binder is dissolved in the dispersion medium means that the solubility is 80% by mass or more in the solubility measurement. The solubility shall be a value that is measured in the same manner as in the measuring method for the solubility, except that in the above-described measuring method for the solubility of the dispersing agent, a binder is used instead of the dispersing agent.

In a case where the inorganic solid electrolyte-containing composition according to the embodiment of the present invention contains an active material described later (in a case where an active material layer is formed of the inorganic solid electrolyte-containing composition), the adsorption rate of the polymer binder to the active material is not particularly limited; however, it is preferably 90% or less, more preferably 0.1% to 50%, and still more preferably 1% to 10% in terms of the dispersion characteristics and the application suitability of the inorganic solid electrolyte-containing composition and the reinforcement of the binding property of solid particles. In the present invention, the adsorption rate of a binder with respect to an active material is a value measured by using an active material and a dispersion medium, which are contained in the inorganic solid electrolyte-containing composition, and it is an indicator that indicates the degree of adsorption of a binder to an active material in the dispersion medium. Here, the adsorption of the binder to the active material includes not only physical adsorption but also chemical adsorption (adsorption by chemical bond formation, adsorption by transfer of electrons, or the like).

As a result, in a case where the inorganic solid electrolyte-containing composition contains a plurality of kinds of active materials, in a case where it contains a plurality of kinds of dispersion media, and further, in a case where a plurality of kinds of binders are used, the adsorption rate is the same as that of the binder with respect to the inorganic solid electrolyte, as described above. In the present invention, the adsorption rate of the binder with respect to the active material shall be a value calculated in the same manner as the method in [Measurement of adsorption rate of dispersing agent with respect to inorganic solid electrolyte] described in Example, except that a binder is used instead of the dispersing agent and an active material is used instead of the inorganic solid electrolyte. In the present invention, the adsorption rate with respect to the active material can be appropriately set in the same manner as the adsorption rate with respect to the inorganic solid electrolyte.

(Fluorine-Based Copolymer (Polymer) that Constitutes Polymer Binder)

Preferred examples of the fluorine-based copolymer include a copolymer having a vinylidene fluoride (VDF) constitutional component and a hexafluoropropylene (HFP) constitutional component and include a copolymer (may be referred to as another constitutional component) further having a constitutional component derived from a polymerizable compound copolymerizable with VDF and HFP. For convenience, it is referred to as a "fluorine-based copolymer" in that another constitutional component like those above may be included.

The polymerizable compound copolymerizable with VDF and HFP is not particularly limited; however, examples thereof include a polymerizable compound having at least one carbon-carbon unsaturated bond. More specific examples thereof include a polymerizable compound containing a fluorine atom (a fluorine-containing polymerizable compound), a polymerizable compound which contains no fluorine atom, and a polymerizable compound having a functional group selected from the group (b) of functional groups described later.

The fluorine-based copolymer includes both an aspect in which a constitutional component derived from a fluorine-containing polymerizable compound is included and an aspect in which a constitutional component derived from a fluorine-containing polymerizable compound is not included; however, an aspect in which a vinylidene fluoride (VDF) constitutional component and a hexafluoropropylene (HFP) constitutional component are included but a constitutional component derived from a fluorine-containing polymerizable compound is not included is preferable.

The VDF constitutional component that forms the fluorine-based copolymer is a constitutional component derived from vinylidene fluoride, and it is represented by $-CF_2-CH_2-$. The HFP constitutional component is a constitutional component derived from hexafluoropropylene, and it is represented by, for example, $-CF_2-CF(CF_3)-$.

The constitutional component derived from the fluorine-containing polymerizable compound which may form the fluorine-based copolymer may be any constitutional component other than the VDF constitutional component and the HFP constitutional component, which is a constitutional component derived from the fluorine-containing polymerizable compound, and it is not particularly limited. The fluorine-containing polymerizable compound from which this constitutional component is derived is, for example, a compound having a fluorine atom that is directly bonded or indirectly (for example, via a linking group described later) bonded to a carbon-carbon unsaturated bond. The fluorine-containing polymerizable compound is not particularly limited; however, examples thereof include fluorinated vinyl compounds such as tetrafluoroethylene, trifluoroethylene, monofluoroethylene, and chlorotrifluoroethylene, and perfluoroalkyl ether compounds such as trifluoromethyl vinyl ether and pentafluoroethyl vinyl ether.

In addition, the fluorine-containing polymerizable compound includes a polymerizable compound (a macromonomer) having a polymerized chain that is directly or indirectly (for example, via a linking group described later) bonded to a carbon-carbon unsaturated bond. Examples thereof include a compound in which at least one hydrogen atom of the fluorine-containing polymerizable compound is substituted with a polymerized chain. The polymerized chain is not particularly limited, and a general polymer component can be applied. Examples thereof include a (meth)acrylic resin chain, a polyvinyl resin chain, a polysiloxane chain, a polyalkylene ether chain, and a hydrocarbon chain. An example of a fluorine-based copolymer having a constitutional component derived from a polymerizable compound having a polymerized chain is shown below. In the following copolymer, the number at the bottom right of each constitutional component indicates the content (% by mole) of the constitutional component in the copolymer.

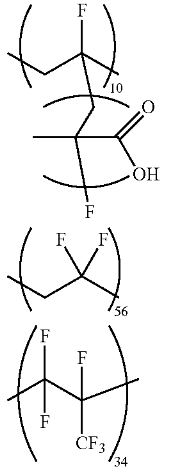

It suffices that the constitutional component derived from the polymerizable compound containing no fluorine atom is a constitutional component copolymerizable with vinylidene fluoride or hexafluoropropylene and it is a constitutional component derived from a compound that does not have a functional group selected from the group (b) of functional groups described later, which is not particularly limited. Examples of the polymerizable compound which contains no fluorine atom, from which this constitutional component is derived, include a polymerizable compound that is generally used for chain polymerization, and specific examples thereof include a vinyl compound and a diene compound.

It suffices that the constitutional component derived from a polymerizable compound having a functional group selected from the group (b) of functional groups is a constitutional component having the above-described functional group and is not particularly limited. Examples of the polymerizable compound having a functional group, from which this constitutional component is derived, include a polymerizable compound having the above-described functional group among the polymerizable compounds that are used in the chain polymerization, and specific examples thereof include a vinyl compound or a diene compound having the above-described functional group, details of which will be described later.

The VDF constitutional component and other constitutional components which form the fluorine-based copolymer may each have a substituent. The substituent is not particularly limited as long as it does not deviate from the category of each constitutional component, and examples thereof include a group selected from the substituent Z described later and a functional group selected from the group (b) of functional groups described later. In a case where the VDF constitutional component or the like has a functional group selected from the group (b) of functional groups, it is classified into the above-described "constitutional component derived from a polymerizable compound having a functional group".

The fluorine-based copolymer may be any of the block copolymer, the alternating copolymer, and the random copolymer of each of the above constitutional components; however, it is preferably the random copolymer in terms of solubility.

Such a fluorine-based copolymer may be appropriately synthesized, or a commercially available product may be used.

The fluorine-based copolymer that constitutes a polymer binder may be one kind or two or more kinds.

In the fluorine-based copolymer, the content of the HFP constitutional component (also referred to as the HFP amount) is preferably 10% to 70% by mole and more preferably 15% to 65% by mole of all the constitutional components that constitute the fluorine-based copolymer. This makes the action of the polymer binder consisting of the fluorine-based copolymer on the inorganic solid electrolyte weaker, whereby the adsorption rate can be reduced to less than 60%. Among the above, the upper limit of the HFP amount is more preferably 60% by mole or less, still more preferably 50% by mole or less, and particularly preferably 45% by mole or less, and among the above, it is preferably 40% by mole or less, in terms of improving dispersion characteristics and application suitability, and furthermore, enhancing the adhesiveness of the collector. On the other hand, the lower limit of the HFP amount is more preferably 15% by mole or more, still more preferably 20% by mole or more, and particularly preferably 30% by mole or more, and among the above, it is preferably 35% by mole or more, in terms of improving dispersion characteristics and application suitability as well as enhancing the adhesiveness of the collector. The HFP amount of the fluorine-based copolymer can be determined by measuring the nuclear magnetic resonance (NMR) spectrum of the copolymer (the NMR measurement method). The fluorine-based copolymer of the composition is measured using, for example, a fluorine-based copolymer extracted with tetrahydrofuran (THF). In addition, regarding the fluorine-based copolymer in the sheet for an all-solid state secondary battery or the constitutional layer of the all-solid state secondary battery, for example, the sheet or the battery is disassembled, the constitutional layer containing the polymer binder is peeled off to obtain a constitutional layer, and fluorine-based copolymer is extracted from the peeled constitutional layer with THF and measured.

In the fluorine-based copolymer, the content of the VDF constitutional component (also referred to as the VDF amount) is not particularly limited; however, it is preferably 30% to 90% by mole, more preferably 35% to 85% by mole, still more preferably 40% to 80% by mole, and particularly preferably 50% to 75% by mole of all the constitutional components that constitute the fluorine-based copolymer, in terms of improving dispersion characteristics and application suitability, and furthermore, enhancing the adhesiveness of the collector. The VDF amount can be measured according to the NMR measurement method using the fluorine-based copolymer extracted in the same manner as the measurement of the HFP amount.

In addition, in the fluorine-based copolymer, the ratio of the VDF amount to the HFP amount (the VDF amount/the HFP amount) is not particularly limited; however, it is preferably 0.5 to 5 and more preferably 1 to 3 in terms of improving dispersion characteristics and application suitability, and furthermore, enhancing the adhesiveness of the collector.

In the fluorine-based copolymer, the total content of the constitutional component derived from the copolymerizable polymerizable compound is not particularly limited; however, it can be, for example, 50% by mole or less.

Among the copolymerizable polymerizable compounds, the content of each of the constitutional component derived from the fluorine-containing polymerizable compound or the polymerizable compound which contains no fluorine atom is appropriately set within the range in which excellent dispersion characteristics and excellent application suitability are not impaired, in consideration of the adsorption rate or tensile fracture strain of the polymer binder, the binding force of solid particles, and the like. The content of the constitutional components derived from the fluorine-containing polymerizable compound is, for example, preferably 0% to 45% by mole and more preferably 2% to 40% by mole of all the constitutional components that constitute the fluorine-based copolymer. The content of the constitutional components derived from the polymerizable compound which contains no fluorine atom is, for example, preferably 0% to 30% by mole and more preferably 1% to 25% by mole of all the constitutional components that constitute the fluorine-based copolymer.

In a case where the fluorine-based copolymer has a constitutional component (a constitutional component having a functional group) derived from a polymerizable compound having a functional group selected from the group (b) of functional groups, the content thereof is appropriately determined in consideration of the adsorption rate or tensile fracture strain of the polymer binder, the binding force of the solid particles, and the like. For example, the content thereof is preferably 0.01% to 10% by mole, more preferably 0.01% to 5% by mole and still more preferably 0.02% to 2% by mole of all the constitutional components that constitute the fluorine-based copolymer, in that the binding force of solid particles as well as the adhesiveness to the collector can be further strengthened while maintaining excellent dispersion characteristics and excellent application suitability.

One of the preferred form of the fluorine-based copolymer is a form in which a constitutional component having a functional group selected from the above-described group (b) of functional groups (a constitutional component having a functional group) is contained. The constitutional component having a functional group has a function of improving the adsorption rate of the low adsorption binder with respect to the inorganic solid electrolyte. This constitutional component having a functional group includes a constitutional component derived from a polymerizable compound that constitutes a functional group as a copolymerizable compound, in addition to the constitutional component derived from the polymerizable compound having a functional group. Examples of the constitutional component derived from a polymerizable compound that constitutes a functional group include a constitutional component derived from a polymerizable carboxylic acid anhydride such as maleic acid anhydride.

The above-described functional group may be contained in any one of the constitutional components that form the fluorine-based copolymer; however, it is preferably contained in the constitutional component other than the VDF constitutional component, the HFP constitutional component, and the constitutional component derived from the polymerizable compound which contains no fluorine atom. The functional group may be incorporated into the main chain or the side chain of the polymer.

In the present invention, a main chain of the polymer refers to a linear molecular chain in which all the molecular chains that constitute the polymer other than the main chain can be conceived as a branched chain or a pendant with respect to the main chain. Although it depends on the mass average molecular weight of the molecular chain regarded as a branched chain or pendant chain, the longest chain among the molecular chains that constitute the polymer is typically the main chain. In this case, a terminal group at the polymer terminal is not included in the main chain. In addition, side chains of the polymer refer to molecular chains other than the main chain and include a short molecular chain and a long molecular chain.

<Group (b) of Functional Groups>

A hydroxy group, an amino group, a carboxy group, a sulfo group, a phosphate group, a phosphonate group (—PO$(OR)_2$), a sulfanyl group, an ether bond (—O—), an imino group (═NR, or —NR—), an ester bond (—CO—O—), an amide bond (—CO—NR—), a urethane bond (—NR—CO—O—), a urea bond (—NR—CO—NR—), a heterocyclic group, an aryl group, a carboxylic acid anhydride group, an isocyanate group (—NCO), and an alkoxysilyl group.

Each of the amino group, the sulfo group, the phosphate group the heterocyclic group, the aryl group, and the alkoxysilyl group, which are included in the group (b) of functional groups, is not particularly limited; however, it has the same meaning as the corresponding group of the substituent Z described later. However, the amino group more preferably has 0 to 12 carbon atoms, still more preferably 0 to 6 carbon atoms, and particularly preferably 0 to 2 carbon atoms. The phosphonate group is not particularly limited; however, examples thereof include a phosphonate group having 0 to 20 carbon atoms. The hydroxy group, the amino group, the carboxy group, the sulfo group, the phosphate group, the phosphonate group, or the sulfanyl group may form a salt. R in each bond represents a hydrogen atom or a substituent, and it is preferably a hydrogen atom. The substituent is not particularly limited. It is selected from a substituent Z described later, and an alkyl group is preferable.

The carboxylic acid anhydride group is not particularly limited; however, it includes a group obtained by removing one or more hydrogen atoms from a carboxylic acid anhydride (for example, a group represented by Formula (2a)), as well as a constitutional component itself (for example, a constitutional component represented by Formula (2b)) obtained by copolymerizing a polymerizable carboxylic acid anhydride as a copolymerizable compound. The group obtained by removing one or more hydrogen atoms from a carboxylic acid anhydride is preferably a group obtained by removing one or more hydrogen atoms from a cyclic carboxylic acid anhydride. The carboxylic acid anhydride group derived from a cyclic carboxylic acid anhydride also corresponds to a heterocyclic group; however, it is classified as a carboxylic acid anhydride group in the present invention. Examples thereof include acyclic carboxylic acid anhydrides such as acetic acid anhydride, propionic acid anhydride, and benzoic acid anhydride, and cyclic carboxylic acid anhydrides such as maleic acid anhydride, phthalic acid anhydride, fumaric acid anhydride, and succinic acid anhydride. The polymerizable carboxylic acid anhydride is not particularly limited; however, examples thereof include a carboxylic acid anhydride having an unsaturated bond in the molecule, and a polymerizable cyclic carboxylic acid anhydride is preferable. Specific examples thereof include maleic acid anhydride.

Examples of the carboxylic acid anhydride group include a group represented by Formula (2a) and a constitutional component represented by Formula (2b); however, the present invention is not limited thereto. In each of the formulae, * represents a bonding position.

(2a)

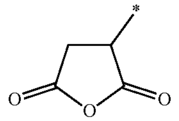

(2b)

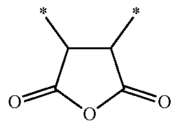

The functional group selected from the group (b) of functional groups is preferably a hydroxy group, a carboxy group, a phosphonate group, a heterocyclic group, or a carboxylic acid anhydride group, and it is more preferably a carboxylic acid anhydride group.

The method of incorporating a functional group into a polymer chain is not particularly limited, and examples thereof include a method of using a polymerizable compound having a functional group selected from the group (b) of functional groups as a copolymerizable polymerizable compound, a method of using a polymerization initiator having (generating) the above-described functional group or a chain transfer agent, and a method of using a polymeric reaction.

The polymerizable compound having the above-described functional group is not particularly limited; however, examples thereof include a polymerizable compound having at least one carbon-carbon unsaturated bond and at least one functional group described above. For example, it includes a compound in which a carbon-carbon unsaturated bond and the above-described functional group are directly bonded, a compound in which a carbon-carbon unsaturated bond and the above-described functional group are bonded through a linking group, as well as a compound (for example, the polymerizable cyclic carboxylic acid anhydride) in which the functional group itself contains a carbon-carbon unsaturated bond. A compound in which the functional group itself contains a carbon-carbon unsaturated bond is preferable, and maleic acid anhydride more preferable.

The carbon-carbon unsaturated bond is not particularly limited, and examples thereof include a vinyl group and a (meth)acryloyl group.

The linking group that links a carbon-carbon unsaturated bond and the functional group is not particularly limited; however, examples thereof include an alkylene group (preferably having 1 to 12 carbon atoms, more preferably 1 to 6 carbon atoms, and still more preferably having 1 to 3 carbon atoms), an alkenylene group (preferably having 2 to 6 carbon atoms and more preferably having 2 or 3 carbon atoms), an arylene group (preferably having 6 to 24 carbon atoms and more preferably having 6 to 10 carbon atoms), an oxygen atom, a sulfur atom, an imino group ($—NR^N—$), a carbonyl group, a phosphate linking group (—O—P(OH)(O)—O—), a phosphonate linking group (—P)(OH)(O)—O—), and a group involved in the combination thereof. It is also possible to form a polyalkyleneoxy chain by combining an alkylene group and an oxygen atom. The linking group is preferably a group obtained by combining at least two of an alkylene group, an arylene group, a carbonyl group, an oxygen atom, a sulfur atom, and an imino group, more preferably a group obtained by combining at least two of an alkylene group, an arylene group, a carbonyl group, an oxygen atom, and an imino group, still more preferably a group containing a —CO—O— group, a $—CO—N(R^N)—$ group ($R^N$ represents a hydrogen atom, an alkyl group having 1 to 6 carbon atoms or an aryl group having 6 to 10 carbon atoms), and particularly preferably a group obtained by combining a —CO—O— group or $—CO—N(R^N)—$ group with an alkylene group or polyalkyleneoxy chain. The linking group may have a group other than the functional group selected from the group (b) of functional groups. The number of atoms that constitute the linking group and the number of linking atoms are as described later. However, the above does not apply to the polyalkyleneoxy chain that constitutes the linking group. Examples of the group other than the above-described functional group include a substituent Z described later, and examples thereof include an alkyl group and a halogen atom.

In the present invention, the number of atoms that constitute the linking group is preferably 1 to 36, more preferably 1 to 24, still more preferably 1 to 12, and particularly preferably 1 to 6. The number of linking atoms of the linking group is preferably 10 or less and more preferably 8 or less. The lower limit thereof is 1 or more. The number of linking atoms refers to the minimum number of atoms linking predetermined structural parts. For example, in a case of $—CH_2—C(=O)—O—$, the number of atoms that constitute the linking group is 6; however, the number of linking atoms is 3.

The functional group contained in one constitutional component may be one kind or two or more kinds, and in a case where two or more kinds are contained, they may be or may not be bonded to each other.
Specific examples of the polymerizable compound having a functional group are shown below, which are not limited thereto.
A-1
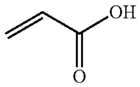
A-2
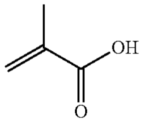
A-3
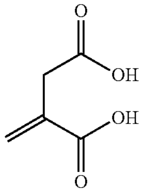
A-4
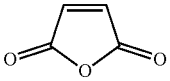
A-5
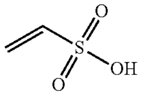
A-6
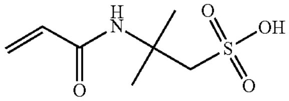
A-7
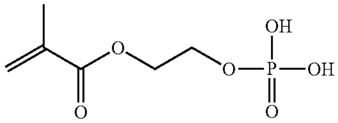
A-8
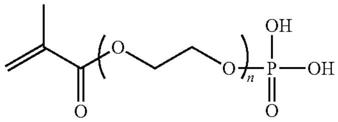
A-9
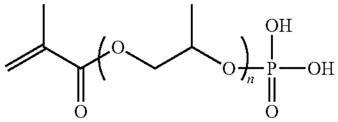
A-10
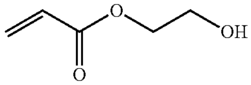
A-11
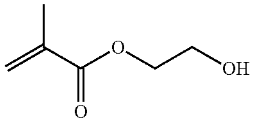
-continued
A-12
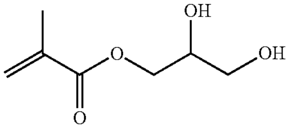
A-13
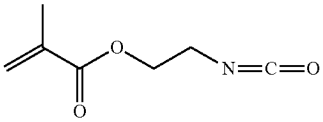
A-14
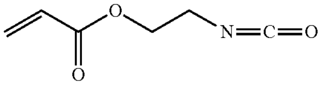
A-15
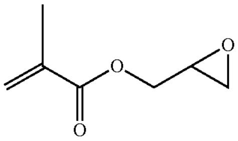
A-16
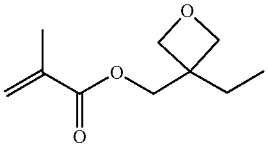
A-17
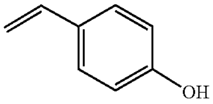
A-18
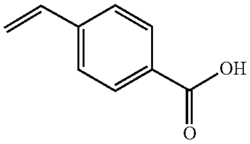
A-19
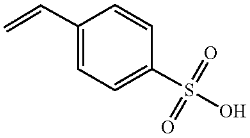
A-20
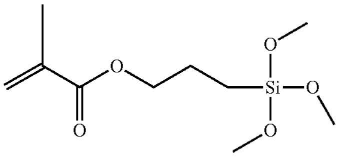
A-21
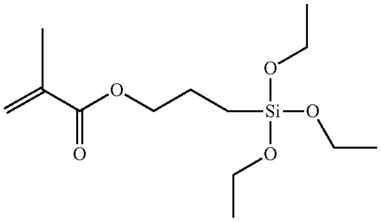
A-22
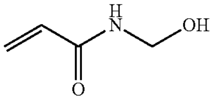

-continued

A-23

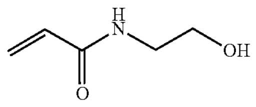

A-24

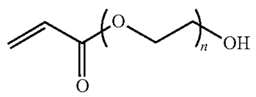

A-25

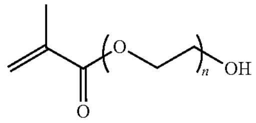

A-26

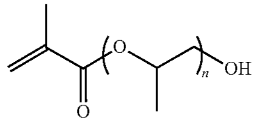

A-27

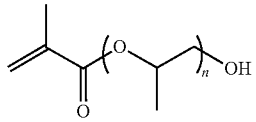

—Substituent Z—

The examples are an alkyl group (preferably an alkyl group having 1 to 20 carbon atoms, for example, methyl, ethyl, isopropyl, t-butyl, pentyl, heptyl, 1-ethylpentyl, benzyl, 2-ethoxyethyl, and 1-carboxymethyl), an alkenyl group (preferably an alkenyl group having 2 to 20 carbon atoms, such as vinyl, allyl, andoleyl), an alkynyl group (preferably an alkynyl group having 2 to 20 carbon atoms, for example, ethynyl, butadynyl, and phenylethynyl), a cycloalkyl group (preferably a cycloalkyl group having 3 to 20 carbon atoms, such as cyclopropyl, cyclopentyl, cyclohexyl, and 4-methylcyclohexyl; in the present invention, the alkyl group generally has a meaning including a cycloalkyl group therein when being referred to, however, it will be described separately here), an aryl group (preferably an aryl group having 6 to 26 carbon atoms, such as phenyl, 1-naphthyl, 4-methoxyphenyl, 2-chlorophenyl, and 3-methylphenyl), an aralkyl group (preferably an aralkyl group having 7 to 23 carbon atoms, for example, benzyl or phenethyl), and a heterocyclic group (preferably a heterocyclic group having 2 to 20 carbon atoms and more preferably a 5- or 6-membered heterocyclic group having at least one oxygen atom, one sulfur atom, or one nitrogen atom. The heterocyclic group includes an aromatic heterocyclic group and an aliphatic heterocyclic group. Examples thereof include a tetrahydropyran ring group, a tetrahydrofuran ring group, a 2-pyridyl group, a 4-pyridyl group, a 2-imidazolyl group, a 2-benzimidazolyl group, a 2-thiazolyl group, a 2-oxazolyl group, or a pyrrolidone group); an alkoxy group (preferably an alkoxy group having 1 to 20 carbon atoms, for example, a methoxy group, an ethoxy group, an isopropyloxy group, or a benzyloxy group); an aryloxy group (preferably an aryloxy group having 6 to 26 carbon atoms, for example, a phenoxy group, a 1-naphthyloxy group, a 3-methylphenoxy group, or a 4-methoxyphenoxy group); a heterocyclic oxy group (a group in which an —O— group is bonded to the above-described heterocyclic group), an alkoxycarbonyl group (preferably an alkoxycarbonyl group having 2 to 20 carbon atoms, for example, an ethoxycarbonyl group, a 2-ethylhexyloxycarbonyl group, or a dodecyloxycarbonyl group); an aryloxycarbonyl group (preferably an aryloxycarbonyl group having 6 to 26 carbon atoms, for example, a phenoxycarbonyl group, a 1-naphthyloxycarbonyl group, a 3-methylphenoxycarbonyl group, or a 4-methoxyphenoxycarbonyl group); an amino group (preferably an amino group having 0 to 20 carbon atoms, an alkylamino group, or an arylamino group, for example, an amino (—$NH_2$) group, an N,N-dimethylamino group, an N,N-diethylamino group, an N-ethylamino group, or an anilino group); a sulfamoyl group (preferably a sulfamoyl group having 0 to 20 carbon atoms, for example, an N,N-dimethylsulfamoyl group or an N-phenylsufamoyl group); an acyl group (an alkylcarbonyl group, an alkenylcarbonyl group, an alkynylcarbonyl group, an arylcarbonyl group, or a heterocyclic carbonyl group, preferably an acyl group having 1 to 20 carbon atoms, for example, an acetyl group, a propionyl group, a butyryl group, an octanoyl group, a hexadecanoyl group, an acryloyl group, a methacryloyl group, a crotonoyl group, a benzoyl group, a naphthoyl group, or a nicotinoyl group); an acyloxy group (an alkylcarbonyloxy group, an alkenylcarbonyloxy group, an alkynylcarbonyloxy group, or a heterocyclic carbonyloxy group, preferably an acyloxy group having 1 to 20 carbon atoms, for example, an acetyloxy group, a propionyloxy group, a butyryloxy group, an octanoyloxy group, a hexadecanoyloxy group, an acryloyloxy group, a methacryloyloxy group, a crotonoyloxy group, or a nicotinoyloxy group); an aryloyloxy group (preferably an aryloyloxy group having 7 to 23 carbon atoms, for example, a benzoyloxy group or a naphthoyloxy group); a carbamoyl group (preferably a carbamoyl group having 1 to 20 carbon atoms, for example, an N,N-dimethylcarbamoyl group or an N-phenylcarbamoyl group); an acylamino group (preferably an acylamino group having 1 to 20 carbon atoms, for example, an acetylamino group or a benzoylamino group); an alkylthio group (preferably an alkylthio group having 1 to 20 carbon atoms, for example, a methylthio group, an ethylthio group, an isopropylthio group, or a benzylthio group); an arylthio group (preferably an arylthio group having 6 to 26 carbon atoms, for example, a phenylthio group, a 1-naphthylthio group, a 3-methylphenylthio group, or a 4-methoxyphenylthio group); a heterocyclic thio group (a group in which an —S— group is bonded to the above-described heterocyclic group), an alkylsulfonyl group (preferably an alkylsulfonyl group having 1 to 20 carbon atoms, for example, a methylsulfonyl group or an ethylsulfonyl group), an arylsulfonyl group (preferably an arylsulfonyl group having 6 to 22 carbon atoms, for example, a benzenesulfonyl group), an alkylsilyl group (preferably an alkylsilyl group having 1 to 20 carbon atoms, for example, a monomethylsilyl group, a dimethylsilyl group, a trimethylsilyl group, or a triethylsilyl group); an arylsilyl group (preferably an arylsilyl group having 6 to 42 carbon atoms, for example, a triphenylsilyl group), an alkoxysilyl group (preferably an alkoxysilyl group having 1 to 20 carbon atoms, for example, a monomethoxysilyl group, a dimethoxysilyl group, a trimethoxysilyl group, or a triethoxysilyl group), an aryloxysilyl group (preferably an aryloxysilyl group having 6 to 42 carbon atoms, for example, a triphenyloxysilyl group), a phosphoryl group (preferably a phosphate group having 0 to 20 carbon atoms, for example, $—OP(=O)(R^P)_2$), a phosphonyl group (preferably a phosphonyl group having 0 to 20 carbon atoms, for example, $—P(=O)(R^P)_2$), a phosphinyl group (preferably a phosphinyl group having 0 to 20 carbon atoms, for example, $—P(R^P)_2$), a sulfo group (a sulfonate group), a carboxy group, a hydroxy group, a sulfanyl group, a cyano group, and a halogen atom (for example, a fluorine atom, a chlorine atom, a bromine atom, or an iodine atom). $R^P$ represents a hydrogen atom or a substituent (preferably a group selected from the substituent Z).

In addition, each group exemplified in the substituent Z may be further substituted with the substituent Z.

The alkyl group, the alkylene group, the alkenyl group, the alkenylene group, the alkynyl group, the alkynylene group, and the like may be cyclic or chained, may be linear or branched.

In a case of synthesizing a fluorine-based copolymer, the polymerization method of the raw material compound (VDF, HFP, and the copolymerizable polymerizable compound) is not particularly limited, and thus a known method may be selected, and conditions may be set appropriately.

(Acrylonitrile Polymer (Polymer) that Constitutes Polymer Binder)

The acrylonitrile polymer may be any one of a homopolymer or a copolymer as long as it contains an acrylonitrile constitutional component as a constitutional component. In a case of being an acrylonitrile copolymer, the content of the acrylonitrile constitutional component in the copolymer is preferably 20% to 80% by mole, more preferably 30% to 75% by mole, and still more preferably 40% to 70% by mole. The acrylonitrile constitutional component may be a methacrylonitrile constitutional component or a mixed component thereof.

Examples of the copolymerization component with the acrylonitrile constitutional component include (meth)acrylic acid-based compounds such as a (meth)acrylic acid compound, a (meth)acrylic acid ester compound, and a (meth) acrylamide compound, vinyl-based compounds such as vinyl alcohol, vinyl acetal, vinyl acetate, a vinyl ester, and a vinyl ether, and hydrocarbon-based compounds such as styrene, ethylene, propylene, isoprene, and butadiene.

Among these, an acrylonitrile homopolymer is preferable.

(Physical Properties or Characteristics or Like of Polymer Binder or Fluorine-Based Copolymer that Constitutes Polymer Binder)

The polymer binder is not particularly limited; however, the peel strength thereof with respect to the aluminum foil is preferably 0.1 N/mm or more. This makes it possible to impart strong adhesiveness of the collector to the active material layer, which contributes to further improvement of the cycle characteristics of the all-solid state secondary battery. The peel strength of the fluorine-based copolymer is more preferably 0.2 N/mm or more and still more preferably 0.3 N/mm or more in terms of further improvement of the adhesiveness of the collector and the cycle characteristics. The upper limit thereof is not particularly limited; however, it is, for example, practically 10 N/mm or less, and it is preferably 2.0 N/mm or less. In the present invention, the peel strength can be appropriately set, for example, by changing the composition of the polymer that constitutes a polymer binder or changing the physical properties of the polymer binder.

A solution (solid content concentration: 10% by mass), in which the polymer binder has been dissolved in an organic solvent (butyl butyrate), is added dropwise onto an aluminum foil (product name: AlN30, manufactured by Hohsen Corp.) and then dried (temperature: 100° C., time: 180 minutes) to produce a dried film (width: 10 mm, length: 50 mm) having a thickness of 50 and this dried film is used as a test piece to measure the peel strength. As for the measuring method and the measuring conditions, the peeling force is measured by using a tensile tester (ZTS-50N, manufactured by IMADA Co., Ltd.) when the obtained dried film is peeled off at a speed of 30 mm/s and an angle of 90° with respect to the coated surface of the aluminum foil, and the average value thereof is adopted as the peel strength (unit: N/mm).

The watery moisture concentration of the polymer binder is preferably 100 ppm (in terms of mass) or lower. Further, as this polymer binder, a polymer may be crystallized and dried, or a polymer binder dispersion liquid may be used as it is.

The polymer that constitutes a polymer binder is preferably amorphous. In the present invention, the description that a polymer is "amorphous" typically refers to that no endothermic peak due to crystal melting is observed when the measurement is carried out at the glass transition temperature.

In a case where the polymer binder has a particle shape, the shape thereof is not particularly limited and may be a flat shape, an amorphous shape, or the like; however, a spherical shape or a granular shape is preferable. The average primary particle diameter thereof is not particularly limited; however, it is preferably 0.1 nm or more, more preferably 1 nm or more, still more preferably 5 nm or more, particularly preferably 10 nm or more, and most preferably 50 nm or more. The upper limit thereof is preferably 5.0 μm or less, more preferably 1.0 μm or less, still more preferably 700 nm or less, and particularly preferably 500 nm or less.

The average particle diameter of the polymer binder can be measured in the same manner as in the measurement of the average particle diameter of the inorganic solid electrolyte.

The particle diameter of the polymer binder in the constitutional layer of the all-solid state secondary battery is measured, for example, by disassembling the battery to peel off the constitutional layer containing the polymer binder, subsequently subjecting the constitutional layer to measurement, and excluding the measured value of the average particle diameter of particles other than the polymer binder, which has been measured in advance.

The average particle diameter of the polymer binder can be adjusted, for example, with the kind of the dispersion medium and the content of the constitutional component in the polymer.

The tensile fracture strain of the fluorine-based copolymer that constitutes a polymer binder is preferably 500% or more. In a case where the specific fluorine-based copolymer exhibits a tensile fracture strain of 500% or more, in the inorganic solid electrolyte-containing composition, as described above, it is possible to effectively exhibit the maintenance of the interaction between the solid particles and the action of the repulsive force between fluorine atoms on the solid particles and thus it is possible to enhance dispersion characteristics or application suitability. In addition, it is possible to strengthen the adhesiveness of the solid particles, and it is possible to further enhance the cycle characteristics. In the present invention, the tensile fracture strain is more preferably 600% or more, still more preferably 700% or more, particularly preferably 750% or more, and most preferably 2,500% or more. The upper limit value of the tensile fracture strain is not particularly limited. However, it is practically 10,000%, and it is preferably 6,000% or less and more preferably 3,500% or less.

In the present invention, the tensile fracture strain can be appropriately set, for example, by changing the molecular weight of the fluorine-based copolymer.

The tensile fracture strain is measured by producing a test piece described in Japanese Industrial Standards (JIS) K 7161 (2014) "Plastics—Determination of tensile properties" and according to the method and conditions described in these standards. Specifically, a cast film having a thickness of about 200 μm is prepared by using a solution obtained by dissolving the fluorine-based copolymer in diisobutyl ketone (DIBK) or the like. This cast film is cut to a size of 10 mm×20 mm, set in a tensile tester so that the distance between chucks (distance between grippers) is 10 mm, and the tensile test (the evaluation of the stress-strain curve) is carried out at a test speed of 30 mm/min, whereby the tensile fracture strain can be determined. The tensile fracture strain is a value (the amount extended at the time of breaking) obtained by subtracting 100% from the length (in terms of value converted to %)) of the test piece at the time of breaking, in a case where the length of the test piece before stretching is set to 100%.

The mass average molecular weight of the polymer that constitutes a polymer binder is not particularly limited as long as it exceeds 10,000; however, it is preferably more than 10,000 and not 1,500,000 or less. In a case where the polymer that constitutes a polymer binder has a mass average molecular weight in the above range, dispersion characteristics and application suitability can be further improved, and furthermore, the tensile fracture strain of the fluorine-based copolymer can also be increased. From the viewpoint of dispersion characteristics and application suitability, the mass average molecular weight thereof is more preferably 20,000 to 1,000,000, still more preferably 20,000 to 500,000, and particularly preferably 30,000 to 300,000. The molecular weight shall be a value measured according to the method described in the above-described dispersing agent.

The polymer that constitutes a polymer binder preferably has, for example, an SP value of 9 to 23, more preferably an SP value of 10 to 18, and still more preferably an SP value of 11 to 15, in terms of the dispersion stability of solid particles. The difference (in terms of absolute value) in SP value between the fluorine-based copolymer and the dispersion medium will be described later. The SP value of the polymer that constitutes a polymer binder is a value obtained according to a calculation or conversion method in a case where the above-described dispersing agent is a polymer. It is noted that the SP value of the VDF constitutional component is 13.1 and the SP value of the HFP constitutional component is 9.5. In the above description, the unit of the SP value is $MPa^{1/2}$ in any case.

The fluorine-based copolymer preferably satisfies the above-described physical properties and the like; however, the following polymer is more preferable in terms of dispersion characteristics and application suitability, as well as binding property, adhesiveness of collector, and suppression of resistance.

A fluorine-based copolymer having an HFP amount of 30% to 40% by mole and a tensile fracture strain of 2,500% to 3500%, into which a small amount (the above content) of a carboxylic acid anhydride group (preferably, an maleic acid anhydride group) is introduced as a functional group, where the adsorption rate of the polymer binder with respect to an inorganic solid electrolyte is more than 0% and less than 5%.

The polymer that constitutes a polymer binder may be a non-crosslinked polymer or a crosslinked polymer. In addition, in a case where the crosslinking of the polymer progresses due to heating or voltage application, the molecular weight may be higher than the above-described molecular weight. Preferably, the polymer has a mass average molecular weight in the above-described range at the start of use of the all-solid state secondary battery.

The inorganic solid electrolyte-containing composition according to the embodiment of the present invention may contain one kind of polymer binder or a plurality of kinds thereof.

The content of the polymer binder in the inorganic solid electrolyte-containing composition is not particularly limited. However, it is preferably 0.1% to 10.0% by mass, more preferably 0.2% to 5.0% by mass, and still more preferably 0.3% to 4.0% by mass, in 100% by mass of the solid content, in that dispersion characteristics and application suitability are improved and furthermore, the binding property is exhibited.

In a case where the inorganic solid electrolyte-containing composition contains a particulate binder described later, the content of the polymer binder may be lower than the content of the particulate binder; however, it is preferable to be equal to or higher than the content of the particulate binder. This makes it possible to further reinforce the binding property without impairing the excellent dispersion characteristics and the excellent application suitability. The difference (in terms of absolute value) in content between the polymer binder and the particulate binder is not particularly limited, and it can be, for example, 0% to 8% by mass, more preferably 0% to 4% by mass, and still more preferably 0% to 2% by mass. In addition, the ratio of the content of the polymer binder to the content of the particulate binder (the content of the polymer binder/the content of the particulate binder) is not particularly limited; however, it is, for example, preferably 0.01 to 10 and more preferably 0.02 to 5.

In the present invention, the mass ratio [(the mass of the inorganic solid electrolyte+the mass of the active material)/(the total mass of the binder)] of the total mass (the total amount) of the inorganic solid electrolyte and the active material to the total mass of the binder is preferably in a range of 1,000 to 1. Furthermore, this ratio is more preferably 500 to 2 and still more preferably 100 to 10.

(Particulate Binder)

In addition to the above-described polymer binder, the inorganic solid electrolyte-containing composition according to the embodiment of the present invention also preferably contains a particle-shaped polymer binder (a particulate binder) which is insoluble in the dispersion medium of the composition. The shape of this particulate binder is not particularly limited and may be a flat shape, an amorphous shape, or the like; however, a spherical shape or a granular shape is preferable. The average particle diameter of the particulate binder is preferably 1 to 1,000 nm, more preferably 10 to 800 nm, still more preferably 20 to 500 nm, and particularly preferably 40 to 300 nm. The average particle diameter can be measured in the same manner as in the measurement of the average particle diameter of the inorganic solid electrolyte.

The particulate binder is preferably a binder of which the adsorption rate is 60% or more with respect to the inorganic solid electrolyte. The adsorption rate can be measured in the same manner as in the measurement of the polymer binder.

In a case where the inorganic solid electrolyte-containing composition contains a particulate binder, the effect of improving the dispersion characteristics and the application suitability due to the polymer binder is not impaired, and the binding property of the solid particles can be reinforced while an increase in interface resistance is suppressed. This makes it possible to further increase the cycle characteristics of the all-solid state secondary battery, and preferably it is possible to realize further lower resistance.

As the particulate binder, various particulate binders that are used in the manufacturing of an all-solid state secondary battery can be used without particular limitation. Examples thereof include a particulate binder consisting of the following sequential polymerization polymer or chain polymerization polymer. In addition, other examples thereof include the binders disclosed in JP2015-088486A and WO2018/020827A.

The sequential polymerization polymer is not particularly limited; however, examples thereof include polyurethane, polyurea, polyamide, polyimide, polyester, and polycarbonate. The chain polymerization polymer is not particularly limited; however, examples thereof include chain polymerization polymers such as a fluorine-based polymer (a fluorine-based copolymer), a hydrocarbon-based polymer, a vinyl polymer, and a (meth)acrylic polymer.

The content of the particulate binder in the inorganic solid electrolyte-containing composition is not particularly limited. However, it is preferably 0.02% to 5.0% by mass, more preferably 0.05% to 3.0% by mass, and still more preferably 0.1% to 2.0% by mass, in 100% by mass of the solid content, in that dispersion characteristics and application suitability are improved and furthermore, the binding property is exhibited. It is noted that the content of the particulate binder is appropriately set within the above range; however, it is preferably a content at which the particulate binder is not dissolved in the inorganic solid electrolyte-containing composition in consideration of the solubility of the particulate binder.

The inorganic solid electrolyte-containing composition according to the embodiment of the present invention may contain a binder other than the above-described polymer binder and the particulate binder.

<Dispersion Medium>

It suffices that the dispersion medium contained in the inorganic solid electrolyte-containing composition according to the embodiment of the present invention is an organic compound that exhibits a liquid state in the use environment, which is any dispersion medium that disperses solid form particles such as the inorganic solid electrolyte contained in the composition. Examples thereof include various organic solvents, and specific examples thereof include an alcohol compound, an ether compound, an amide compound, an amine compound, a ketone compound, an aromatic compound, an aliphatic compound, a nitrile compound, and an ester compound. However, the dispersion medium contained in the inorganic solid electrolyte-containing composition according to the embodiment of the present invention includes a dispersion medium having a boiling point of 120° C. or higher. In the present invention, the boiling point means the boiling point of the dispersion medium at normal pressure (1 atm).

The above-described dispersing agent having a boiling point of 120° C. or higher preferably has a boiling point of 130° C. or higher, more preferably has a boiling point of 140° C. or higher, and still more preferably has a boiling point of 150° C. or higher. The upper limit of the boiling point is preferably 230° C. or lower, more preferably 200° C. or lower, and still more preferably 180° C. or lower.

The inorganic solid electrolyte-containing composition according to the embodiment of the present invention may contain a dispersion medium that does not satisfy the boiling point within a range in which the effect of the present invention is exhibited. For example, in the inorganic solid electrolyte-containing composition according to the embodiment of the present invention, the proportion of a dispersion medium having a boiling point of 120° C. or higher in dispersion media can be set to 70% by mass or more, and it is preferably 80% by mass or more, more preferably 90% by mass or more, and particularly preferably 95% by mass or more. The upper limit value thereof is not particularly limited, and the dispersion medium can be such that all the dispersion media have a boiling point of 120° C. or higher.

The boiling point of the dispersion medium that does not satisfy the above-described boiling point is not particularly limited; however, it is preferably 90° C. or higher. The upper limit of the boiling point is appropriately determined in relation to the above-described dispersion medium having a boiling point of 120° C. or higher, and it can be set to a temperature lower than the boiling point of the dispersion medium having a boiling point of 120° C. or higher.

The dispersion medium may be a non-polar dispersion medium (a hydrophobic dispersion medium) or a polar dispersion medium (a hydrophilic dispersion medium); however, a non-polar dispersion medium is preferable from the viewpoint that excellent dispersibility can be exhibited. The non-polar dispersion medium generally refers to a dispersion medium having a property of a low affinity to water; however, in the present invention, examples thereof include an ester compound, a ketone compound, an ether compound, an aromatic compound, and an aliphatic compound.

In the present invention, among dispersing agents and dispersion media, those that do not function as a dispersing agent for solid particles such the inorganic solid electrolyte shall be adopted as a dispersion medium. Therefore, in a case where the inorganic solid electrolyte-containing composition contains two or more kinds of dispersion media, among the dispersion media, the one that is capable of functioning as a dispersing agent in a case where the inorganic solid electrolyte-containing composition has been prepared is classified as not a dispersion medium but a dispersing agent. Whether or not the one is capable of functioning as a dispersing agent in a case where the inorganic solid electrolyte-containing composition has been prepared is not uniquely determined but is determined depending on the combination with the dispersing agent.

Typically, in the inorganic solid electrolyte-containing composition, a compound having the highest content, excluding the inorganic solid electrolyte, the active material, and the conductive auxiliary agent, is the dispersion medium.

Examples of the alcohol compound include methyl alcohol, ethyl alcohol, 1-propyl alcohol, 2-propyl alcohol, 2-butanol, ethylene glycol, propylene glycol, glycerin, 1,6-hexanediol, cyclohexanediol, sorbitol, xylitol, 2-methyl-2,4-pentanediol, 1,3-butanediol, and 1,4-butanediol.

Examples of the ether compound include an alkylene glycol (diethylene glycol, triethylene glycol, polyethylene glycol, dipropylene glycol, or the like), an alkylene glycol monoalkyl ether (ethylene glycol monomethyl ether, ethylene glycol monobutyl ether, propylene glycol monomethyl ether, diethylene glycol monomethyl ether, dipropylene glycol monomethyl ether, tripropylene glycol monomethyl ether, diethylene glycol monobutyl ether or the like), alkylene glycol dialkyl ether (ethylene glycol dimethyl ether or the like), a dialkyl ether (dimethyl ether, diethyl ether, diisopropyl ether, dibutyl ether, or the like), and a cyclic ether (tetrahydrofuran, dioxane (including 1,2-, 1,3- or 1,4-isomer), or the like).

Examples of the amide compound include N,N-dimethylformamide, N-methyl pyrrolidone, 2-pyrrolidinone, 1,3-dimethyl-2-imidazolidinone, ε-caprolactam, formamide, N-methylformamide, acetamide, N-methylacetamide, N,N-dimethylacetamide, N-methylpropanamide, and hexamethylphosphoric triamide.

Examples of the amine compound include triethylamine, diisopropylethylamine, and tributylamine.

Examples of the ketone compound include acetone, methyl ethyl ketone, methyl isobutyl ketone (MIBK), cyclopentanone, cyclohexanone, cycloheptanone, dipropyl ketone, dibutyl ketone, diisopropyl ketone, diisobutyl ketone (DIBK), isobutyl propyl ketone, sec-butyl propyl ketone, pentyl propyl ketone, and butyl propyl ketone.

Examples of the aromatic compound include benzene, toluene, and xylene.

Examples of the aliphatic compound include hexane, heptane, octane, decane, cyclohexane, methylcyclohexane, ethylcyclohexane, cyclooctane, decalin, paraffin, gasoline, naphtha, kerosene, and light oil.

Examples of the nitrile compound include acetonitrile, propionitrile, and isobutyronitrile.

Examples of the ester compound include ethyl acetate, propyl acetate, propyl butyrate, butyl acetate, ethyl butyrate, isopropyl butyrate, butyl butyrate, isobutyl butyrate, butyl pentanoate, pentyl pentanoate, ethyl isobutyrate, propyl isobutyrate, isopropyl isobutyrate, isobutyl isobutyrate, propyl pivalate, isopropyl pivalate, butyl pivalate, and isobutyl pivalate.

In the present invention, among them, an ether compound, a ketone compound, an aromatic compound, an aliphatic compound, or an ester compound is preferable, and an ester compound, a ketone compound, or an ether compound is more preferable.

The number of carbon atoms of the compound that constitutes the dispersion medium is not particularly limited, and it is preferably 2 to 30, more preferably 4 to 20, still more preferably 6 to 15, and particularly preferably 7 to 12.

In terms of the dispersion characteristics, the dispersion medium preferably has an SP value (unit: $MPa^{1/2}$) of 15.0 to 21.0, more preferably 16.0 to 20.0, and still more preferably 17.0 to 19.0. The difference (in terms of absolute value, unit: $MPa^{1/2}$) in the SP value between the dispersing agent and the dispersion medium is not particularly limited. However, it is preferably 3.0 or less, more preferably 0 to 2.5, still more preferably 0 to 2.0, particularly preferably 0 to 1.0, and most preferably 0 to 0.5, in terms of further improving dispersion characteristics and application suitability. In a case where a plurality of dispersing agents are contained, it is preferable that the difference (in terms of absolute value) in SP value is such that the smallest value (in terms of absolute value) of the difference is within the above-described range, and where all the differences (in terms of absolute value) in SP value may be included in the above-described range.

The SP value of the dispersion medium is defined as a value obtained by converting the SP value calculated according to the Hoy method described above into the unit of $MPa^{1/2}$. In a case where the inorganic solid electrolyte-containing composition contains two or more kinds of dispersion media, the SP value of the dispersion medium means the SP value of the entire dispersion media, and it is the sum of the products of the SP values and the mass fractions of the respective dispersion media. Specifically, the calculation is carried out in the same manner as the above-described method of calculating the SP value of the polymer, except that the SP value of each of the dispersion media is used instead of the SP value of the constitutional component.

The SP value (the unit is omitted) of the dispersion medium is shown below in parentheses after the specific compound name.

MIBK (18.4), diisopropyl ether (16.8), dibutyl ether (17.9), diisopropyl ketone (17.9), DIBK (17.9), butyl butyrate (18.6), butyl acetate (18.9), toluene (18.5), ethylcyclohexane (17.1), cyclooctane (18.8), isobutyl ethyl ether (15.3), N-methylpyrrolidone (NMP, SP value: 25.4)

It suffices that the inorganic solid electrolyte-containing composition according to the embodiment of the present invention contains at least one kind of dispersion medium, and it may contain two or more kinds thereof.

In the present invention, the content of the dispersion medium in the inorganic solid electrolyte-containing composition is not particularly limited, and it is set in a range that satisfies the above-described solid content concentration.

<Active Material>

The inorganic solid electrolyte-containing composition according to the embodiment of the present invention can also contain an active material capable of intercalating and deintercalating an ion of a metal belonging to Group 1 or Group 2 of the periodic table. Examples of such active materials include a positive electrode active material and a negative electrode active material, which will be described later.

In the present invention, the inorganic solid electrolyte-containing composition containing an active material (a positive electrode active material or a negative electrode active material) may be referred to as an electrode composition (a positive electrode composition or a negative electrode composition).

(Positive Electrode Active Material)

The positive electrode active material is preferably a positive electrode active material capable of reversibly intercalating and deintercalating lithium ions. The above-described material is not particularly limited as long as the material has the above-described characteristics and may be a transition metal oxide or an element, which is capable of being complexed with Li, such as sulfur or the like by disassembling the battery.

Among the above, as the positive electrode active material, transition metal oxides are preferably used, and transition metal oxides having a transition metal element $M^a$ (one or more elements selected from Co, Ni, Fe, Mn, Cu, or V) are more preferable. In addition, an element $M^b$ (an element of Group 1 (Ia) of the metal periodic table other than lithium, an element of Group 2 (IIa), or an element such as Al, Ga, In, Ge, Sn, Pb, Sb, Bi, Si, P, or B) may be mixed into this transition metal oxide. The mixing amount thereof is preferably 0% to 30% by mole of the amount (100% by mole) of the transition metal element $M^a$. It is more preferable that the transition metal oxide is synthesized by mixing the above components such that a molar ratio $Li/M^a$ is 0.3 to 2.2.

Specific examples of the transition metal oxides include transition metal oxides having a bedded salt-type structure (MA), transition metal oxides having a spinel-type structure (MB), lithium-containing transition metal phosphoric acid compounds (MC), lithium-containing transition metal halogenated phosphoric acid compounds (MD), and lithium-containing transition metal silicate compounds (ME).

Specific examples of the transition metal oxides having a bedded salt-type structure (MA) include $LiCoO_2$ (lithium cobalt oxide [LCO]), $LiNi_2O_2$ (lithium nickelate), $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickelate).

Specific examples of the transition metal oxides having a spinel-type structure (MB) include $LiMn_2O_4$ (LMO), $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphoric acid compound (MC) include olivine-type iron phosphate salts such as $LiFePO_4$ and $Li_3Fe_2(PO_4)_3$, iron pyrophosphates such as $LiFeP_2O_7$, and cobalt phosphates such as $LiCoPO_4$, and a monoclinic NASICON type vanadium phosphate salt such as $Li_3V_2(PO_4)_3$ (lithium vanadium phosphate).

Examples of the lithium-containing transition metal halogenated phosphoric acid compound (MD) include iron fluorophosphates such as $Li_2FePO_4F$, manganese fluorophosphates such as $Li_2MnPO_4F$, cobalt fluorophosphates such as $Li_2CoPO_4F$.

Examples of the lithium-containing transition metal silicate compounds (ME) include $Li_2FeSiO_4$, $Li_2MnSiO_4$, and $Li_2CoSiO_4$.

In the present invention, the transition metal oxide having a bedded salt-type structure (MA) is preferable, and LCO or NMC is more preferable.

The shape of the positive electrode active material is not particularly limited but is preferably a particle shape. The particle diameter (the volume average particle diameter) of the positive electrode active material is not particularly limited. For example, it can be set to 0.1 to 50 μm. The particle diameter of the positive electrode active material particle can be measured in the same manner as in the measurement of the particle diameter of the inorganic solid electrolyte. In order to allow the positive electrode active material to have a predetermined particle diameter, a general pulverizer or classifier is used. For example, a mortar, a ball mill, a sand mill, a vibration ball mill, a satellite ball mill, a planetary ball mill, a swirling air flow jet mill, or a sieve is preferably used. During pulverization, it is also possible to carry out wet-type pulverization in which water or a dispersion medium such as methanol is made to be present together. In order to provide the desired particle diameter, classification is preferably carried out. The classification is not particularly limited and can be carried out using a sieve, a wind power classifier, or the like. Both the dry-type classification and the wet-type classification can be carried out.

A positive electrode active material obtained using a baking method may be used after being washed with water, an acidic aqueous solution, an alkaline aqueous solution, or an organic solvent.

In a case where the inorganic solid electrolyte-containing composition according to the embodiment of the present invention contains a positive electrode active material, the contained positive electrode active material may be one kind or two or more kinds.

In a case of forming a positive electrode active material layer, the mass (mg) (mass per unit area) of the positive electrode active material per unit area ($cm^2$) of the positive electrode active material layer is not particularly limited. It can be appropriately determined according to the designed battery capacity and can be set to, for example, 1 to 100 $mg/cm^2$.

The content of the positive electrode active material in the inorganic solid electrolyte-containing composition is not particularly limited; however, it is preferably 10% to 97% by mass, more preferably 30% to 95% by mass, still more preferably 40% to 93% by mass, and particularly preferably 50% to 90% by mass in 100% by mass of the solid content.

(Negative Electrode Active Material)

The negative electrode active material is preferably capable of reversibly intercalating and deintercalating lithium ions. The material is not particularly limited as long as it has the above-described characteristics, and examples thereof include a carbonaceous material, a metal oxide, a metal composite oxide, a lithium single body, a lithium alloy, and a negative electrode active material that is capable of forming an alloy with lithium. Among the above, a carbonaceous material, a metal composite oxide, or a lithium single body is preferably used from the viewpoint of reliability. A negative electrode active material that is capable of being alloyed with lithium is preferable since the capacity of the all-solid state secondary battery can be increased.

The carbonaceous material that is used as the negative electrode active material is a material substantially consisting of carbon. Examples thereof include petroleum pitch, carbon black such as acetylene black (AB), graphite (natural graphite, artificial graphite such as vapor-grown graphite), and carbonaceous material obtained by baking a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, vitreous carbon fibers, and activated carbon fibers, mesophase microspheres, graphite whisker, and tabular graphite.

These carbonaceous materials can be classified into non-graphitizable carbonaceous materials (also referred to as "hard carbon") and graphitizable carbonaceous materials based on the graphitization degree. In addition, it is preferable that the carbonaceous material has the lattice spacing, density, and crystallite size described in JP1987-22066A (JP-S62-22066A), JP1990-6856A (JP-H2-6856A), and JP1991-45473A (JP-H3-45473A). The carbonaceous material is not necessarily a single material and, for example, may be a mixture of natural graphite and artificial graphite described in JP1993-90844A (JP-H5-90844A) or graphite having a coating layer described in JP1994-4516A (JP-H6-4516A).

As the carbonaceous material, hard carbon or graphite is preferably used, and graphite is more preferably used.

The oxide of a metal or a metalloid element that can be used as the negative electrode active material is not particularly limited as long as it is an oxide capable of intercalating and deintercalating lithium, and examples thereof include an oxide of a metal element (metal oxide), a composite oxide of a metal element or a composite oxide of a metal element and a metalloid element (collectively referred to as "metal composite oxide), and an oxide of a metalloid element (a metalloid oxide). The oxides are more preferably amorphous oxides, and preferred examples thereof include chalcogenides which are reaction products between metal elements and elements in Group 16 of the periodic table). In the present invention, the metalloid element refers to an element having intermediate properties between those of a metal element and a non-metal element. Typically, the metalloid elements include six elements including boron, silicon, germanium, arsenic, antimony, and tellurium, and further include three elements including selenium, polonium, and astatine. In addition, "amorphous" represents an oxide having a broad scattering band with an apex in a range of 20° to 40° in terms of 2θ value in case of being measured by an X-ray diffraction method using CuKα rays, and the oxide may have a crystalline diffraction line. The highest intensity in a crystalline diffraction line observed in a range of 40° to 70° in terms of 2θ value is preferably 100 times or less and more preferably 5 times or less with respect to the intensity of a diffraction line at the apex in a broad scattering band observed in a range of 20° to 40° in terms of 2θ value, and it is still more preferable that the oxide does not have a crystalline diffraction line.

In the compound group consisting of the amorphous oxides and the chalcogenides, amorphous oxides of metalloid elements and chalcogenides are more preferable, and (composite) oxides consisting of one element or a combination of two or more elements selected from elements (for example, Al, Ga, Si, Sn, Ge, Pb, Sb, and Bi) belonging to Groups 13 (IIIB) to 15 (VB) in the periodic table or chalcogenides are more preferable. Specific examples of the preferred amorphous oxide and chalcogenide preferably include $Ga_2O_3$, GeO, PbO, $PbO_2$, $Pb_2O_3$, $Pb_2O_4$, $Pb_3O_4$, $Sb_2O_3$, $Sb_2O_4$, $Sb_2O_8Bi_2O_3$, $Sb_2O_8Si_2O_3$, $Sb_2O_5$, $Bi_2O_3$, $Bi_2O_4$, GeS, PbS, $PbS_2$, $Sb_2S_3$, and $Sb_2S_5$.

Preferred examples of the negative electrode active material which can be used in combination with a amorphous oxide containing Sn, Si, or Ge as a major component include a carbonaceous material capable of intercalating and/or deintercalating lithium ions or lithium metal, a lithium single body, a lithium alloy, and a negative electrode active material that is capable of being alloyed with lithium.

It is preferable that an oxide of a metal or a metalloid element, in particular, a metal (composite) oxide and the chalcogenide contain at least one of titanium or lithium as the constitutional component from the viewpoint of high current density charging and discharging characteristics. Examples of the metal composite oxide (lithium composite metal oxide) including lithium include a composite oxide of lithium oxide and the above metal (composite) oxide or the above chalcogenide, and specifically, $Li_2SnO_2$.

As the negative electrode active material, for example, a metal oxide (titanium oxide) having a titanium element is also preferable. Specifically, $Li_4Ti_5O_{12}$ (lithium titanium oxide [LTO]) is preferable since the volume variation during the intercalation and deintercalation of lithium ions is small, and thus the high-speed charging and discharging characteristics are excellent, and the deterioration of electrodes is suppressed, whereby it becomes possible to improve the life of the lithium ion secondary battery.

The lithium alloy as the negative electrode active material is not particularly limited as long as it is an alloy that is typically used as a negative electrode active material for a secondary battery, and examples thereof include a lithium aluminum alloy, and specifically, a lithium aluminum alloy, using lithium as a base metal, to which 10% by mass of aluminum is added.

The negative electrode active material capable of forming an alloy with lithium is not particularly limited as long as it is typically used as a negative electrode active material for a secondary battery. Such an active material has a large expansion and contraction due to charging and discharging of the all-solid state secondary battery and accelerates the deterioration of cycle characteristics. However, since a layer formed of of the inorganic solid electrolyte-containing composition according to the embodiment of the present invention is incorporated in the all-solid state secondary battery according to the embodiment of the present invention, the deterioration of cycle characteristics can be suppressed. Examples of such an active material include a (negative electrode) active material (an alloy or the like) having a silicon element or a tin element and a metal such as Al or In, a negative electrode active material (a silicon element-containing active material) having a silicon element capable of exhibiting high battery capacity is preferable, and a silicon-containing active material in which the content of the silicon element is 50% by mole or more with respect to all the constitutional elements is more preferable.

In general, a negative electrode including the negative electrode active material (for example, an Si negative electrode including a silicon element-containing active material or an Sn negative electrode containing an active material containing a tin element) can intercalate a larger amount of Li ions than a carbon negative electrode (for example, graphite or acetylene black). That is, the amount of Li ions intercalated per unit mass increases. Therefore, it is possible to increase the battery capacity. As a result, there is an advantage that the battery driving duration can be extended.

Examples of the silicon-containing active material include a silicon-containing alloy (for example, $LaSi_2$, $VSi_2$, La—Si, Gd—Si, or Ni—Si) including a silicon material such as Si or SiOx ($0<x\leq1$) and titanium, vanadium, chromium, manganese, nickel, copper, lanthanum, or the like or a structured active material thereof (for example, $LaSi_2/Si$), and an active material such as $SnSiO_3$ or $SnSiS_3$ including silicon element and tin element. In addition, since SiOx itself can be used as a negative electrode active material (a metalloid oxide) and Si is produced along with the operation of an all-solid state secondary battery, SiOx can be used as a negative electrode active material (or a precursor material thereof) capable of being alloyed with lithium.

Examples of the negative electrode active material including tin element include Sn, SnO, $SnO_2$, SnS, $SnS_2$, and the above-described active material including silicon element and tin element. In addition, a composite oxide with lithium oxide, for example, $Li_2SnO_2$ can also be used.

In the present invention, the above-described negative electrode active material can be used without any particular limitation. From the viewpoint of battery capacity, a preferred aspect as the negative electrode active material is a negative electrode active material that is capable of being alloyed with lithium. Among them, the silicon material or the silicon-containing alloy (the alloy containing a silicon element) described above is more preferable, and it is more preferable to include a negative electrode active material containing silicon (Si) or a silicon-containing alloy.

The chemical formulae of the compounds obtained by the above baking method can be calculated using an inductively coupled plasma (ICP) emission spectroscopy as a measuring method from the mass difference of powder before and after baking as a convenient method.

The shape of the negative electrode active material is not particularly limited but is preferably a particle shape. The particle diameter (the volume average particle diameter) of the negative electrode active material is not particularly limited; however, it is preferably 0.1 to 60 μm. The particle diameter of the negative electrode active material particle can be measured in the same manner as in the measurement of the particle diameter of the inorganic solid electrolyte. In order to obtain the predetermined particle diameter, a typical pulverizer or classifier is used as in the case of the positive electrode active material.

In a case where the inorganic solid electrolyte-containing composition according to the embodiment of the present invention contains a negative electrode active material, the contained negative electrode active material may be one kind or two or more kinds.

In a case of forming a negative electrode active material layer, the mass (mg) (mass per unit area) of the negative electrode active material per unit area ($cm^2$) in the negative electrode active material layer is not particularly limited. It can be appropriately determined according to the designed battery capacity and can be set to, for example, 1 to 100 $mg/cm^2$.

The content of the negative electrode active material in the inorganic solid electrolyte-containing composition is not particularly limited, and it is preferably 10% to 90% by mass, more preferably 20% to 85% by mass, still more preferably 30% to 80% by mass, and even still more preferably 40% to 75% by mass in 100% by mass of the solid content.

In the present invention, in a case where a negative electrode active material layer is formed by charging a secondary battery, ions of a metal belonging to Group 1 or Group 2 in the periodic table, generated in the all-solid state secondary battery, can be used instead of the negative electrode active material. By bonding the ions to electrons and precipitating a metal, a negative electrode active material layer can be formed.

(Coating of Active Material)

The surfaces of the positive electrode active material and the negative electrode active material may be subjected to surface coating with another metal oxide. Examples of the surface coating agent include metal oxides and the like containing Ti, Nb, Ta, W, Zr, Al, Si, or Li. Specific examples thereof include titanium oxide spinel, tantalum-based oxides, niobium-based oxides, and lithium niobate-based compounds, and specific examples thereof include $Li_4Ti_5O_{12}$, $Li_2Ti_2O_5$, $LiTaO_3$, $LiNbO_3$, $LiAlO_2$, $Li_2ZrO_3$, $Li_2WO_4$, $Li_2TiO_3$, $Li_2B_4O_7$, $Li_3PO_4$, $Li_2MoO_4$, $Li_3BO_3$, $LiBO_2$, $Li_2CO_3$, $Li_2SiO_3$, $SiO_2$, $TiO_2$, $ZrO_2$, $Al_2O_3$, and $B_2O_3$.

In addition, the surface of the electrode containing the positive electrode active material or negative electrode active material may be subjected to a surface treatment with sulfur or phosphorus.

Further, the particle surface of the positive electrode active material or negative electrode active material may be subjected to a surface treatment with an actinic ray or an active gas (plasma or the like) before and after the surface coating.

<Conductive Auxiliary Agent>

It is preferable that the inorganic solid electrolyte-containing composition according to the embodiment of the present invention contains a conductive auxiliary agent. For example, it is preferable that a silicon atom-containing active material as the negative electrode active material is used in combination with a conductive auxiliary agent.

The conductive auxiliary agent is not particularly limited, and conductive auxiliary agents that are known as ordinary conductive auxiliary agents can be used. It may be, for example, graphite such as natural graphite and artificial graphite, carbon black such as acetylene black (AB), Ketjen black, and furnace black, amorphous carbon such as needle cokes, carbon fibers such as a vapor-grown carbon fiber and a carbon nanotube, or a carbonaceous material such as graphene or fullerene, which are electron-conductive materials, and it may be also a metal powder or metal fiber of copper, nickel, or the like. A conductive polymer such as polyaniline, polypyrrole, polythiophene, polyacetylene, or a polyphenylene derivative may also be used.

In the present invention, in a case where the active material is used in combination with the conductive auxiliary agent, among the above-described conductive auxiliary agents, a conductive auxiliary agent that does not intercalate and deintercalate ions (preferably Li ions) of a metal belonging to Group 1 or Group 2 in the periodic table and does not function as an active material at the time of charging and discharging of the battery is classified as the conductive auxiliary agent. Therefore, among the conductive auxiliary agents, a conductive auxiliary agent that can function as the active material in the active material layer at the time of charging and discharging of the battery is classified as an active material but not as a conductive auxiliary agent. Whether or not the conductive auxiliary agent functions as the active material at the time of charging and discharging of a battery is not unambiguously determined but is determined by the combination with the active material.

The shape of the conductive auxiliary agent is not particularly limited but is preferably a particle shape.

In a case where the inorganic solid electrolyte-containing composition according to the embodiment of the present invention contains a conductive auxiliary agent, the contained conductive auxiliary agent may be one kind or two or more kinds.

In a case where the inorganic solid electrolyte-containing composition contains a conductive auxiliary agent, the content of the conductive auxiliary agent in the inorganic solid electrolyte-containing composition is preferably more than 0% and 10% by mass or less in 100% by mass of the solid content.

<Lithium Salt>

The inorganic solid electrolyte-containing composition according to the embodiment of the present invention preferably contains a lithium salt (a supporting electrolyte) as well.

Generally, the lithium salt is preferably a lithium salt that is used for this kind of product and is not particularly limited. For example, lithium salts described in paragraphs 0082 to 0085 of JP2015-088486A are preferable.

In a case where the inorganic solid electrolyte-containing composition according to the embodiment of the present invention contains a lithium salt, the content of the lithium salt is preferably 0.1 part by mass or more and more preferably 5 parts by mass or more with respect to 100 parts by mass of the inorganic solid electrolyte. The upper limit thereof is preferably 50 parts by mass or less and more preferably 20 parts by mass or less.

<Other Additives>

As components other than the respective components described above, the inorganic solid electrolyte-containing composition according to the embodiment of the present invention may appropriately contain an ionic liquid, a thickener, a crosslinking agent (an agent causing a crosslinking reaction by radical polymerization, condensation polymerization, or ring-opening polymerization), a polymerization initiator (an agent that generates an acid or a radical by heat or light), an antifoaming agent, a leveling agent, a dehydrating agent, or an antioxidant. The ionic liquid is contained in order to further improve the ion conductivity, and the known one in the related art can be used without particular limitation. In addition, the above-described dispersing agent, a polymer other than the polymer that constitutes a polymer binder, a typically used binder, or the like may be contained.

(Preparation of Inorganic Solid Electrolyte-Containing Composition)

The inorganic solid electrolyte-containing composition according to the embodiment of the present invention can be prepared by a conventional method. Specifically, it can be prepared, as a mixture and preferably as a slurry, by mixing an inorganic solid electrolyte, a dispersing agent, and a dispersion medium, preferably a polymer binder and a conductive auxiliary agent, and further appropriately a lithium salt, and any other optional components by using, for example, various mixers that are generally used. In a case of an electrode composition, an active material is further mixed.

The mixing method is not particularly limited, and it can be carried out using a known mixer such as a ball mill, a beads mill, a planetary mixer, a blade mixer, a roll mill, a kneader, a disc mill, a self-rotation type mixer, or a narrow gap type disperser.

The mixing conditions are also not particularly limited. For example, the rotation speed of the self-rotation type mixer or the like can be set to 200 to 3,000 rpm. The mixing atmosphere may be any one of the atmosphere, under dry air (the dew point: −20° C. or lower), in an inert gas (for example, in an argon gas, in a helium gas, or in a nitrogen gas), or the like. Since the inorganic solid electrolyte easily reacts with watery moisture, the mixing is preferably carried out under dry air or in an inert gas.

[Sheet for All-Solid State Secondary Battery]

A sheet for an all-solid state secondary battery according to the embodiment of the present invention is a sheet-shaped molded body with which a constitutional layer of an all-solid state secondary battery can be formed, and it includes various aspects depending on use applications thereof. Examples of thereof include a sheet that is preferably used in a solid electrolyte layer (also referred to as a solid electrolyte sheet for an all-solid state secondary battery) and a sheet that is preferably used in an electrode or a laminate of an electrode and a solid electrolyte layer (an electrode sheet for an all-solid state secondary battery). In the present invention, the variety of sheets described above will be collectively referred to as a sheet for an all-solid state secondary battery.

In the present invention, each layer that constitutes a sheet for an all-solid state secondary battery may have a monolayer structure or a multilayer structure.

<Solid Electrolyte Sheet for all-Solid State Secondary Battery>

It suffices that the solid electrolyte sheet for an all-solid state secondary battery according to the embodiment of the present invention is a sheet having a solid electrolyte layer, and it may be a sheet in which a solid electrolyte layer is formed on a base material or may be a sheet that is formed of a solid electrolyte layer without including a base material. The solid electrolyte sheet for an all-solid state secondary battery may include another layer in addition to the solid electrolyte layer. Examples of the other layer include a protective layer (a stripping sheet), a collector, and a coating layer.

Examples of the solid electrolyte sheet for an all-solid state secondary battery according to the embodiment of the present invention include a sheet including a layer formed of the inorganic solid electrolyte-containing composition according to the embodiment of the present invention, a typical solid electrolyte layer, and a protective layer on a base material in this order. The layer thickness of each layer that constitutes the solid electrolyte sheet for an all-solid state secondary battery is the same as the layer thickness of each layer described later in the all-solid state secondary battery.

The content of each component in the constitutional layer is not particularly limited; however, it preferably has the same meaning as the content of the each component in the solid content of the inorganic solid electrolyte-containing composition according to the embodiment of the present invention. However, at least a part of the dispersing agent in the inorganic solid electrolyte-containing composition may volatilize or evaporate in the process of producing a layer or a battery. In this case, it is preferable that the content of each component excluding the dispersing agent in the constitutional layer has the same meaning as the content of each component in the components excluding the dispersion medium and the dispersing agent of the inorganic solid electrolyte-containing composition according to the embodiment of the present invention.

The base material is not particularly limited as long as it can support the solid electrolyte layer, and examples thereof include a sheet body (plate-shaped body) formed of materials described later regarding the collector, an organic material, an inorganic material, or the like. Examples of the organic material include various polymers, and specific examples thereof include polyethylene terephthalate, polypropylene, polyethylene, and cellulose. Examples of the inorganic materials include glass and ceramic.

<Electrode Sheet for all-Solid State Secondary Battery>

It suffices that an electrode sheet for an all-solid state secondary battery according to the embodiment of the present invention (simply also referred to as an "electrode sheet") is an electrode sheet including an active material layer, and it may be a sheet in which an active material layer is formed on a base material (collector) or may be a sheet that is formed of an active material layer without including a base material. The electrode sheet is typically a sheet including the base material (collector) and the active material layer, and examples of an aspect thereof include an aspect including the base material (collector), the active material layer, and the solid electrolyte layer in this order and an aspect including the base material (collector), the active material layer, the solid electrolyte layer, and the active material layer in this order.

At least one of the solid electrolyte layer or the active material layer, which is included in the electrode sheet, is formed of the inorganic solid electrolyte-containing composition according to the embodiment of the present invention. The contents of the respective components in the solid electrolyte layer or the active material layer, which is formed of the inorganic solid electrolyte-containing composition according to the embodiment of the present invention, are not particularly limited; however, the contents are preferably the same as the contents of the respective components with respect to the solid content of the inorganic solid electrolyte-containing composition (the electrode composition) according to the embodiment of the present invention. The thickness of each of the layers forming the electrode sheet according to the embodiment of the present invention is the same as the layer thickness of each of the layers described later regarding the all-solid state secondary battery. The electrode sheet according to the embodiment of the present invention may include the above-described other layers.

It is noted that in a case where the solid electrolyte layer or the active material layer is not formed of the inorganic solid electrolyte-containing composition according to the embodiment of the present invention, it is formed of a general constitutional layer forming material.

In the sheet for an all-solid state secondary battery according to the embodiment of the present invention, at least one layer of the solid electrolyte layer or the active material layer is formed of the inorganic solid electrolyte-containing composition according to the embodiment of the present invention, and a constitutional layer having a flat surface, in which solid particles are firmly bound to each other, is included. As a result, in a case where the sheet for an all-solid state secondary battery according to the embodiment of the present invention is used as a constitutional layer of the all-solid state secondary battery, it is possible to realize excellent cycle characteristics of the all-solid state secondary battery. In particular, in the electrode sheet for an all-solid state secondary battery and the all-solid state secondary battery, in which the active material layer is formed of the inorganic solid electrolyte-containing composition according to the embodiment of the present invention, the active material layer and the collector exhibit strong adhesiveness, and thus it is possible to realize further improvement of the cycle characteristics. As a result, the sheet for an all-solid state secondary battery according to the embodiment of the present invention is suitably used as a sheet with which a constitutional layer of an all-solid state secondary battery can be formed.

[Manufacturing Method for Sheet for all-Solid State Secondary Battery]

The manufacturing method for a sheet for an all-solid state secondary battery according to the embodiment of the present invention is not particularly limited, and the sheet can be manufactured by forming each of the above layers using the inorganic solid electrolyte-containing composition according to the embodiment of the present invention. Examples thereof include a method in which the film formation (the coating and drying) is carried out preferably on a base material or a collector (another layer may be interposed) to form a layer (a coated and dried layer) consisting of an inorganic solid electrolyte-containing composition. As a result, the sheet for an all-solid state secondary battery including the base material or the collector, and the coated and dried layer can be produced. In particular, in a case where a film of the inorganic solid electrolyte-containing composition according to the embodiment of the present invention is formed on a collector to produce a sheet for an all-solid state secondary battery, it is possible to strengthen the adhesion between the collector and the active material layer. Here, the coated and dried layer refers to a layer formed by carrying out coating with the inorganic solid electrolyte-containing composition according to the embodiment of the present invention and drying the dispersion medium (that is, a layer formed using the inorganic solid electrolyte-containing composition according to the embodiment of the present invention and consisting of a composition obtained by removing the dispersion medium from the inorganic solid electrolyte-containing composition according to the embodiment of the present invention). In the active material layer and the coated and dried layer, the dispersion medium may remain within a range where the effect of the present invention is not impaired, and the residual amount thereof, for example, in each of the layers may be 3% by mass or lower.

In the manufacturing method for a sheet for an all-solid state secondary battery according to the embodiment of the present invention, each of the steps such as coating and drying will be described in the following manufacturing method for an all-solid state secondary battery.

In the manufacturing method for a sheet for an all-solid state secondary battery according to the embodiment of the present invention, the coated and dried layer obtained as described above can be pressurized. The pressurizing condition and the like will be described later in the section of the manufacturing method for an all-solid state secondary battery.

In addition, in the manufacturing method for a sheet for an all-solid state secondary battery according to the embodiment of the present invention, the base material, the protective layer (particularly stripping sheet), or the like can also be stripped.

[All-Solid State Secondary Battery]

The all-solid state secondary battery according to the embodiment of the present invention includes a positive electrode active material layer, a negative electrode active material layer facing the positive electrode active material layer, and a solid electrolyte layer disposed between the positive electrode active material layer and the negative electrode active material layer. The all-solid state secondary battery according to the embodiment of the present invention is not particularly limited in the configuration as long as it has a solid electrolyte layer between the positive electrode active material layer and the negative electrode active material layer, and for example, a known configuration for an all-solid state secondary battery can be employed. In a preferred all-solid state secondary battery, a positive electrode collector is laminated on a surface of the positive electrode active material layer opposite to the solid electrolyte layer to constitute a positive electrode, and a negative electrode collector is laminated on a surface of the negative electrode active material layer opposite to the solid electrolyte layer to constitute a negative electrode. In the present invention, each constitutional layer (including a collector and the like) that constitutes an all-solid state secondary battery may have a monolayer structure or a multilayer structure.

In the all-solid state secondary battery according to the embodiment of the present invention, at least one layer of the negative electrode active material layer, the positive electrode active material layer, or the solid electrolyte layer is a layer formed of the inorganic solid electrolyte-containing composition according to the embodiment of the present invention, which has excellent cycle characteristics. In the all-solid state secondary battery according to the embodiment of the present invention, from the viewpoint of further improving the cycle characteristics, it is preferable that at least two layer of the negative electrode active material layer, the positive electrode active material layer, and the solid electrolyte layer is a layer formed of the inorganic solid electrolyte-containing composition according to the embodiment of the present invention, and it is more preferable that all layers of the negative electrode active material layer, the positive electrode active material layer, and the solid electrolyte layer is a layer formed of the inorganic solid electrolyte-containing composition according to the embodiment of the present invention. In the present invention, forming the constitutional layer of the all-solid state secondary battery by using the inorganic solid electrolyte-containing composition according to the embodiment of the present invention includes an aspect in which the constitutional layer is formed by using the sheet for an all-solid state secondary battery according to the embodiment of the present invention (however, in a case where a layer other than the layer formed of the inorganic solid electrolyte-containing composition according to the embodiment of the present invention is provided, a sheet from which this layer is removed). In the active material layer or the solid electrolyte layer formed of the inorganic solid electrolyte-containing composition according to the embodiment of the present invention, the kinds of components to be contained and the contents thereof are preferably the same as the solid content of the inorganic solid electrolyte-containing composition according to the embodiment of the present invention.

<Active Material Layer and Solid Electrolyte Layer>

The thickness of each of the negative electrode active material layer, the solid electrolyte layer, and the positive electrode active material layer is not particularly limited. In case of taking a dimension of a general all-solid state secondary battery into account, the thickness of each of the layers is preferably 10 to 1,000 μm and more preferably 20 μm or more and less than 500 μm. In the all-solid state secondary battery according to the embodiment of the present invention, the thickness of at least one layer of the positive electrode active material layer or the negative electrode active material layer is still more preferably 50 μm or more and less than 500 μm.

In a case where the active material layer or the solid electrolyte layer is not formed of the inorganic solid electrolyte-containing composition according to the embodiment of the present invention, a known material in the related art can be used.

<Collector>

The positive electrode collector and the negative electrode collector are preferably an electron conductor.

In the present invention, either or both of the positive electrode collector and the negative electrode collector will also be simply referred to as the collector.

As a material that forms the positive electrode collector, not only aluminum, an aluminum alloy, stainless steel, nickel, or titanium but also a material (a material on which a thin film has been formed) obtained by treating the surface of aluminum or stainless steel with carbon, nickel, titanium, or silver is preferable. Among these, aluminum or an aluminum alloy is more preferable.

As a material that forms the negative electrode collector, aluminum, copper, a copper alloy, stainless steel, nickel, titanium, or the like, and further, a material obtained by treating the surface of aluminum, copper, a copper alloy, or stainless steel with carbon, nickel, titanium, or silver is preferable, and aluminum, copper, a copper alloy, or stainless steel is more preferable.

Regarding the shape of the collector, a film sheet shape is typically used; however, it is also possible to use shapes such as a net shape, a punched shape, a lath body, a porous body, a foaming body, and a molded body of a fiber group.

The thickness of the collector is not particularly limited; however, it is preferably 1 to 500 μm. In addition, protrusions and recesses are preferably provided on the surface of the collector by carrying out a surface treatment.

<Other Configurations>

In the present invention, a functional layer, a functional member, or the like may be appropriately interposed or disposed between or on the outside of the respective layers of the negative electrode collector, the negative electrode active material layer, the solid electrolyte layer, the positive electrode active material layer, and the positive electrode collector.

<Housing>

Depending on the use application, the all-solid state secondary battery according to the embodiment of the present invention may be used as the all-solid state secondary battery having the above-described structure as it is but is preferably sealed in an appropriate housing to be used in the form of a dry cell. The housing may be a metallic housing or a resin (plastic) housing. In a case where a metallic housing is used, examples thereof include an aluminum alloy housing and a stainless steel housing. It is preferable that the metallic housing is classified into a positive electrode-side housing and a negative electrode-side housing and that the positive electrode-side housing and the negative electrode-side housing are electrically connected to the positive electrode collector and the negative electrode collector, respectively. The positive electrode-side housing and the negative electrode-side housing are preferably integrated by being joined together through a gasket for short circuit prevention.

Hereinafter, the all-solid state secondary battery according to the preferred embodiment of the present invention will be described with reference to FIG. 1; however, the present invention is not limited thereto.

FIG. 1 is a cross-sectional view schematically illustrating an all-solid state secondary battery (a lithium ion secondary battery) according to a preferred embodiment of the present invention. In a case of being seen from the negative electrode side, an all-solid state secondary battery 10 of the present embodiment includes a negative electrode collector 1, a negative electrode active material layer 2, a solid electrolyte layer 3, a positive electrode active material layer 4, and a positive electrode collector 5 in this order. The respective layers are in contact with each other, and thus structures thereof are adjacent. In a case in which the above-described structure is employed, during charging, electrons (e) are supplied to the negative electrode side, and lithium ions (Lit) are accumulated on the negative electrode side. On the other hand, during discharging, the lithium ions (Lit) accumulated in the negative electrode return to the positive electrode side, and electrons are supplied to an operation portion 6. In an example illustrated in the drawing, an electric bulb is employed as a model at the operation portion 6 and is lit by discharging.

In a case where the all-solid state secondary battery having a layer configuration illustrated in FIG. 1 is placed in a 2032-type coin case, the all-solid state secondary battery will be referred to as a laminate for an all-solid state secondary battery, and a battery produced by placing this laminate for an all-solid state secondary battery in a 2032-type coin case will be referred to as a (coin type) all-solid state secondary battery, whereby both batteries may be distinctively referred to in some cases.

(Positive Electrode Active Material Layer, Solid Electrolyte Layer, and Negative Electrode Active Material Layer)

In the all-solid state secondary battery 10, all of the positive electrode active material layer, the solid electrolyte layer, and the negative electrode active material layer are formed of the inorganic solid electrolyte-containing composition of the embodiment of the present invention. This all-solid state secondary battery 10 exhibits excellent battery performance. The kinds of the inorganic solid electrolyte and the dispersing agent, which are contained in the positive electrode active material layer 4, the solid electrolyte layer 3, and the negative electrode active material layer 2, may be identical to or different from each other.

In the present invention, any one of the positive electrode active material layer and the negative electrode active material layer, or collectively both of them may be simply referred to as an active material layer or an electrode active material layer. In addition, in the present invention, any one of the positive electrode active material and the negative electrode active material, or collectively both of them may be simply referred to as an active material or an electrode active material.

In the present invention, in a case where the constitutional layer is formed of the inorganic solid electrolyte-containing composition according to the embodiment of the present invention, it is possible to realize an all-solid state secondary battery having excellent cycle characteristics.

In the all-solid state secondary battery 10, the negative electrode active material layer can be a lithium metal layer. Examples of the lithium metal layer include a layer formed by depositing or molding a lithium metal powder, a lithium foil, and a lithium vapor deposition film. The thickness of the lithium metal layer can be, for example, 1 to 500 μm regardless of the above thickness of the above negative electrode active material layer.

(Collector)

The positive electrode collector 5 and the negative electrode collector 1 are as described above.

In a case where the all-solid state secondary battery 10 has a constitutional layer other than the constitutional layer formed of the inorganic solid electrolyte-containing composition according to the embodiment of the present invention, a layer formed of a known constitutional layer forming material can also be applied.

In addition, each layer may be constituted of a single layer or multiple layers.

[Manufacture of all-Solid State Secondary Battery]

The all-solid state secondary battery can be manufactured by a conventional method. Specifically, the all-solid state secondary battery can be manufactured by forming each of the layers described above using the inorganic solid electrolyte-containing composition of the embodiment of the present invention or the like. Hereinafter, the manufacturing method therefor will be described in detail.

The all-solid state secondary battery according to the embodiment of the present invention can be manufactured by carrying out a method (a manufacturing method for a sheet for an all-solid state secondary battery according to the embodiment of the present invention) which includes (is carried out through) a step of coating an appropriate base material (for example, a metal foil which serves as a collector) with the inorganic solid electrolyte-containing composition according to the embodiment of the present invention and forming a coating film (forming a film).

For example, an inorganic solid electrolyte-containing composition containing a positive electrode active material is applied as a material for a positive electrode (a positive electrode composition) onto a metal foil which is a positive electrode collector, to form a positive electrode active material layer, thereby producing a positive electrode sheet for an all-solid state secondary battery. Next, the inorganic solid electrolyte-containing composition for forming a solid electrolyte layer is applied onto the positive electrode active material layer to form the solid electrolyte layer. Furthermore, an inorganic solid electrolyte-containing composition containing a negative electrode active material is applied as a material for a negative electrode (a negative electrode composition) onto the solid electrolyte layer, to form a negative electrode active material layer. A negative electrode collector (a metal foil) is overlaid on the negative electrode active material layer, whereby it is possible to obtain an all-solid state secondary battery having a structure in which the solid electrolyte layer is sandwiched between the positive electrode active material layer and the negative electrode active material layer. A desired all-solid state secondary battery can also be manufactured by enclosing the all-solid state secondary battery in a housing.

In addition, it is also possible to manufacture an all-solid state secondary battery by carrying out the forming method for each layer in reverse order to form a negative electrode active material layer, a solid electrolyte layer, and a positive electrode active material layer on a negative electrode collector and overlaying a positive electrode collector thereon.

Examples of the other method include the following method. That is, the positive electrode sheet for an all-solid state secondary battery is produced as described above. In addition, an inorganic solid electrolyte-containing composition containing a negative electrode active material is applied as a material for a negative electrode (a negative electrode composition) onto a metal foil which is a negative electrode collector, to form a negative electrode active material layer, thereby producing a negative electrode sheet for an all-solid state secondary battery. Next, a solid electrolyte layer is formed on the active material layer in any one of these sheets as described above. Furthermore, the other one of the positive electrode sheet for an all-solid state secondary battery and the negative electrode sheet for an all-solid state secondary battery is laminated on the solid electrolyte layer such that the solid electrolyte layer and the active material layer come into contact with each other. In this manner, an all-solid state secondary battery can be manufactured.

As still another method, for example, the following method can be used. That is, a positive electrode sheet for an all-solid state secondary battery and a negative electrode sheet for an all-solid state secondary battery are produced as described above. In addition, separately from the positive electrode sheet for an all-solid state secondary battery and the negative electrode sheet for an all-solid state secondary battery, an inorganic solid electrolyte-containing composition is applied onto a base material, thereby producing a solid electrolyte sheet for an all-solid state secondary battery consisting of a solid electrolyte layer. Furthermore, the positive electrode sheet for an all-solid state secondary battery and the negative electrode sheet for an all-solid state secondary battery are laminated with each other to sandwich the solid electrolyte layer that has been peeled off from the base material. In this manner, an all-solid state secondary battery can be manufactured.

Further, a positive electrode sheet for an all-solid state secondary battery, a negative electrode sheet for an all-solid state secondary battery, and a solid electrolyte sheet for an all-solid state secondary battery are produced as described above. Next, the positive electrode sheet for an all-solid state secondary battery or negative electrode sheet for an all-solid state secondary battery, and the solid electrolyte sheet for an all-solid state secondary battery are overlaid and pressurized into a state where the positive electrode active material layer or the negative electrode active material layer is brought into contact with the solid electrolyte layer. In this manner, the solid electrolyte layer is transferred to the positive electrode sheet for an all-solid state secondary battery or the negative electrode sheet for an all-solid state secondary battery. Then, the solid electrolyte layer from which the base material of the solid electrolyte sheet for an all-solid state secondary battery has been peeled off and the negative electrode sheet for an all-solid state secondary battery or positive electrode sheet for an all-solid state secondary battery are overlaid and pressurized (into a state where the negative electrode active material layer or positive electrode active material layer is brought into contact with the solid electrolyte layer). In this manner, an all-solid state secondary battery can be manufactured. The pressurizing method and the pressurizing conditions in this method are not particularly limited, and a method and pressurizing conditions described in the pressurization step, which will be described later, can be applied.

The solid electrolyte layer or the like can also be formed on the base material or the active material layer, for example, by pressure-molding the inorganic solid electrolyte-containing composition or the like under a pressurizing condition described later, or the solid electrolyte or a sheet molded body of the active material.

In the above manufacturing method, it suffices that the inorganic solid electrolyte-containing composition according to the embodiment of the present invention is used in any one of the positive electrode composition, the inorganic solid electrolyte-containing composition, and the negative electrode composition, and the inorganic solid electrolyte-containing composition according to the embodiment of the present invention can be used in any one of the compositions.

In a case where the solid electrolyte layer or the active material layer is formed of a composition other than the inorganic solid electrolyte-containing composition according to the embodiment of the present invention, examples thereof include a typically used composition. In addition, the negative electrode active material layer can also be formed by binding ions of a metal belonging to Group 1 or Group 2 in the periodic table, which are accumulated on a negative electrode collector during initialization described later or during charging for use, without forming the negative electrode active material layer during the manufacturing of the all-solid state secondary battery to electrons and precipitating the ions on a negative electrode collector the like as a metal.

<Formation (Film Formation) of Each Layer>

The method of applying the inorganic solid electrolyte-containing composition is not particularly limited and can be appropriately selected. Examples thereof include wet-type coating methods such as spray coating, spin coating, dip coating, slit coating, stripe coating, and bar coating.

In this case, the inorganic solid electrolyte-containing composition may be subjected to drying treatment (heating treatment) each time or may be subjected to drying treatment after being applied multiple times. The drying temperature is not particularly limited as long as the dispersion medium can be removed, and it is appropriately set according to the boiling point of the dispersion medium. The lower limit of the drying temperature is, for example, preferably 30° C. or higher, more preferably 60° C. or higher, and still more preferably 80° C. or higher. The upper limit thereof is preferably 300° C. or lower, more preferably 250° C. or lower, and still more preferably 200° C. or lower. In a case where the solid electrolyte composition is heated in the above-described temperature range, the dispersion medium can be removed to make the composition enter a solid state (coated and dried layer). This temperature range is preferable since the temperature is not excessively increased and each member of the all-solid state secondary battery is not impaired. As a result, excellent overall performance is exhibited in the all-solid state secondary battery, and it is possible to obtain a good application suitability (adhesiveness) and a good ion conductivity even without pressurization.

In a case where the inorganic solid electrolyte-containing composition according to the embodiment of the present invention is applied and dried as described above, it is possible to suppress the variation in the contact state and bind solid particles, and furthermore, it is possible to form a coated and dried layer having a flat surface.

After applying the inorganic solid electrolyte-containing composition, it is preferable to pressurize each layer or the all-solid state secondary battery after superimposing the constitutional layers or producing the all-solid state secondary battery. Examples of the pressurizing methods include a method using a hydraulic cylinder press machine. The pressurizing force is not particularly limited; however, it is generally preferably in a range of 5 to 1,500 MPa.

In addition, the applied inorganic solid electrolyte-containing composition may be heated at the same time with the pressurization. The heating temperature is not particularly limited but is generally in a range of 30° C. to 300° C. The press can also be applied at a temperature higher than the glass transition temperature of the inorganic solid electrolyte. It is also possible to carry out pressing at a temperature higher than the glass transition temperature of the polymer that constitutes a dispersing agent or a polymer binder. However, in general, the temperature does not exceed the melting point of this polymer.

The pressurization may be carried out in a state where the coating solvent or dispersion medium has been dried in advance or in a state where the solvent or the dispersion medium remains.

The respective compositions may be applied at the same time, and the application, the drying, and the pressing may be carried out simultaneously and/or sequentially. Each of the compositions may be applied onto each of the separate base materials and then laminated by carrying out transfer.

The atmosphere during the coating or during the pressurization is not particularly limited and may be any one of the atmospheres such as an atmosphere of dried air (the dew point: −20° C. or lower) and an atmosphere of inert gas (for example, an argon gas, a helium gas, or a nitrogen gas).

The pressurization time may be a short time (for example, within several hours) under the application of a high pressure or a long time (one day or longer) under the application of an intermediate pressure. In case of members other than the sheet for an all-solid state secondary battery, for example, the all-solid state secondary battery, it is also possible to use a restraining device (screw fastening pressure or the like) of the all-solid state secondary battery in order to continuously apply an intermediate pressure.

The pressing pressure may be a pressure that is constant or varies with respect to a portion under pressure such as a sheet surface.

The pressing pressure may be variable depending on the area or the film thickness of the portion under pressure. In addition, the pressure may also be variable stepwise for the same portion.

A pressing surface may be flat or roughened.

<Initialization>

The all-solid state secondary battery manufactured as described above is preferably initialized after the manufacturing or before use. The initialization is not particularly limited, and it is possible to initialize the all-solid state secondary battery by, for example, carrying out initial charging and discharging in a state where the pressing pressure is increased and then releasing the pressure up to a pressure at which the all-solid state secondary battery is ordinarily used.

[Use Application of all-Solid State Secondary Battery]

The all-solid state secondary battery according to the embodiment of the present invention can be applied to a variety of usages. The application aspect thereof is not particularly limited, and in a case of being mounted in an electronic apparatus, examples thereof include a notebook computer, a pen-based input personal computer, a mobile personal computer, an e-book player, a mobile phone, a cordless phone handset, a pager, a handy terminal, a portable fax, a mobile copier, a portable printer, a headphone stereo, a video movie, a liquid crystal television, a handy cleaner, a portable CD, a mini disc, an electric shaver, a transceiver, an electronic notebook, a calculator, a memory card, a portable tape recorder, a radio, and a backup power supply. Additionally, examples of consumer usages include automobiles (electric vehicles and the like), electric vehicles, motors, lighting equipment, toys, game devices, road conditioners, watches, strobes, cameras, medical devices (pacemakers, hearing aids, and shoulder massage devices, and the like).

Furthermore, the all-solid state secondary battery can be used for a variety of military usages and universe usages. In addition, the all-solid state secondary battery can also be combined with a solar battery.

EXAMPLES

Hereinafter, the present invention will be described in more detail based on Examples; however, the present invention is not limited thereto be interpreted. "Parts" and "%" that represent compositions in the following Examples are based on the mass unless particularly otherwise described. In the present invention, "room temperature" means 25° C.

The tensile fracture strain and the mass average molecular weight were respectively measured by the above-described methods.

1. Synthesis of Polymer Binder

Polymer binders shown in the following chemical formulae were synthesized as follows.

Synthesis Example 1-1: Synthesis of Fluorine-Based Copolymer B-1

A fluorine-based copolymer B-1 was synthesized to prepare a binder solution B-1 (concentration: 10% by mass) consisting of this fluorine-based copolymer.

Specifically, 200 parts by mass of ion exchange water, 126 parts by mass of vinylidene fluoride, and 74 parts by mass of hexafluoropropylene were added to the autoclave, 1 part by mass of diisopropyl peroxydicarbonate was added, and the mixture was stirred at 30° C. for 24 hours. After completion of the polymerization, the precipitate was filtered and dried at 100° C. for 10 hours to obtain a polymer (binder) B-1. The obtained polymer was a random copolymer, the mass average molecular weight thereof was 70,000, and the tensile fracture strain thereof was 3,000%. The obtained polymer B-1 was dissolved in a dispersion medium (butyl butyrate, isobutyl ethyl ether, or heptane) shown in the table to obtain a binder solution B-1.

Synthesis Example 1-2: Synthesis of Acrylonitrile Homopolymer B-2

An acrylonitrile homopolymer B-2 was synthesized to prepare a binder solution B-2 (concentration: 10% by mass) consisting of this acrylonitrile homopolymer.

Specifically, to a 100 mL volumetric flask, 30.0 g of acrylonitrile (manufactured by Tokyo Chemical Industry Co., Ltd.) and 0.36 g of a polymerization initiator V-601 (product name, manufactured by FUJIFILM Wako Pure Chemical Corporation) were added and dissolved in 36 g of butyl butyrate to prepare a monomer solution. To a 300 mL three-necked flask, 18 g of butyl butyrate was added and stirred at 80° C., and then the above monomer solution was added dropwise thereto over 2 hours. After completion of the dropwise addition, the temperature was raised to 90° C., and stirring was carried out for 2 hours to synthesize a polymer B-2, whereby a binder solution B-2 (concentration: 10% by mass) consisting of the polymer B-2 was obtained. The mass average molecular weight was 68,000.

Each of the polymers synthesized is shown below. The number at the bottom right of each constitutional component indicates the content (% by mole).

In addition, the adsorption rate of the polymer B-1 with respect to the inorganic solid electrolyte was 0% in a case where the dispersion medium was butyl butyrate and 0% in a case where the dispersion medium was isobutyl ethyl ether. The adsorption rate of the polymer B-2 with respect to the inorganic solid electrolyte was 18% in a case where the dispersion medium was butyl butyrate.

It is noted that the adsorption rate of the polymer binder with respect to the inorganic solid electrolyte was measured in the same manner as the method in [Measurement of adsorption rate of dispersing agent with respect to inorganic solid electrolyte] described later, except that a binder was used instead of the dispersing agent.

B-1

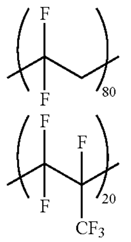

B-2

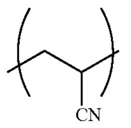

2. Synthesis of Sulfide-Based Inorganic Solid Electrolyte

Synthesis Example A

A sulfide-based inorganic solid electrolyte was synthesized with reference to a non-patent document of T. Ohtomo, A. Hayashi, M. Tatsumisago, Y. Tsuchida, S. Hama, K. Kawamoto, Journal of Power Sources, 233, (2013), pp. 231 to 235 and A. Hayashi, S. Hama, H. Morimoto, M. Tatsumisago, T. Minami, Chem. Lett., (2001), pp. 872 and 873.

Specifically, in a globe box in an argon atmosphere (dew point: −70° C.), lithium sulfide ($Li_2S$, manufactured by Sigma-Aldrich Co., LLC Co., LLC Co., LLC, purity: >99.98%) (2.42 g) and diphosphorus pentasulfide ($P_2S_5$, manufactured by Sigma-Aldrich Co., LLC Co., LLC Co., LLC, purity: >99%) (3.90 g) each were weighed, put into an agate mortar, and mixed using an agate pestle for five minutes. The mixing ratio between $Li_2S$ and $P_2S_5$ ($Li_2S$:$P_2S_5$) was set to 75:25 in terms of molar ratio.

Next, 66 g of zirconia beads having a diameter of 5 mm were put into a 45 mL container made of zirconia (manufactured by FRITSCH), the entire amount of the mixture of the above lithium sulfide and the diphosphorus pentasulfide was put thereinto, and the container was completely sealed in an argon atmosphere. The container was set in a planetary ball mill P-7 (product name, manufactured by FRITSCH), mechanical milling was carried out at a temperature of 25° C. and a rotation speed of 510 rpm for 36 hours, thereby obtaining yellow powder (6.20 g) of a sulfide-based inorganic solid electrolyte (Li—P—S-based glass, hereinafter, may be referred to as LPS). The particle diameter of the Li—P—S-based glass was 4

3. Synthesis of Dispersing Agent

Synthesis Example 2-1: Synthesis of Dispersing Agent C-2 (C-2a or C-2b)

To a 100 mL volumetric flask, 5.4 g of styrene (manufactured by Tokyo Chemical Industry Co., Ltd.), 28.0 g of dodecyl acrylate (manufactured by Tokyo Chemical Industry Co., Ltd.), 0.5 g of maleic acid anhydride (manufactured by Tokyo Chemical Industry Co., Ltd.), and a polymerization initiator V-601 (product name, manufactured by FUJIFILM Wako Pure Chemical Corporation) were added and dissolved in 36 g of butyl butyrate to prepare a monomer solution. To a 300 mL three-necked flask, 18 g of butyl butyrate was added and stirred at 80° C., and then the above monomer solution was added dropwise thereto over 2 hours. After completion of the dropwise addition, the temperature was raised to 90° C., and stirring was carried out for 2 hours to synthesize a dispersing agent C-2 (C-2a or C-2b).

It is noted that the adding amount of the polymerization initiator V-601 was set to 3.6 g in the synthesis of the dispersing agent C-2a and 5.0 g in the synthesis of the dispersing agent C-2b.

Synthesis Example 2-2: Synthesis of Dispersing Agent C-3

A dispersing agent C-3 was prepared in the same manner as in Synthesis Example 1-2, except that in Synthesis Example 1-2 of the polymer binder (the synthesis of the acrylonitrile homopolymer), and the amount of the polymerization initiator V-601 was changed to 3.6 g.

Synthesis Example 2-3: Synthesis of Dispersing Agent C-11

A dispersing agent C-11 was prepared in the same manner as in Synthesis Example 1-2, except that in Synthesis Example 1-2 of the polymer binder (the synthesis of the acrylonitrile homopolymer), the monomer components were changed to 10.1 g of acrylonitrile and 19.9 g of styrene, and the amount of the polymerization initiator V-601 was changed to 3.6 g.

Example 1

<Preparation of Inorganic Solid Electrolyte-Containing Composition (Slurry)>

2.8 g of the LPS synthesized in Synthesis Example A, 0.08 g (in terms of solid content mass) of the binder solution prepared as above, 0.03 g of a dispersing agent, and the dispersion medium shown in the table were put into a container for a self-rotation type mixer (ARE-310, manufactured by THINKY CORPORATION) so that the content of the dispersion medium in the composition was 50% by mass. Then, this container was set in a self-rotation type mixer ARE-310 (product name) manufactured by THINKY CORPORATION. The inorganic solid electrolyte-containing compositions (slurries) S-1 to S-21 were prepared by mixing for 5 minutes under the conditions of 25° C. and a rotation speed of 2,000 rpm.

The contents of the respective components in the composition were 96% by mass of LPS, 3% by mass of the binder, and 1% by mass of the dispersing agent in 100% by mass of the total content of components excluding the dispersion medium. It is noted that the composition S-12 was prepared using 2.8 g of LLZ ($Li_7La_3Zr_2O_{12}$, manufactured by Toshima Manufacturing Co., Ltd.) instead of LPS. In addition, the composition S-1 was prepared in the same manner except that a dispersing agent was not used, and the composition S-15 was prepared in the same manner except that a binder was not used. In the composition S-15, LPS was 98.9% by mass, and the dispersing agent was 1.1% by mass in 100% by mass of the total content of components excluding the dispersion medium.

<Preparation of Positive Electrode Composition (Slurry)>

2.8 g of the LPS synthesized in Synthesis Example A, 0.16 g (in terms of solid content mass) of a binder solution, 0.16 g of a dispersing agent, and the dispersion medium shown in the table were put into a container for a self-rotation type mixer (ARE-310, manufactured by THINKY CORPORATION) so that the content of the dispersion medium in the positive electrode composition was 50% by mass. Then, this container was set in the self-rotation type mixer ARE-310 (product name) manufactured by THINKY CORPORATION and, mixing was carried out for 2 minutes at a temperature of 25° C. and a rotation speed of 2,000 rpm. Then, 13.2 g of $LiNi_{1/3}Co_{1/3}Mn_{1/3}O_2$ (NMC, manufactured by Sigma-Aldrich Co., LLC) as a positive electrode active material, and 0.32 g of acetylene black (AB) as a conductive auxiliary agent were put into this container, and the container was set in the self-rotation type mixer ARE-310, and mixing was carried out at 25° C. and a rotation speed of 2,000 rpm for 2 minutes to prepare each of positive electrode compositions (slurries) P-1 to P-18.

The contents of the respective components in the composition were 17% by mass of LPS, 79% by mass of NMC, 1% by mass of the binder 2% by mass of AB2, and 1% by mass of the dispersing agent in 100% by mass of the total content of components excluding the dispersion medium. It is noted that the composition P-10 was prepared using 2.8 g of LLZ ($Li_7La_3Zr_2O_{12}$, manufactured by Toshima Manufacturing Co., Ltd.) instead of LPS. In addition, the composition P-1 was prepared in the same manner except that a dispersing agent was not used, and the composition P-13 was prepared in the same manner except that a binder was not used. In the composition P-13, LPS was 17% by mass, NMC was 80% by mass, AB was 2% by mass, and the dispersing agent was 1% by mass in 100% by mass of the total content of components excluding the dispersion medium.

<Preparation of Negative Electrode Composition (Slurry)>

2.8 g of the LPS synthesized in Synthesis Example A, 0.08 g (in terms of solid content mass) of a binder solution, 0.08 g of a dispersing agent, and the dispersion medium shown in the table were put into a container for a self-rotation type mixer (ARE-310, manufactured by THINKY CORPORATION) so that the content of the dispersion medium in the composition was 50% by mass. Then, this container was set in the self-rotation type mixer ARE-310 (product name) manufactured by THINKY CORPORATION and, mixing was carried out for 2 minutes at 25° C. and a rotation speed of 2,000 rpm. Then, 3.53 g of silicon (Si, manufactured by Sigma-Aldrich Co., LLC) as a negative electrode active material and 0.27 g of VGCF (product name, carbon nanotube, manufactured by Showa Denko K.K.) as a conductive auxiliary agent were put into the container, the container was set in the same manner in the self-rotation type mixer ARE-310 (product name), and mixing was carried out for 2 minutes at 25° C. and a rotation speed of 2,000 rpm to prepare each of negative electrode compositions (slurries) N-1 to N-8.

The contents of the respective components in the composition were 41% by mass of LPS, 52% by mass of Si, 1% by mass of the binder 4% by mass of VGCF, and 1% by mass of the dispersing agent in 100% by mass of the total content of components excluding the dispersion medium. It is noted that compositions N-5 to N-8 were prepared by using 3.53 g of graphite (Gr, manufactured by Hohsen Corp.) instead of silicon.

Table 1 shows the kinds of the active material, the inorganic solid electrolyte, the binder, the dispersing agent, and the dispersion medium, which are used for the respective compositions prepared. In addition, Table 1 collectively shows the SP values of the dispersing agent and the dispersion medium and the difference therebetween, which have been calculated according to the above methods, as well as the molecular weight of the dispersing agent and the adsorption rate with respect to the inorganic solid electrolyte, which has been measured according to the following method.

It is noted that Nos. S-4, S-7 to S-15, S-18, S-19, S-21, P-6 to P-13, P-15 to P-18, N-3, N-4, N-7, and N-8 are the inorganic solid electrolyte-containing compositions according to the embodiment of the present invention, and Nos. S-1 to S-3, S-5, S-6, S-16, S-17, S-20, P-1 to P-5, P-14, N-1, N-2, N-5, and N-6 are inorganic solid electrolyte-containing compositions for comparison.

[Measurement of Adsorption Rate of Dispersing Agent with Respect to Inorganic Solid Electrolyte]

The adsorption rate A was measured using the inorganic solid electrolyte, the dispersing agent, and the dispersion medium, which had been used in the preparation of each of the inorganic solid electrolyte-containing compositions shown in Table 1.

That is, a dispersing agent solution having a concentration of 1% by mass, which was obtained by dissolving the dispersing agent prepared above in a dispersion medium, was prepared. The dispersing agent solution and the inorganic solid electrolyte were placed in a 15 ml of vial at a proportion such that the ratio of the dispersing agent in this dispersing agent solution to the inorganic solid electrolyte was 42:1, and stirred for 1 hour with a mix rotor at room temperature (25° C.) and a rotation speed of 80 rpm, and then allowed to stand. The supernatant obtained by solid-liquid separation was filtered through a filter having a pore diameter of 1 μm, and the entire amount of the obtained filtrate was dried to be solid, and then the mass of the dispersing agent remaining in the filtrate (the mass of the dispersing agent that had not adsorbed to the inorganic solid electrolyte) $W_A$ was measured. From this mass $W_A$ and the mass $W_B$ of the dispersing agent contained in the dispersing agent solution used for the measurement, the adsorption rate of the dispersing agent with respect to the inorganic solid electrolyte was calculated according to the following expression.

The adsorption rate of the dispersing agent is the average value of the adsorption rates obtained by carrying out the above measurement twice.

$$\text{Adsorption rate (\%)}=[(W_B-W_A)/W_B]\times 100$$

It is noted that as a result of measuring the adsorption rate using the inorganic solid electrolyte and the dispersing agent, which had been extracted from the solid electrolyte layer formed into a film, and the dispersion medium which had been used for the preparation of the inorganic solid electrolyte-containing composition, the same value was obtained.

TABLE 1-1

| Inorganic solid electrolyte-containing composition | | | | | | | | | | |
|---|---|---|---|---|---|---|---|---|---|---|
| | | | | Dispersing agent | | | | Dispersion medium | | SP value |
| No. | Active Material | Inorganic solid electrolyte | Binder | Kind | SP value | Molecular weight | Adsortion rate with repect to inorganic solid electrolyte | Kind | SP value | difference Δ |
| S-1 | — | LPS | B-1 | Absent | — | — | — | Butyl butyrate | 18.6 | — |
| S-2 | — | LPS | B-1 | C-1 | 18.0 | 170 | 0 | Butyl butyrate | 18.6 | 0.6 |
| S-3 | — | LPS | B-1 | C-2a | 18.9 | 12000 | 40 | Butyl butyrate | 18.6 | 0.3 |
| S-4 | — | LPS | B-1 | C-2b | 18.9 | 9600 | 40 | Butyl butyrate | 18.6 | 0.3 |
| S-5 | — | LPS | B-1 | C-3 | 25.0 | 3000 | 80 | Butyl butyrate | 18.6 | 6.4 |
| S-6 | — | LPS | B-1 | C-4 | 16.0 | 500 | 80 | Butyl butyrate | 18.6 | 2.6 |
| S-7 | — | LPS | B-1 | C-13 | 18.9 | 255 | 2.5 | Butyl butyrate | 18.6 | 0.3 |
| S-8 | — | LPS | B-1 | C-5 | 18.9 | 227 | 20 | Butyl butyrate | 18.6 | 0.3 |
| S-9 | — | LPS | B-1 | C-6 | 18.9 | 246 | 40 | Butyl butyrate | 18.6 | 0.3 |
| S-10 | — | LPS | B-1 | C-7 | 18.9 | 276 | 80 | Butyl butyrate | 18.6 | 0.3 |
| S-11 | — | LPS | B-2 | C-7 | 18.9 | 276 | 80 | Butyl butyrate | 18.6 | 0.3 |
| S-12 | — | LLZ | B-1 | C-7 | 18.9 | 276 | 80 | Butyl butyrate | 18.6 | 0.3 |
| S-13 | — | LPS | B-1 | C-8 | 21.8 | 88 | 80 | Butyl butyrate | 18.6 | 3.2 |
| S-14 | — | LPS | B-1 | C-7 | 18.9 | 276 | 80 | Isobutyl ethyl ether | 15.3 | 3.0 |
| S-15 | — | LPS | Absent | C-7 | 18.9 | 276 | 80 | Butyl butyrate | 18.6 | 0.3 |
| S-16 | — | LPS | B-1 | C-9 | 18.5 | 272 | 0 | Butyl butyrate | 18.6 | 0.1 |
| S-17 | — | LPS | B-1 | C-10 | 16.8 | 445 | 0 | Butyl butyrate | 18.6 | 1.8 |
| S-18 | — | LPS | B-1 | C-11 | 21.3 | 3000 | 80 | Butyl butyrate | 18.6 | 2.7 |
| S-19 | — | LPS | B-1 | C-12 | 17.5 | 322 | 80 | Butyl butyrate | 18.6 | 1.1 |
| S-20 | — | LPS | B-1 | C-21 | 18.3 | 283 | 60 | Heptane | 16.8 | 1.5 |
| S-21 | — | LPS | B-1 | C-21 | 18.3 | 283 | 60 | Butyl butyrate | 18.6 | 0.3 |

TABLE 1-2

| Positive electrode composition | | | | | | | | | | |
|---|---|---|---|---|---|---|---|---|---|---|
| | | | | Dispersing agent | | | | Dispersion medium | | SP value |
| No. | Active Material | Inorganic solid electrolyte | Binder | Kind | SP value | Molecular weight | Adsortion rate with repect to inorganic solid electrolyte | Kind | SP value | SP value difference Δ |
| P-1 | NMC | LPS | B-1 | Absent | — | — | — | Butyl butyrate | 18.6 | — |
| P-2 | NMC | LPS | B-1 | C-1 | 18.0 | 170 | 0 | Butyl butyrate | 18.6 | 0.6 |
| P-3 | NMC | LPS | B-1 | C-2a | 18.9 | 12000 | 40 | Butyl butyrate | 18.6 | 0.3 |
| P-4 | NMC | LPS | B-1 | C-3 | 25.0 | 3000 | 80 | Butyl butyrate | 18.6 | 6.4 |
| P-5 | NMC | LPS | B-1 | C-4 | 16.0 | 500 | 80 | Butyl butyrate | 18.6 | 2.6 |
| P-6 | NMC | LPS | B-1 | C-5 | 18.9 | 227 | 20 | Butyl butyrate | 18.6 | 0.3 |
| P-7 | NMC | LPS | B-1 | C-6 | 18.9 | 246 | 40 | Butyl butyrate | 18.6 | 0.3 |
| P-8 | NMC | LPS | B-1 | C-7 | 18.9 | 276 | 80 | Butyl butyrate | 18.6 | 0.3 |
| P-9 | NMC | LPS | B-2 | C-7 | 18.9 | 276 | 80 | Butyl butyrate | 18.6 | 0.3 |
| P-10 | NMC | LLZ | B-1 | C-7 | 18.9 | 276 | 80 | Butyl butyrate | 18.6 | 0.3 |
| P-11 | NMC | LPS | B-1 | C-8 | 21.8 | 88 | 80 | Butyl butyrate | 18.6 | 3.2 |
| P-12 | NMC | LPS | B-1 | C-7 | 18.9 | 276 | 80 | Isobutyl ethyl ether | 15.3 | 3.6 |
| P-13 | NMC | LPS | Absent | C-7 | 18.9 | 276 | 80 | Butyl butyrate | 18.6 | 0.3 |
| P-14 | NMC | LPS | B-1 | C-10 | 16.8 | 445 | 0 | Butyl butyrate | 18.6 | 1.8 |
| P-15 | NMC | LPS | B-1 | C-13 | 18.9 | 253 | 2.5 | Butyl butyrate | 18.6 | 0.3 |
| P-16 | NMC | LPS | B-1 | C-2b | 18.9 | 9600 | 40 | Butyl butyrate | 18.6 | 0.3 |
| P-17 | NMC | LPS | B-1 | C-11 | 21.3 | 3000 | 80 | Butyl butyrate | 18.6 | 2.7 |
| P-18 | NMC | LPS | B-1 | C-12 | 17.3 | 322 | 80 | Butyl butyrate | 18.6 | 1.1 |

TABLE 1-3

| Negative electrode composition | | | | | | | | | | |
|---|---|---|---|---|---|---|---|---|---|---|
| | | | | Dispersing agent | | | | Dispersion medium | | SP value |
| No. | Active Material | Inorganic solid electrolyte | Binder | Kind | SP value | Molecular weight | Adsortion rate with repect to inorganic solid electrolyte | Kind | SP value | SP value difference Δ |
| N-1 | Si | LPS | B-1 | C-1 | 18.0 | 170 | 0 | | 18.6 | 0.6 |
| N-2 | Si | LPS | B-1 | C-2a | 18.9 | 12000 | 40 | | 18.6 | 0.3 |
| N-3 | Si | LPS | B-1 | C-5 | 18.9 | 227 | 20 | | 18.6 | 0.3 |
| N-4 | Si | LPS | B-1 | C-7 | 18.9 | 276 | 80 | | 18.6 | 0.3 |
| N-5 | Cr | LPS | B-1 | C-1 | 18.0 | 170 | 0 | | 18.6 | 0.6 |
| N-6 | Cr | LPS | B-1 | C-2a | 18.9 | 12000 | 40 | | 18.6 | 0.3 |
| N-7 | Cr | LPS | B-1 | C-5 | 18.9 | 227 | 20 | | 18.6 | 0.3 |
| N-8 | Cr | LPS | B-1 | C-7 | 18.9 | 276 | 80 | | 18.6 | 0.3 |

<Abbreviations in Table>

LPS: LPS synthesized in Synthesis Example A

LLZ: $Li_7La_3Zr_2O_{12}$

NMC: $LiNi_{1/3}Co_{1/3}Mn_{1/3}O_2$

Si: Silicon

Gr: Graphite

Binders B-1 and B-2: Polymer binders B-1 and B-2 synthesized in the above synthesis examples, respectively Dispersing agents C-1 to C-13 and C-21: Dispersing agents C-1 to C-13 and C-21 described below. However, C-2 (C-2a or C-2b), C-3, and C-11 mean the dispersing agents synthesized in the above synthesis examples, respectively. In addition, as a result of determining the solubility of these dispersing agents in the dispersion medium that constitutes the composition was determined according to the measurement of the permeability described above, the solubility was 10% by mass or more in any case.

C-1

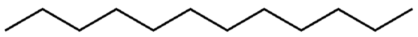

C-2

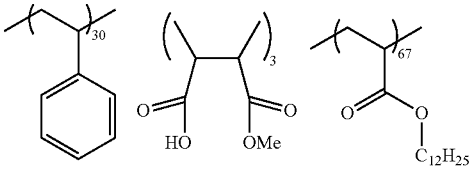

-continued

C-3

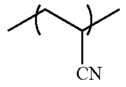

C-4

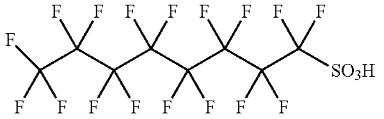

C-5

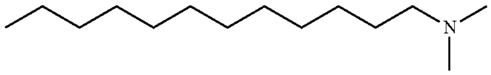

C-6

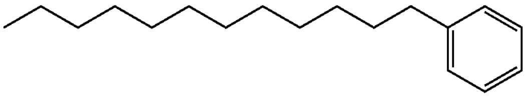

C-7

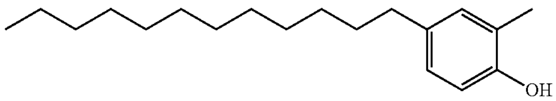

C-8

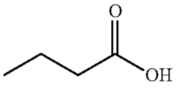

C-9

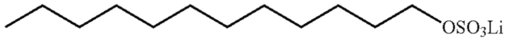

C-10

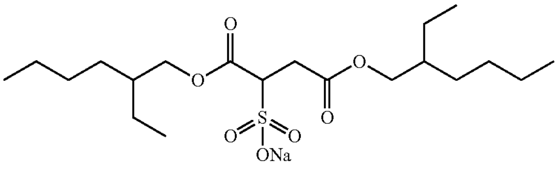

C-11

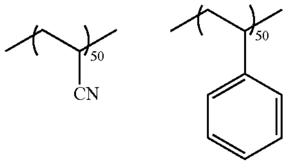

C-12

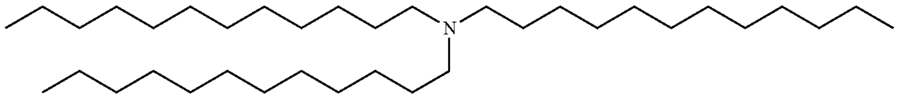

C-13

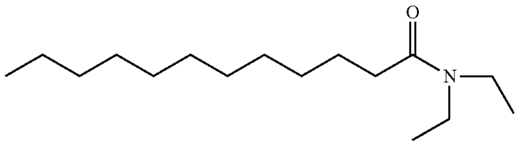

C-21

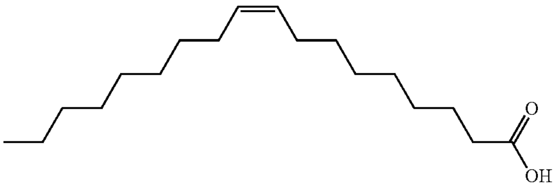

The units of the "SP value" and the "SP value difference Δ" in the table are $MPa^{1/2}$. The unit of "Adsorption rate with respect to inorganic solid electrolyte" is %. "SP value difference Δ" indicates a difference between the SP value of the dispersion medium and the SP value of the dispersing agent in terms of absolute value.

The boiling points of the dispersion media were 164° C. for butyl butyrate, 133° C. for isobutyl ethyl ether, and 98° C. for heptane, respectively.

<Production of Solid Electrolyte Sheet for all-Solid State Secondary Battery>

Each of the above-described inorganic solid electrolyte-containing compositions S-1 to S-21 was prepared and after 1 hour, applied onto an aluminum foil having a thickness of 20 μm using a baker type applicator (product name: SA-201, manufactured by Tester Sangyo Co., Ltd.), followed by heating at 110° C. for 2 hours to dry (remove the dispersion medium) the inorganic solid electrolyte-containing composition. Then, using a heat press machine, the inorganic solid electrolyte-containing composition dried at 25° C. and a pressure of 10 MPa for 10 seconds was pressurized to produce each of solid electrolyte sheets S-1 to S-21 for an all-solid state secondary battery. The film thickness of the solid electrolyte layer was 50

<Production of Positive Electrode Sheet for all-Solid State Secondary Battery>

Each of the obtained positive electrode compositions P-1 to P-18 was prepared and after 1 hour, applied onto an aluminum foil having a thickness of 20 μm by using a baker type applicator (product name: SA-201), followed by heating at 110° C. for 1 hour to dry (to remove the dispersion medium) the positive electrode composition. Then, using a heat press machine, the dried positive electrode composition was pressurized (10 MPa, 1 minute) at 25° C. to produce each of positive electrode sheets P-1 to P-18 for an all-solid state secondary battery, having a positive electrode active material layer having a film thickness of 100

<Production of Negative Electrode Sheet for all-Solid State Secondary Battery>

Each of the negative electrode compositions N-1 to N-8 obtained as above was prepared, and after 1 hour, applied onto a copper foil having a thickness of 20 μm using a baker type applicator (product name: SA-201), followed by heating at 110° C. and subsequently drying and heating at 110° C. for 2 hours with a vacuum dryer AVO-200NS (product name, manufactured by AS ONE Corporation) to dry (to remove the dispersion medium) the negative electrode composition. Then, using a heat press machine, the dried negative electrode composition was pressurized (10 MPa, 1 minute) at 25° C. to produce each of negative electrode sheets N-1 to N-8 for an all-solid state secondary battery, having a negative electrode active material layer having a film thickness of 70 μm.

The following evaluations were carried out for each of the manufactured compositions and each of the sheet, and the results are shown in Table 2.

<Evaluation 1: Dispersion Characteristics (Dispersibility)>

A composition at the time of applying onto a base material in the above-described manufacturing method for each sheet was sampled, and the following dispersibility test was carried out.

Each sampled composition (slurry) was dropped in a groove of a particle size measuring device (a grind meter) 232/111 type (product name, manufactured by AS ONE Corporation), and a value obtained by reading, according to the gradation, the position of the line that appeared after scraping with a scraper was defined as the aggregation size X. On the other hand, the aggregation size $X_0$ of the composition in which the viscosity was adjusted to 300 cP was measured in the same manner as the aggregation size X. The aggregation size ratio [$X/X_0$] was calculated using the obtained aggregation sizes X and $X_0$.

It is noted that the composition having a viscosity of 300 cP was prepared by adjusting the amount of the dispersion medium while keeping the blending ratio of the content other than the dispersion medium unchanged with respect to each sampled composition (slurry). As described above, the viscosity is a value measured using an E-type viscometer.

The ease of aggregation of solid particles was evaluated as the dispersibility of the composition by determining where this aggregation size ratio [$X/X_0$] is included in any one of the following evaluation standards.

In this test, the smaller the aggregation size ratio [$X/X_0$] is, the less the solid particles are aggregated or sedimented, which indicates that the dispersibility is excellent, and an evaluation standard “F” or higher is the pass level.

—Evaluation Standards—

A: $X/X_0 \le 1.1$
B: $1.1 \le X/X_0 < 1.2$
C: $1.2 \le X/X_0 < 1.3$
D: $1.3 \le X/X_0 < 1.4$
E: $1.4 \le X/X_0 < 1.5$
F: $1.5 \le X/X_0 < 1.6$
G: $1.6 \le X/X_0$

<Evaluation 2: Dispersion Characteristics (Stability)>

A composition at the time of applying onto a base material in the above-described manufacturing method for each sheet was sampled, and the following dispersion stability test was carried out.

Each of the sampled compositions (slurries) was put into a glass test tube having a diameter of 10 mm and a height of 4 cm up to a height of 4 cm and allowed to stand at 25° C. for 24 hours. The solid content reduction rate for the upper 30% (in terms of height) of the composition before and after standing was calculated from the following expression. The ease of sedimentation (sedimentary property) of the solid particles due to a lapse of time was evaluated as the dispersion stability (the storage stability) of the composition by determining where the solid content reduction rate is included in any one of the following evaluation standards. In this test, the smaller the solid content reduction rate, the better the dispersion stability, and an evaluation standard “F” or higher is the pass level.

Solid content reduction rate (%)=[(solid content concentration of upper 30% before standing−solid content concentration of upper 30% after standing)/solid content concentration of upper 30% before standing]×100

—Evaluation Standards—

A: Solid content reduction rate<1%
B: 1%≤solid content reduction rate<3%
C: 3%≤solid content reduction rate<5%
D: 5%≤solid content reduction rate<7%
E: 7%≤solid content reduction rate<9%
F: 9%≤solid content reduction rate<11%
G: 11%≤solid content reduction rate <Evaluation 3: Application Suitability (Surface Properties)>

As the application suitability of each composition, the maximum height roughness Rz of the surface of the solid electrolyte layer or the surface of the active material layer of each obtained sheet was measured and evaluated.

Specifically, the maximum height roughness Rz of the surface of the solid electrolyte layer or the surface of the active material layer of each sheet was measured with the following measuring device and under the following conditions according to Japanese Industrial Standards (JIS) B 0601: 2013.

The ease of forming a constitutional layer having a flat surface and good surface properties (surface properties) was evaluated as the application suitability of the composition, by determining where the maximum height roughness Rz is included in any of the following evaluation standards. In this test, the smaller the maximum height roughness Rz is, the more excellent the application suitability (the surface properties) is, and an evaluation standard “F” or higher is the pass level.

—Measuring Device and Conditions—

Measuring device: Three-dimensional fine shape measuring instrument (model: ET-4000A, manufactured by Kosaka Laboratory Ltd.)
Analytical instrument: 3D surface roughness analysis system (model TDA-31)
Touch needle: Tip radius of 0.5 μm, made of diamond
Needle pressure: 1 μN
Measurement length: 5.0 mm
Measurement speed: 0.02 mm/s
Measurement interval: 0.62 μm
Cutoff: Absent
Filter method: Gaussian spatial type
Leveling: Present (quadratic curve)

—Evaluation Standards—

A: Rz<1.0 μm
B: 1.0 μm≤Rz<2.0 μm
C: 2.0 μm≤Rz<4.0 μm
D: 4.0 μm≤Rz<6.0 μm
E: 6.0 μm≤Rz<8.0 μm
F: 8.0 μm≤Rz<10 μm
G: 10 μm≤Rz

<Evaluation 4: Application Suitability (Adhesiveness)>

As the application suitability of each composition, the adhesiveness of the solid particles in the solid electrolyte layer or active material layer of each obtained sheet and the adhesiveness between the active material layer and the collector were evaluated.

The produced sheet was cut out into a rectangle having a width of 3 cm and a length of 14 cm. Using a cylindrical mandrel tester (product code: 056, mandrel diameter: 10 mm, manufactured by Allgood Co., Ltd.), one end part of the cut-out sheet test piece in the length direction was fixed to the tester and disposed so that the cylindrical mandrel touched to the central portion of the sheet test piece, and then the sheet test piece was bent by 180° along the peripheral surface of the mandrel (with the mandrel as an axis) while pulling the other end part of the sheet test piece in the length direction with a force of 5N along the length direction. It is noted that the sheet test piece was set so that the solid electrolyte layer or active material layer thereof was placed on a side opposite to the mandrel (the base material or the collector was placed on the side of the mandrel) and the width direction was parallel to the axis line of the mandrel. The test was carried out by gradually reducing the diameter of the mandrel from 32 mm.

In a state of being wound around the mandrel and a state of being restored to a sheet shape by releasing the winding, the occurrence of defects (cracking, breakage, chipping, and the like) due to the disintegration of binding of solid particles in the solid electrolyte layer or the active material layer and for the active material layer, the minimum diameter at which the peeling between the active material layer and the collector could not be confirmed were measured, and the evaluation was carried out by determining which evaluation standard below is satisfied by the minimum diameter.

In this test, it is indicated that the smaller the minimum diameter is, the more firm the binding force of the solid particles that constitute the solid electrolyte layer or active material layer is, and the more firm the adhesion between the active material layer and the collector is, and an evaluation standard "F" or higher is the pass level.

—Evaluation Standards—

A: Minimum diameter<5 mm

B: 5 mm≤minimum diameter<6 mm

C: 6 mm≤minimum diameter<8 mm

D: 8 mm≤minimum diameter<10 mm

E: 10 mm≤minimum diameter<14 mm

F: 14 mm≤minimum diameter<25 mm

G: 25 mm≤minimum diameter

<Evaluation 5: Upper Limit Concentration for Slurrying>

In the preparation of each of the above-described compositions (slurries), the blending amount of the dispersion medium was changed to prepare a composition having a solid content concentration of 76% by mass in the composition. The prepared composition having a solid content concentration of 76% by mass was placed in a container (a columnar container for a self-rotation type mixer (ARE-310: product name, manufactured by THINKY CORPORATION), having a diameter of 5.0 cm and a height of 7.0 cm) placed on a desk, to a height of about 1.0 cm, and then tilted by 60 degrees from this state, and it was checked whether or not the fluidity was such a degree that the prepared composition dripped under the weight thereof. In a case where the composition did not drip under the weight thereof and had no fluidity, butyl butyrate as a dispersion medium was added so that the solid content concentration of the composition was reduced by 1% by mass, the composition was dispersed at 2,000 rpm for 1 minute with the above-described self-rotation type mixer, and then it was checked whether or not the composition had fluidity in the same manner as in the case of the above-described composition having a solid content concentration of 76% by mass. This operation was repeated so that the solid content concentration was reduced by 1% by mass per operation, and the maximum concentration of the concentrated slurry capable of being prepared was evaluated regarding the maximum solid content concentration having fluidity as the upper limit concentration for slurrying. In a case where the solid content concentration is increased to a concentration exceeding the upper limit concentration for slurrying, it is difficult to be used in the coating step in the first place. Therefore, the upper limit concentration for slurrying is an indicator of the upper limit concentration of solid contents of the composition that can be used in the coating step, and it is preferable to be high.

In the table below, the unit of the upper limit concentration for slurrying is % by mass.

TABLE 2-1

| No. | Upper limit concentration for slurrying | Dispersion characteristics | | Application suitability | |
|---|---|---|---|---|---|
| | | Dispersibility | Stability | Surface properties | Adhesiveness |
| S-1 | 65 | G | G | G | G |
| S-2 | 65 | F | G | F | G |
| S-3 | 64 | G | G | G | G |
| S-4 | 68 | D | D | D | D |
| S-5 | 65 | G | G | G | G |
| S-6 | 62 | G | G | G | G |
| S-7 | 70 | D | C | D | C |
| S-8 | 70 | D | C | D | C |
| S-9 | 73 | B | B | B | B |
| S-10 | 74 | A | B | A | B |
| S-11 | 74 | A | B | A | B |
| S-12 | 73 | B | C | B | C |
| S-13 | 68 | D | D | D | D |
| S-14 | 68 | D | E | D | D |
| S-15 | 68 | C | C | C | C |
| S-16 | 65 | F | G | G | G |
| S-17 | 65 | G | G | G | G |
| S-18 | 68 | D | E | D | D |
| S-19 | 67 | D | E | E | D |
| S-20 | 65 | G | G | G | G |
| S-21 | 69 | D | D | E | D |

TABLE 2-2

| No. | Upper limit concentration for slurrying | Dispersion characteristics | | Application suitability | |
|---|---|---|---|---|---|
| | | Dispersibility | Stability | Surface properties | Adhesiveness |
| P-1 | 65 | G | G | G | G |
| P-2 | 65 | F | G | F | G |
| P-3 | 64 | G | G | G | G |
| P-4 | 65 | G | G | G | G |
| P-5 | 62 | G | G | G | G |
| P-6 | 70 | D | C | D | C |
| P-7 | 73 | B | B | B | B |
| P-8 | 74 | A | B | A | B |
| P-9 | 74 | A | B | A | B |
| P-10 | 73 | B | C | B | C |
| P-11 | 68 | D | D | D | D |
| P-12 | 68 | D | E | D | D |
| P-13 | 68 | C | C | C | C |
| P-14 | 65 | G | G | G | G |
| P-15 | 70 | D | C | D | C |
| P-16 | 68 | E | D | D | D |
| P-17 | 68 | D | E | D | D |
| P-18 | 67 | D | E | E | D |

TABLE 2-3

| No. | Upper limit concentration for slurrying | Dispersion characteristics | | Application suitability | |
|---|---|---|---|---|---|
| | | Dispersibility | Stability | Surface properties | Adhe-siveness |
| N-1 | 65 | F | G | F | G |
| N-2 | 65 | G | G | G | G |
| N-3 | 70 | A | B | A | B |
| N-4 | 72 | A | B | A | B |
| N-5 | 65 | F | G | F | G |
| N-6 | 65 | G | G | G | G |
| N-7 | 70 | A | B | A | B |
| N-8 | 72 | A | B | A | B |

<Manufacturing of all-Solid State Secondary Battery>

A positive electrode sheet for an all-solid state secondary battery, a solid electrolyte sheet for an all-solid state secondary battery, and a negative electrode sheet for an all-solid state secondary battery were used in combinations of the constitutional layers shown in Table 3 to manufacture all-solid state secondary battery.

The positive electrode sheet P-1, P-4, or P-8 for an all-solid state secondary battery was punched out into a disk shape having a diameter of 10 mm and was placed in a cylinder made of PET having an inner diameter of 10 mm. The solid electrolyte sheet S-1, S-5, or S-10 for an all-solid state secondary battery were punched on the positive electrode active material layer side in the cylinder into a disk shape having a diameter of 10 mm and placed in the cylinder, and a 10 mm SUS rod was inserted from the openings at both ends of the cylinder. The collector side of the positive electrode sheet for an all-solid state secondary battery and the aluminum foil side of the solid electrolyte sheet for an all-solid state secondary battery were pressurized by applying a pressure of 350 MPa with a SUS rod. The SUS rod on the side of the solid electrolyte sheet for an all-solid state secondary battery was once removed to gently peel off the aluminum foil of the solid electrolyte sheet for an all-solid state secondary battery, and then the negative electrode sheet N-1, N-2, or N-4 was punched into a disk shape having a diameter of 10 mm and inserted onto the solid electrolyte layer of the solid electrolyte sheet for an all-solid state secondary battery in the cylinder. The removed SUS rod was inserted again into the cylinder and the sheets were fixed while applying a pressure of 50 MPa. In this way, all-solid state secondary battery Nos. C-1 to C-9 having a structure of an aluminum foil (thickness: 20 μm)—a positive electrode active material layer (thickness: 90 μm)—a solid electrolyte layer (thickness: 45 μm)—a negative electrode active material layer (thickness: 65 μm) were obtained.

It is noted that Nos. C-1 to C-4 and C-6 to C-8 are the all-solid state secondary batteries according to the embodiment of the present invention, and Nos. C-5 and C-9 are all-solid state secondary batteries for comparison.

<Evaluation 5: Cycle Characteristics>

The discharge capacity retention rate of each of the all-solid state secondary batteries manufactured as described above was measured using a charging and discharging evaluation device TOSCAT-3000 (product name, manufactured by Toyo System Corporation).

Specifically, each of the all-solid state secondary batteries was charged in an environment of 25° C. at a current density of 0.1 mA/cm$^2$ until the battery voltage reached 3.6 V. Then, the battery was discharged at a current density of 0.1 mA/cm$^2$ until the battery voltage reached 2.5 V. One charging operation and one discharging operation were set as one cycle of initialization charging and discharging, and 3 cycles of initialization charging and discharging were repeated under the same conditions to carry out initialization. Then, under the same conditions as the cycle of initialization charging and discharging, charging and discharging were repeatedly carried out for 1,000 cycles, and the discharge capacity at the first cycle of charging and discharging and the discharge capacity at the 1,000th cycle thereof were determined with a charging and discharging evaluation device: TOSCAT-3000 (product name). The discharge capacity retention rate was calculated according to the following expression, and this discharge capacity retention rate was applied to the following evaluation standards to evaluate the cycle characteristics of the all-solid state secondary battery. In this test, the higher the evaluation standard is, the better the battery performance (the cycle characteristics) is, and the initial battery performance can be maintained even in a case where a plurality of times of charging and discharging are repeated (even in a case of the long-term use). In this test, an evaluation standard of “F” or higher is the pass level.

All of the all-solid state secondary batteries according to the embodiment of the present invention exhibited initial discharge capacity values sufficient for functioning as an all-solid state secondary battery.

Discharge capacity retention rate (%)=(discharge capacity at 1,000th cycle/discharge capacity at first cycle)×100

—Evaluation Standards—

A: 90%≤discharge capacity retention rate
B: 85%≤discharge capacity retention rate<90%
C: 80%≤discharge capacity retention rate<85%
D: 75%≤discharge capacity retention rate<80%
E: 70%≤discharge capacity retention rate<75%
F: 60%≤discharge capacity retention rate<70%
G: Discharge capacity retention rate<60%

TABLE 3

| Battery No. | Negative electrode active material layer | Solid electrolyte layer | Positive electrode active material layer | Cycle characteristics |
|---|---|---|---|---|
| C-1 | N-4 | S-10 | P-8 | A |
| C-2 | N-4 | S-1 | P-1 | D |
| C-3 | N-1 | S-10 | P-1 | E |
| C-4 | N-1 | S-1 | P-8 | C |
| C-5 | N-1 | S-1 | P-1 | G |
| C-6 | N-4 | S-5 | P-4 | D |
| C-7 | N-2 | S-10 | P-4 | D |
| C-8 | N-2 | S-5 | P-8 | D |
| C-9 | N-2 | S-5 | P-4 | G |

The following findings can be seen from the results of Table 2 and Table 3.

The comparative inorganic solid electrolyte-containing composition Nos. S-1 and P-1 do not contain the dispersing agent defined in the present invention, the comparative inorganic solid electrolyte-containing composition Nos. S-5, S-6, P-4, and P-5 do not contain a dispersing agent having an SP value in the range defined in the present invention, and the comparative inorganic solid electrolyte-containing compositions Nos. S-3, P-3, N-2, and N-6 do not contain a dispersing agent having a molecular weight in the range defined in the present invention. All of these compositions were inferior in dispersion characteristics and application suitability. In addition, the comparative inorganic solid electrolyte-containing composition Nos. S-2, S-16, P-2, P-14, N-1, and N-5 do not contain a dispersing agent having an adsorption rate in the range defined in the present invention. All of these compositions were inferior in dispersion characteristics (stability) and application suitability (adhesiveness). In addition, the comparative inorganic solid electrolyte-containing composition No. S-17 does not contain a dispersing agent satisfying the SP value and the adsorption rate in the range defined in the present invention, and the comparative inorganic solid electrolyte-containing composition No. S-20 does not contain a dispersion medium having a boiling point within the range defined in the present invention. All of these compositions were inferior in dispersion characteristics and application suitability.

In addition, the comparative all-solid state secondary battery Nos. C-5 and C-9 in which layers were constituted using each of these comparative inorganic solid electrolyte-containing compositions did not exhibit sufficient cycle characteristics.

On the other hand, the inorganic solid electrolyte-containing compositions according to the embodiment of the present invention, Nos. S-4, S-7 to S-15, S-18, S-19, S-21, P-6 to P-13, P-15 to P-18, N-3, N-4, N-7, and N-8 contain a dispersing agent satisfying any one of the range of the SP value, the molecular weight, or the adsorption rate, which is defined in the present invention, and contain a dispersion medium exhibiting a boiling point in the range defined in the present invention. These compositions have both dispersion characteristics (dispersibility and stability) and application suitability (surface properties and adhesiveness) at a high level. It has been found that in a case of using this inorganic solid electrolyte-containing composition for the formation of any one of constitutional layers of an all-solid state secondary battery, an all-solid state secondary battery exhibiting excellent cycle characteristics can be manufactured as shown in Nos. C-1 to C-4 and C-6 to C-8.

Further, in addition to the above, in a case where the dispersing agent used in the above-described inorganic solid electrolyte-containing composition or positive electrode composition was used in the negative electrode composition. The same effects as those in the case of the inorganic solid electrolyte-containing composition or the positive electrode composition were obtained.

The present invention has been described together with the embodiments of the present invention. However, the inventors of the present invention do not intend to limit of the present invention in any part of the details of the description unless otherwise designated, and it is conceived that the present invention should be broadly construed without departing from the spirit and scope of the invention shown in the attached "WHAT IS CLAIMED IS".

This application claims priority based on JP2020-166555 filed in Japan on Sep. 30, 2020, which is incorporated herein by reference as a part of the description of the present specification.

EXPLANATION OF REFERENCES

1: negative electrode collector
2: negative electrode active material layer
3: solid electrolyte layer
4: positive electrode active material layer
5: positive electrode collector
6: operation portion
10: all-solid state secondary battery

What is claimed is:

1. An inorganic solid electrolyte-containing composition for an all-solid state secondary battery, the inorganic solid electrolyte-containing composition comprising:

an inorganic solid electrolyte having an ion conductivity of a metal belonging to Group 1 or Group 2 in the periodic table;

a dispersing agent; and a dispersion medium, wherein the dispersing agent satisfies the following definitions of (1) to (3), and the dispersion medium includes a dispersion medium having a boiling point of 120° C. or higher, (1) an SP value is 17.0 to 22.0 $MPa^{1/2}$, (2) a molecular weight is 10,000 or less, and (3) an adsorption rate with respect to the inorganic solid electrolyte in the dispersion medium is 2% or more.

2. The inorganic solid electrolyte-containing composition according to claim 1, wherein the adsorption rate according to the definition of (3) is 40% or more.

3. The inorganic solid electrolyte-containing composition according to claim 1, wherein a difference between an SP value of the dispersion medium and an SP value of the dispersing agent is 3.0 $MPa^{1/2}$ or less.

4. The inorganic solid electrolyte-containing composition according to claim 1, wherein the dispersing agent contains a functional group selected from the following group (a) of functional groups, <Group (a) of functional groups> a hydroxy group, an amino group, a carboxy group, a sulfo group, a phosphate group, a phosphonate group, a sulfanyl group, a heterocyclic group, an amide group, and an aryl group.

5. The inorganic solid electrolyte-containing composition according to claim 1, further comprising a polymer binder.

6. The inorganic solid electrolyte-containing composition according to claim 1, further comprising an active material.

7. The inorganic solid electrolyte-containing composition according to claim 1, further comprising a conductive auxiliary agent.

8. The inorganic solid electrolyte-containing composition according to claim 1, wherein the inorganic solid electrolyte is a sulfide-based inorganic solid electrolyte.

9. A sheet for an all-solid state secondary battery, comprising a layer formed of the inorganic solid electrolyte-containing composition according to claim 1.

10. An all-solid state secondary battery comprising, in the following order:

a positive electrode active material layer;

a solid electrolyte layer; and a negative electrode active material layer, wherein at least one of the positive electrode active material layer, the negative electrode active material layer, or the solid electrolyte layer has a layer formed of the inorganic solid electrolyte-containing composition according to claim 1.

11. A manufacturing method for a sheet for an all-solid state secondary battery, the manufacturing method comprising forming a film of the inorganic solid electrolyte-containing composition according to claim 1.

12. A manufacturing method for an all-solid state secondary battery, the manufacturing method comprising incorporating a sheet for an all-solid state secondary battery obtained by the manufacturing method according to claim 11 into an all-solid state secondary battery.

* * * * *